US011283759B2

(12) United States Patent
Patil et al.

(10) Patent No.: US 11,283,759 B2
(45) Date of Patent: Mar. 22, 2022

(54) TECHNIQUES FOR BASIC SERVICE SET ATTRIBUTE DETECTION AND RESOLUTION

(71) Applicant: QUALCOMM Incorporated, San Diego, CA (US)

(72) Inventors: Abhishek Pramod Patil, San Diego, CA (US); Naveen Kumar Kakani, Coppell, TX (US); Alfred Asterjadhi, San Diego, CA (US); George Cherian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 51 days.

(21) Appl. No.: 15/620,688

(22) Filed: Jun. 12, 2017

(65) Prior Publication Data

US 2017/0359300 A1 Dec. 14, 2017

Related U.S. Application Data

(60) Provisional application No. 62/349,644, filed on Jun. 13, 2016.

(51) Int. Cl.
*H04L 29/12* (2006.01)
*H04W 48/08* (2009.01)
(Continued)

(52) U.S. Cl.
CPC ......... *H04L 61/1541* (2013.01); *H04W 24/02* (2013.01); *H04W 48/08* (2013.01);
(Continued)

(58) Field of Classification Search
CPC .............. H04L 61/1541; H04W 48/08; H04W 52/0212; H04W 48/16; H04W 24/02;
(Continued)

(56) References Cited

U.S. PATENT DOCUMENTS 9,942,193 B1 * 4/2018 Chu .................... H04L 61/2038
2004/0253948 A1 12/2004 Laberteaux
(Continued)

FOREIGN PATENT DOCUMENTS

CN 102137413 A 7/2011
CN 103379657 A 10/2013
(Continued)

OTHER PUBLICATIONS

IEEE P802.11-REVmcTM/D5.0, Jan. 2016, 2 pages (Year: 2016).*
(Continued)

*Primary Examiner* — Sharmin Chowdhury
(74) *Attorney, Agent, or Firm* — Holland & Hart LLP

(57) ABSTRACT

Methods, systems, and devices for wireless communications are described, including identifying a first attribute value associated with a first access point; receiving a second attribute value; and determining that the first attribute value associated with the first access point is the same as the received second attribute value. An attribute value may be an n-bit value, where n is an integer. The n-bit value may identify a BSS color. The n-bit value may, additionally or alternatively, indicate other BSS color information such as a BSSID, ESSID, SSID, or a combination thereof. It is helpful when devices detect BSS attribute value (e.g., BSS color, BSSID, MAC address, ESSID) overlap and notify other associated devices (e.g., STAs, APs) of this overlap so that a device may cease using an attribute value for power save or channel access decisions, and facilitate attribute value adjustment and correction to eliminate a BSS collision.

30 Claims, 20 Drawing Sheets

(51) Int. Cl.
*H04W 24/02* (2009.01)
*H04W 48/16* (2009.01)
*H04W 52/02* (2009.01)
*H04L 61/4541* (2022.01)
*H04W 84/12* (2009.01)

(52) U.S. Cl.
CPC ....... *H04W 48/16* (2013.01); *H04W 52/0212* (2013.01); *H04W 84/12* (2013.01); *Y02D 30/70* (2020.08)

(58) Field of Classification Search
CPC ... H04W 84/12; Y02D 70/1244; Y02D 70/00; Y02D 70/1262; Y02D 70/1246; Y02D 70/22; Y02D 70/146; Y02D 70/144; Y02D 70/142; Y02D 70/1224
See application file for complete search history.

(56) References Cited

U.S. PATENT DOCUMENTS

| | | | |
|---|---|---|---|
| 2010/0008235 A1* | 1/2010 | Tinnakornsrisuphap | H04L 29/12264 370/241 |
| 2013/0034195 A1 | 2/2013 | Takahashi et al. | |
| 2015/0110093 A1 | 4/2015 | Asterjadhi et al. | |
| 2016/0286477 A1* | 9/2016 | Lin | H04W 48/20 |
| 2016/0302145 A1* | 10/2016 | Kasslin | H04W 72/0486 |
| 2016/0345258 A1 | 11/2016 | Zhou et al. | |
| 2017/0257817 A1* | 9/2017 | Itagaki | H04W 84/12 |
| 2018/0110046 A1 | 4/2018 | Patil et al. | |
| 2018/0184285 A1 | 6/2018 | Patil et al. | |
| 2018/0242145 A1* | 8/2018 | Sugaya | H04W 76/11 |
| 2018/0270038 A1* | 9/2018 | Oteri | H04L 5/0037 |
| 2018/0368195 A1* | 12/2018 | Sugaya | H04W 8/26 |

FOREIGN PATENT DOCUMENTS

| | | |
|---|---|---|
| CN | 103384190 A | 11/2013 |
| CN | 104066091 A | 9/2014 |
| CN | 107027133 A | 8/2017 |
| CN | 107251594 A | 10/2017 |
| CN | 108012288 A | 5/2018 |
| JP | 2018506219 A | 3/2018 |
| JP | 2018535596 A | 11/2018 |
| WO | WO-2015119379 A1 | 8/2015 |
| WO | WO-2015174725 A1 | 11/2015 |
| WO | WO-2016112306 A1 | 7/2016 |
| WO | WO-2017069543 A1 | 4/2017 |

OTHER PUBLICATIONS

Geonjung Ko et al., "BSS Color Collision", May 18, 2016, XP055407989, Retrieved from the Internet: URL:https://mentor.IEEE.org/802.11 /dcn/16/11-16-0640-03-00ax-bss-color-collision.pptx, [retrieved on Sep. 19, 2017], 14 pages.
Geonjung Ko (WILUS): "BSS Color Settings for a Multiple BSSID Set ; 11-16-0042-02-00ax-bss-color-settings-for-a-multiple-bssid-set", IEEE Draft, Jan. 19, 2016, vol. 802.11 ax, No. 2, XP068104796, pp. 1-10.
International Search Report and Written Opinion—PCT/US2017/037285—ISA/EPO—dated Sep. 27, 2017 (163827WO).
Jing Ma (NICT): "Further Consideration on Receive Behaviour Based on the Cascading Structure and the BSS Color Scheme", IEEE Draft, Sep. 15, 2015, vol. 802.11ax, No. 3, XP068098303, pp. 1-11.
Gupta A.K., et al., "Performance Indicators in a 802.11 WLAN Deployment", 2009 International Conference on Advances in Recent Technologies in Communication and Computing, Oct. 28, 2009, pp. 490-494.
Hesong L., "Wireless Mesh Network Multi-Channel", MAC Protocol Research, Wanfang, Dec. 29, 2010, 71 pages.
Ma J., "Further Consideration on Receive Behavior based on the Cascading Structure and the BSS Color Scheme", IEEE 802.11-15/1081r4, Sep. 30, 2015, 11 pages.

* cited by examiner

TECHNIQUES FOR BASIC SERVICE SET ATTRIBUTE DETECTION AND RESOLUTION

CROSS REFERENCES

The present application for patent claims priority to U.S. Provisional Patent Application No. 62/349,644 by Patil, et al., entitled "Techniques For Basic Service Set Color Collision Detection and Resolution," filed Jun. 13, 2016, assigned to the assignee hereof.

BACKGROUND

The following relates generally to basic service set (BSS) attribute, color, or beacon collision detection and resolution for wireless communications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

In some wireless communications, different devices (e.g., APs) each associated with a different BSS may select overlapping BSS identifiers. As a result, in some examples, STAs associated with a first device (e.g., an AP) and a first BSS may have limited channel access opportunities based on incorrect interpretation of BSS channel information associated with a second device (e.g., an AP) and a second BSS, which may lead the STAs to incorrectly interpret received information and enter an incorrect power state based on the information, among other problems.

SUMMARY

The described techniques relate to methods, systems, devices, and apparatuses that support BSS attribute collision detection and resolution. Generally, the described techniques provide for identifying a first attribute value associated with a first AP, receiving a second attribute value, and determining that the first attribute value associated with the first AP is the same as the received second attribute value. The second attribute value may be associated with a second AP. In some examples, the first attribute value, the second attribute value, or both may be a BSS color. An attribute value may be an n-bit value, where n is an integer. In some implementations, the n-bit value may identify a BSS color. In some implementations, the n-bit value may also indicate a status of a BSS color (e.g., that a BSS color is enabled or disabled). In some examples, disabling a BSS color may include suspending the BSS color for a duration. For example, an AP may detect a BSS color collision and suspend the BSS color for a period (e.g., a number of beacon intervals). In some cases, the AP may monitor the BSS color collision during the period to determine whether the BSS color collision is persisting. Alternatively, the AP may disable the BSS color based on the monitoring, i.e., after determining that the BSS color collision still exists. The AP may also, in some cases, based on the BSS color collision continuing for a duration satisfying a threshold value (e.g., threshold period) may change the BSS color. In some cases, the AP may alternatively, unsuspend the BSS color if the AP determines that the BSS color collision no longer exists.

The BSS color may be a non-zero value. In other implementations, the n-bit value may indicate a BSS identifier (BSSID) (e.g., a medium access control (MAC) address associated with an AP). The n-bit value also may indicate a service set identifier (SSID) of a BSS. In some examples, the first attribute value associated with the first AP, the second attribute value, or both may identify a BSS in a physical (PHY) layer header. For example, the BSS may be embedded in a field of the PHY layer header of a data packet or beacon. In some implementations, the attribute value may be associated with a BSS color field of the PHY layer header unique to each BSS.

An AP may be associated with a BSS. BSS collision may occur when two APs associated with different BSSs are using a same attribute value, which may or may not be a BSS color. For example, a first AP of a first BSS may be using a first attribute value, and a second AP of a second BSS may be using a second attribute value that is equivalent to the first attribute value. In this implementation, the attribute values of the first BSS and the second BSS may be a same n-bit value. The n-bit value may identify a BSS color associated with the first BSS and a BSS color associated with the second BSS. Additionally or alternatively, the attribute value of the first BSS and the second BSS may include a same or different ID in addition to a BSS color. For example in the implementation of an extended service set (ESS), a first AP and a second AP may have a same ESSID, but may have different BSS colors associated with the individual BSS of the first AP and the second AP.

A first AP may identify a first BSS color associated with the first AP, receive BSS color information including a second BSS color associated with another AP, determine that the first BSS color is the same as the second BSS color, and detect a BSS color collision based on the two APs being associated with the same BSS color. The described techniques also relate to identifying a first BSSID associated with the first AP, identifying a second BSSID associated with the second AP from a received frame from a STA, and determining that the first BSSID is different from the second BSSID, and detecting a BSS color collision based on the two APs being associated with the same BSS color and each being associated with different BSSIDs.

Two BSSs may be neighboring BSSs, and as such the two APs (e.g., the first AP and the second AP) may be communicating with a STA simultaneously. For example, a STA in an overlapping BSS (OBSS) part of the neighboring BSSs may be receive communication from both the first and second APs. In the implementation where both APs have the same attribute value, the STA may receive and process communications (e.g., data packets, beacons, probe response frames, association frames) from both APs. Processing communications from both APs may result in the STA consuming excessive power and decreasing communication efficiency.

A STA in an OBSS may detect a BSS collision. The STA may compare an attribute value of a first AP and an attribute value of a second AP. The first AP may be associated with a first BSS, and the second AP may be associated with a second BSS. The STA may receive the attribute values from the first AP and the second AP directly, or indirectly via one or more other STAs of the first BSS or the second BSS. In some examples, a STA may identify a first BSS color associated with a first AP, and may receive BSS color information including a second BSS color associated with a second AP. In some implementations, this second BSS color and related color information may be received from another STA or directly from the second AP. The STA may determine that the first BSS color is the same as the second BSS color. The STA also may identify or receive information indicating a first BSSID associated with the first AP, and identify or receive information indicating a second BSSID associated with the second AP. The STA may determine that the first BSSID is different from the second BSSID, while also having identified that the BSS colors overlap. Thus, the STA may determine a BSS color collision exists and initiate at least one operation based on the BSS color collision.

Based on detecting a BSS collision, a device (e.g., STA, AP) may notify other associated devices (e.g., STAs, APs) of this overlap so that at least some of the devices may cease using an attribute value for power save or channel access decisions, and facilitate attribute value adjustment and correction to eliminate the BSS collision. For example, a STA may detect BSS collision and transmit a message to a first and second AP indicating the detected BSS collision. The first AP or second AP, or both may receive the message and modify the corresponding attribute value, accordingly. As a result, when the STA receives subsequent attribute values (e.g., modified attribute values) from the first AP and the second AP, the STA will be able to distinguish between the first BSS and the second BSS; and thus process communications accordingly without unnecessary consumption of additional power or reduction of communication efficiency. The present techniques and methods may be performed by at least an AP, a STA, multiple devices alone or in combination, or some combination thereof.

A method of wireless communications is described. The method may include identifying, at a first AP, a first attribute value associated with the first AP, receiving, at the first AP, a second attribute value, and determining, at the first AP, that the first attribute value associated with the first AP is the same as the received second attribute value.

An apparatus for wireless communications is described. The apparatus may include means for identifying, at a first AP, a first attribute value associated with the first AP, means for receiving, at the first AP, a second attribute value, and means for determining, at the first AP, that the first attribute value associated with the first AP is the same as the received second attribute value.

Another apparatus for wireless communications is described. The apparatus may include a processor, memory in electronic communication with the processor, and instructions stored in the memory. The instructions may be operable to cause the apparatus to identify a first attribute value associated with the apparatus, receive a second attribute value, and determine that the first attribute value associated with the apparatus is the same as the received second attribute value.

A non-transitory computer readable medium for wireless communications is described. The non-transitory computer-readable medium may include instructions operable to cause a processor to identify a first attribute value associated with a first AP, receive a second attribute value, and determine that the first attribute value associated with the first AP is the same as the received second attribute value.

In some examples of the method, apparatus, and non-transitory computer-readable medium described above, the first attribute value associated with the first AP, or the received second attribute value, or both identifies a BSS in a PHY layer header. In some examples of the method, apparatus, and non-transitory computer-readable medium described above, the second attribute value is associated with a second AP. Some examples of the method, apparatus, and non-transitory computer-readable medium described above may further include processes, features, means, or instructions for identifying, at the first AP, a first BSSID associated with the first AP; identifying a second BSSID associated with the second AP from a received frame; and determining that the first BSSID is different from the second BSSID based at least in part on the identifying.

In some examples of the method, apparatus, and non-transitory computer-readable medium described above, the first attribute value includes a first BSS color and the received second attribute value includes a second BSS color. Some examples of the method, apparatus, and non-transitory computer-readable medium described above may further include processes, features, means, or instructions for detecting, at the first AP, a BSS color collision based at least in part on determining that the first attribute value associated with the first AP is the same as the received second attribute value.

Some examples of the method, apparatus, and non-transitory computer-readable medium described above may further include processes, features, means, or instructions for determining that the BSS color collision continues for a duration that satisfies a threshold period; and transmitting BSS color collision information to a station served by the first AP based at least in part on determining that the BSS color collision continues for the duration. In some examples of the method, apparatus, and non-transitory computer-readable medium described above, the BSS color collision information is transmitted in a delivery traffic indication message (DTIM) beacon, a probe response frame, an association response frame, or a combination thereof.

Some examples of the method, apparatus, and non-transitory computer-readable medium described above may further include processes, features, means, or instructions for transmitting the BSS color collision information during at least a next DTIM period. Some examples of the method, apparatus, and non-transitory computer-readable medium described above may further include processes, features, means, or instructions for disabling, at the first AP, a BSS color via at least one bit in a BSS color field transmitted in the DTIM beacon, the probe response frame, the association response frame, or a combination thereof based at least in part on determining that the BSS color collision continues for the duration.

Some examples of the method, apparatus, and non-transitory computer-readable medium described above may further include processes, features, means, or instructions for adjusting the first BSS color associated with the first AP to a different BSS color based at least in part on determining that the detected BSS color collision continues for a duration that satisfies a threshold value. In some examples of the method, apparatus, and non-transitory computer-readable medium described above, adjusting the first BSS color associated with the first access point includes enabling or disabling the first BSS color. Some examples of the method, apparatus, and non-transitory computer-readable medium described above may further include processes, features, means, or instructions for transmitting BSS color information in a DTIM beacon, a probe response frame, an association response frame, or a special frame, or a combination thereof based at least in part on the adjusted first BSS color to at least one station served by the first AP.

In some examples of the method, apparatus, and non-transitory computer-readable medium described above, the BSS color information includes a BSS color change announcement including a reference time when a BSS color change will occur and an indication of a new BSS color selected by the first AP. In some examples of the method, apparatus, and non-transitory computer-readable medium described above, the reference time is a countdown value associated with a target beacon transmission time (TBTT).

Some examples of the method, apparatus, and non-transitory computer-readable medium described above may further include processes, features, means, or instructions for generating a random BSS color different from the first BSS color, wherein adjusting the first BSS color is based at least in part on the random BSS color. In some examples of the method, apparatus, and non-transitory computer-readable medium described above, the adjusting the first BSS color includes selecting a new BSS color associated with the first AP based at least in part on at least one BSS color associated with an OBSS, the selected new BSS color includes a non-overlapping BSS color distinct from the BSS color associated with the OBSS.

Some examples of the method, apparatus, and non-transitory computer-readable medium described above may further include processes, features, means, or instructions for generating a color in a range. In some examples of the method, apparatus, and non-transitory computer-readable medium described above, selecting the new BSS color is based at least in part on the generated color. Some examples of the method, apparatus, and non-transitory computer-readable medium described above may further include processes, features, means, or instructions for transmitting an event request, requesting BSS color information, to a STA; receiving other BSS color information associated with a second AP based at least in part on the transmitted event request; identifying an additional BSS color associated with the second AP from the received other BSS color information; and transmitting a second color in the range based at least in part on identified additional BSS color associated with the second AP from the received other BSS color information.

Some examples of the method, apparatus, and non-transitory computer-readable medium described above may further include processes, features, means, or instructions for transmitting an event request requesting BSS color information to a STA. In some examples of the method, apparatus, and non-transitory computer-readable medium described above, receiving BSS color information associated with a second AP is based at least in part on a response to the transmitted event request.

Some examples of the method, apparatus, and non-transitory computer-readable medium described above may further include processes, features, means, or instructions for transmitting a query requesting BSS color information associated with one or more neighboring BSSs to one or more STAs associated with the first AP; receiving the BSS color information associated with the one or more neighboring BSSs based at least in part on a response to the transmitted query; determining that a color collision exists between at least one neighboring BSS and the first AP based at least in part on the received BSS color information; and selecting, at the first AP, a new BSS color including a non-overlapping BSS color distinct from a BSS color indicated in the received BSS color information associated with the at least one neighboring BSS based at least in part on determining that the color collision exists.

In some examples of the method, apparatus, and non-transitory computer-readable medium described above, transmitting the query includes transmitting the query to one or more STAs based at least in part on a coverage area associated with the first AP, the one or more STAs, or both. In some examples of the method, apparatus, and non-transitory computer-readable medium described above, receiving the second attribute value includes receiving a frame from a device, wherein the device includes a neighboring AP, a device participating in a neighboring BSS or a OBSS.

Another method of wireless communications is described. The method may include identifying, at a first AP, a first BSS color associated with the first AP, receiving, at the first AP, BSS color information including a second BSS color associated with a second AP, determining, at the first AP, that the first BSS color is the same as the second BSS color, and detecting, at the first AP, a BSS color collision based at least in part on the determining.

Another apparatus for wireless communications is described. The apparatus may include means for identifying a first BSS color associated with the first AP, means for receiving BSS color information including a second BSS color associated with a second AP, means for determining that the first BSS color is the same as the second BSS color, and means for detecting a BSS color collision based at least in part on the determining.

Another apparatus for wireless communications is described. The apparatus may include a processor, memory in electronic communication with the processor, and instructions stored in the memory. The instructions may be operable to cause the apparatus to identify a first BSS color associated with the first AP, receive BSS color information including a second BSS color associated with a second AP, determine that the first BSS color is the same as the second BSS color, and detect a BSS color collision based at least in part on the determining.

Another non-transitory computer readable medium for wireless communications is described. The non-transitory computer-readable medium may include instructions operable to cause a processor to identify, at a first AP, a first BSS color associated with the first AP, receive, at the first AP, BSS color information including a second BSS color associated with a second AP, determine, at the first AP, that the first BSS color is the same as the second BSS color, and detect, at the first AP, a BSS color collision based at least in part on the determining.

Some examples of the method, apparatus, and non-transitory computer-readable medium described above may further include processes, features, means, or instructions for identifying, at the first AP, a first BSSID associated with the first AP. Some examples of the method, apparatus, and non-transitory computer-readable medium described above may further include processes, features, means, or instructions for identifying a second BSSID associated with the second AP from a received frame. Some examples of the method, apparatus, and non-transitory computer-readable medium described above may further include processes, features, means, or instructions for determining that the first BSSID may be different from the second BSSID based at least in part on the identifying.

Some examples of the method, apparatus, and non-transitory computer-readable medium described above may further include processes, features, means, or instructions for transmitting BSS color collision information to a station served by the first AP. Some examples of the method, apparatus, and non-transitory computer-readable medium described above may further include processes, features, means, or instructions for transmitting BSS color collision information during a next delivery traffic indication message (DTIM) period.

In some examples of the method, apparatus, and non-transitory computer-readable medium described above, the BSS color collision information includes a BSS color value based at least in part on the determined BSS color collision. In some examples of the method, apparatus, and non-transitory computer-readable medium described above, the BSS color value includes a predetermined value. In some examples of the method, apparatus, and non-transitory computer-readable medium described above, the transmitting BSS color collision information may be independent of a bit indicating the detected BSS color collision. In some examples of the method, apparatus, and non-transitory computer-readable medium described above, the BSS color collision information includes a single bit storing a value indicating the detected BSS color collision.

Some examples of the method, apparatus, and non-transitory computer-readable medium described above may further include processes, features, means, or instructions for adjusting a first BSS color value associated with the first AP based at least in part on the detected BSS color collision. Some examples of the method, apparatus, and non-transitory computer-readable medium described above may further include processes, features, means, or instructions for transmitting BSS color information based at least in part on the adjusted first BSS color value to at least one station served by the first AP.

Some examples of the method, apparatus, and non-transitory computer-readable medium described above may further include processes, features, means, or instructions for transmitting BSS color information during a next DTIM period. Some examples of the method, apparatus, and non-transitory computer-readable medium described above may further include processes, features, means, or instructions for generating a random BSS color value different from the first BSS color value, wherein adjusting the first BSS color value may be based at least in part on the random BSS color value.

In some examples of the method, apparatus, and non-transitory computer-readable medium described above, the received BSS color information may be associated with the second AP. In some examples of the method, apparatus, and non-transitory computer-readable medium described above, the adjusting the first BSS color value includes selecting a new BSS color associated with the first AP based at least in part on the second BSS color associated with the second AP.

In some examples of the method, apparatus, and non-transitory computer-readable medium described above, the new BSS color includes a non-overlapping BSS color distinct from the second BSS color associated with the second AP. Some examples of the method, apparatus, and non-transitory computer-readable medium described above may further include processes, features, means, or instructions for generating a color value in a range, wherein selecting the new BSS color may be based at least in part on the generated color value.

Some examples of the method, apparatus, and non-transitory computer-readable medium described above may further include processes, features, means, or instructions for transmitting an event request requesting BSS color information to a station. Some examples of the method, apparatus, and non-transitory computer-readable medium described above may further include processes, features, means, or instructions for receiving other BSS color information associated with the second AP based at least in part on the transmitted event request. Some examples of the method, apparatus, and non-transitory computer-readable medium described above may further include processes, features, means, or instructions for identifying an additional BSS color associated with the second AP from the received other BSS color information. Some examples of the method, apparatus, and non-transitory computer-readable medium described above may further include processes, features, means, or instructions for transmitting a second color value in the range based at least in part on the identifying the additional BSS color associated with the second AP from the received other BSS color information.

Some examples of the method, apparatus, and non-transitory computer-readable medium described above may further include processes, features, means, or instructions for transmitting an event request requesting BSS color information to a station, wherein receiving BSS color information associated with the second AP may be based at least in part on a response to the transmitted event request. Some examples of the method, apparatus, and non-transitory computer-readable medium described above may further include processes, features, means, or instructions for transmitting a query requesting BSS color information to a device, the device including: the second AP in communication range with the first AP, wherein receiving the BSS color information may be based at least in part on a response to the transmitted query.

In some examples of the method, apparatus, and non-transitory computer-readable medium described above, transmitting the query includes transmitting the query to the second AP based at least in part on a coverage area associated with the first AP. In some examples of the method, apparatus, and non-transitory computer-readable medium described above, transmitting the query includes transmitting the query to the second AP via a station based at least in part on a coverage area associated with the first AP, or the station, or a combination thereof.

Some examples of the method, apparatus, and non-transitory computer-readable medium described above may further include processes, features, means, or instructions for adjusting the first BSS color associated with the first AP to a value different from the second BSS color associated with the second AP. In some examples of the method, apparatus, and non-transitory computer-readable medium described above, the transmitted query includes a probe request. Some examples of the method, apparatus, and non-transitory computer-readable medium described above may further include processes, features, means, or instructions for setting the first BSS color associated with the first AP based at least in part on an absence of a response to the transmitted query.

Some examples of the method, apparatus, and non-transitory computer-readable medium described above may further include processes, features, means, or instructions for maintaining the first BSS color associated with the first AP at a same value. Some examples of the method, apparatus, and non-transitory computer-readable medium described above may further include processes, features, means, or instructions for transmitting color information based at least in part on the maintained first BSS color to a station.

In some examples of the method, apparatus, and non-transitory computer-readable medium described above, receiving the BSS color information includes receiving a frame from a device, wherein the device includes the second AP in communication range with the first AP. In some examples of the method, apparatus, and non-transitory computer-readable medium described above, the received frame includes a beacon, or a management frame element, or a probe response, or an association response, or a combination thereof.

A method of wireless communications is described. The method may include identifying, at a STA, a first attribute value associated with a first AP; receiving, at the STA, a frame including a second attribute value; and identifying, at the STA, that the first attribute value and the received second attribute value are the same.

An apparatus for wireless communications is described. The apparatus may include means for identifying, at a STA, a first attribute value associated with a first AP; means for receiving, at the STA, a frame including a second attribute value; and means for identifying, at the STA, that the first attribute value and the received second attribute value are the same.

Another apparatus for wireless communications is described. The apparatus may include a processor, memory in electronic communication with the processor, and instructions stored in the memory. The instructions may be operable to cause the processor to identify a first attribute value associated with a first AP; receive a frame including a second attribute value; and identify that the first attribute value and the received second attribute value are the same.

A non-transitory computer readable medium for wireless communications is described. The non-transitory computer-readable medium may include instructions operable to cause a processor to identify a first attribute value associated with a first AP; receive a frame including a second attribute value; and identify that the first attribute value and the received second attribute value are the same.

Some examples of the method, apparatus, and non-transitory computer-readable medium described above may further include processes, features, means, or instructions for identifying, at the station, a first BSSID associated with the first AP; identifying, at the station, a second BSSID associated with a second AP from the second attribute value; and determining, at the station, that the first BSSID is different from the second BSSID based at least in part on the identifying.

In some examples of the method, apparatus, and non-transitory computer-readable medium described above, the first attribute value includes a first BSS color and the received second attribute value includes a second BSS color. Some examples of the method, apparatus, and non-transitory computer-readable medium described above may further include processes, features, means, or instructions for detecting, at the station, a BSS color collision based at least in part on the identifying that the first attribute value associated with the first AP is the same as the received second attribute value.

Some examples of the method, apparatus, and non-transitory computer-readable medium described above may further include processes, features, means, or instructions for transmitting a message indicating the detected BSS color collision; and receiving from the first access point a message indicating that the first BSS color is disabled based at least in part on the transmitted message indicating the detected BSS color collision. In some examples of the method, apparatus, and non-transitory computer-readable medium described above, the transmitted message includes transmitting an event report frame including an event report element to the first AP based at least in part on the determined BSS color collision, the event report is generated autonomously or in response to a request from the AP. In some examples of the method, apparatus, and non-transitory computer-readable medium described above, the event report element includes at least an event report field including a bitmap including one or more bits where at least some of the one or more bits indicate a color selected by an OBSS. In some examples of the method, apparatus, and non-transitory computer-readable medium described above, the event report element includes at least an event report field including a bitmap including one or more bits where at least some of the one or more bits indicate BSSID information, or BSS color information, or a BSS color collision detected, or beacon collision detected associated with two or more APs of an OBSS, or a combination thereof. In some examples of the method, apparatus, and non-transitory computer-readable medium described above, the event report element includes at least an event report field identifying BSSID information, or BSS color information, or a detected BSS color collision, or a combination thereof associated with at least one AP currently in communication range with the station, or previously in communication range of the station, or a combination thereof.

In some examples of the method, apparatus, and non-transitory computer-readable medium described above, the event report element includes at least one event report field identifying BSSID information, or BSS color information, or a detected BSS color collision, or a combination thereof associated with a first device in a first BSS and identifying BSSID information, or BSS color information, or a detected BSS color collision, or a combination thereof associated with a second device in a second BSS.

Another method of wireless communications is described. The method may include identifying, at a station, a first BSS color associated with a first AP, receiving, at the station, a frame containing a BSS color information including a second BSS color associated with a second AP, identifying, at the station, that the first BSS color associated with the first AP and the second BSS color associated with the second AP are the same, identifying, at the station, a first BSSID associated with the first AP, identifying, at the station, a second BSSID associated with the second AP from the BSS color information, determining, at the station, that the first BSSID is different from the second BSSID based at least in part on the identifying, and detecting, at the station, a BSS color collision based at least in part on the determination.

Another apparatus for wireless communications is described. The apparatus may include means for identifying a first BSS color associated with a first AP, means for receiving a frame containing a BSS color information including a second BSS color associated with a second AP, means for identifying that the first BSS color associated with the first AP and the second BSS color associated with the second AP are the same, means for identifying a first BSSID associated with the first AP, means for identifying a second BSSID associated with the second AP from the BSS color information, means for determining that the first BSSID is different from the second BSSID based at least in part on the identifying, and means for detecting a BSS color collision based at least in part on the determination.

Another apparatus for wireless communications is described. The apparatus may include a processor, memory in electronic communication with the processor, and instructions stored in the memory. The instructions may be operable to cause the processor to identify a first BSS color associated with a first AP, receive a frame containing a BSS color information including a second BSS color associated with a second AP, identify that the first BSS color associated with the first AP and the second BSS color associated with the second AP are the same, identify a first BSSID associated with the first AP, identify a second BSSID associated with the second AP from the BSS color information, determine that the first BSSID is different from the second BSSID based at least in part on the identifying, and detect a BSS color collision based at least in part on the determination.

Another non-transitory computer readable medium for wireless communications is described. The non-transitory computer-readable medium may include instructions operable to cause a processor to identify, at a station, a first BSS color associated with a first AP, receive, at the station, a frame containing a BSS color information including a second BSS color associated with a second AP, identify, at the station, that the first BSS color associated with the first AP and the second BSS color associated with the second AP are the same, identify, at the station, a first BSSID associated with the first AP, identify, at the station, a second BSSID associated with the second AP from the BSS color information, determine, at the station, that the first BSSID is different from the second BSSID based at least in part on the identifying, and detect, at the station, a BSS color collision based at least in part on the determination.

Some examples of the method, apparatus, and non-transitory computer-readable medium described above may further include processes, features, means, or instructions for transmitting a message indicating the detected BSS color collisions. In some examples of the method, apparatus, and non-transitory computer-readable medium described above, the transmitted message includes transmitting an event report frame including an event report element to the first AP based at least in part on the determined BSS color collision, the event report is generated autonomously or in response to a request from the AP.

In some examples of the method, apparatus, and non-transitory computer-readable medium described above, the event report element includes an event report field identifying BSSID information, or BSS color information, or a BSS color collision detected by the second AP, or a combination thereof. In some examples of the method, apparatus, and non-transitory computer-readable medium described above, the event report element includes at least an event report field identifying BSSID information, or BSS color information, or a detected BSS color collision, or a combination thereof associated with at least one AP currently in communication range with the station, or previously in communication range of the station, or a combination thereof.

In some examples of the method, apparatus, and non-transitory computer-readable medium described above, the event report element includes at least one event report field identifying BSSID information, or BSS color information, or a detected BSS color collision, or a combination thereof associated with a first device in a first BSS and identifying BSSID information, or BSS color information, or a detected BSS color collision, or a combination thereof associated with a second device in a second BSS. In some examples of the method, apparatus, and non-transitory computer-readable medium described above, the event report element includes an event token enabling autonomous reporting by the station to the first AP.

DETAILED DESCRIPTION

Figure 1:
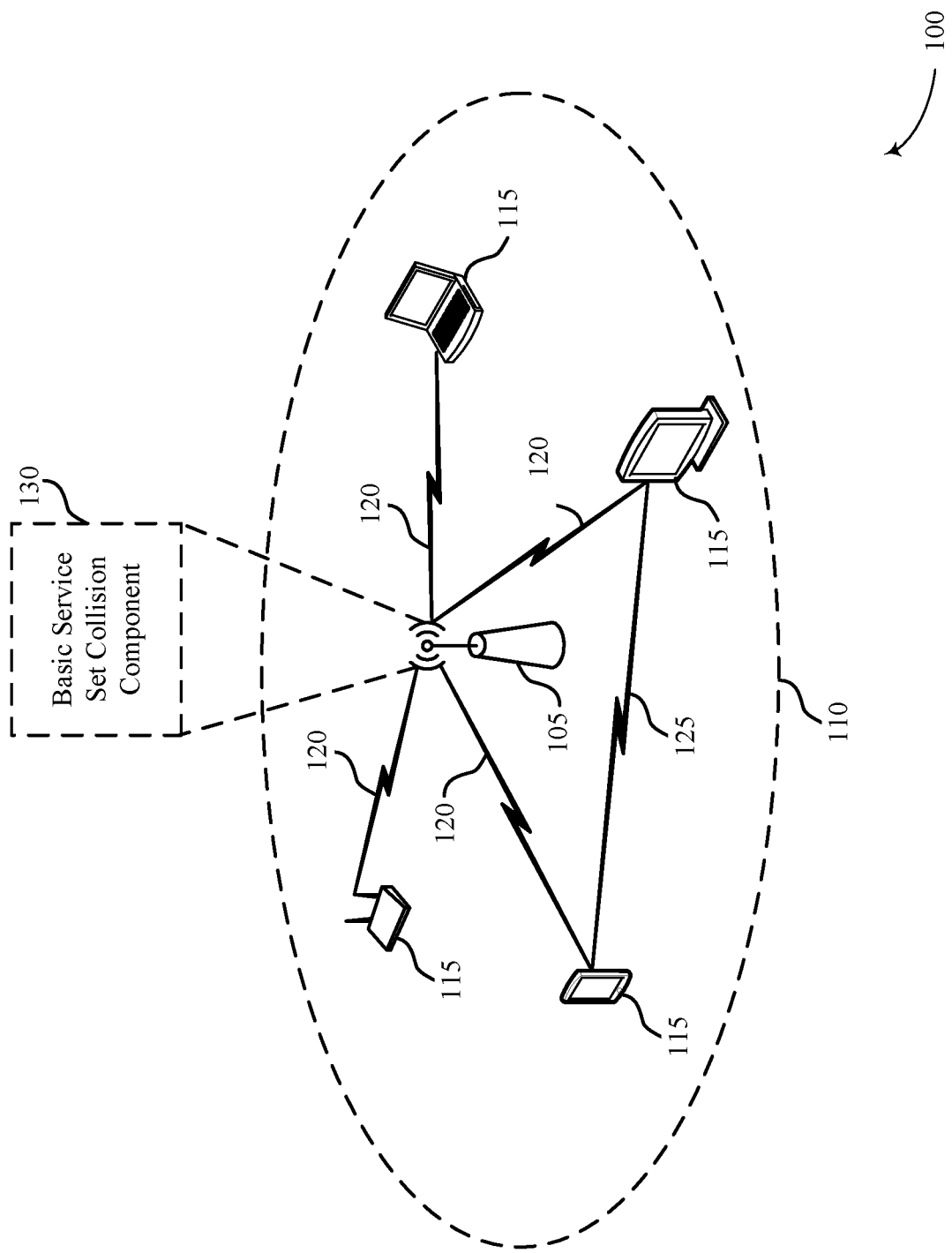
FIG. 1 illustrates an example of a system for wireless communications that supports BSS collision detection and resolution in accordance with aspects of the present disclosure.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications, an attribute value associated with a BSS may help a station (STA) to identify whether a packet may be received from within a STA's BSS (or overlapping BSS (OBSS)). An attribute value may be an n-bit value, where n is an integer. In some implementations, the n-bit value may identify a BSS color. The n-bit value may, additionally or alternatively, indicate BSS color information such as a BSSID, ESSID, SSID, or a combination thereof via multiple-bits. Additionally or alternatively, the n-bit value may also indicate a status of a BSS color (e.g., that a BSS color is enabled or disabled). In some implementations, a device (e.g., a STA) may be associated with a first device (e.g., a serving access point (AP)) having a first BSS color that can be indicated as an n-bit value in a PHY layer header, but may receive an attribute value from a second device (e.g., another AP) indicating a second BSS color that is overlapping with the first BSS color—creating a BSS color collision.

In this implementation, the device may examine incorrect BSS attribute value(s) (e.g., color) (which may be present in a header, such as a PHY layer header) based on this collision and may incorrectly enter a power save mode by mistake or make other incorrect determinations. In some examples, it is helpful when devices detect BSS attribute value (e.g., BSS color, BSSID, MAC address, ESSID) overlap and notify other associated devices (e.g., STAs, APs) of this overlap so that at least some of the devices may cease using an attribute value for power save or channel access decisions, and facilitate attribute value adjustment and correction to eliminate the BSS collision.

In some implementations, the present techniques may be performed by or facilitated by at least an AP, a STA, or some combination of each of these or other devices. In some examples, a first AP may identify a first attribute value associated with itself, receive a second attribute value, and determine that the first attribute value associated with itself is the same as the received second attribute value. The second attribute value may be associated with a second AP. The first AP may be associated with a first BSS and the second AP may be associated with a second BSS. In this implementation, the attribute values of the first BSS and the second BSS may be a same n-bit value. The n-bit value may identify a BSS color associated with the first BSS and a BSS color associated with the second BSS. Additionally or alternatively, the attribute value of the first BSS and the second BSS may include a same or different ESSID, SSID, etc. in addition to the BSS color.

In some examples, an AP may identify a first BSS color associated with itself, and may receive BSS color information including a second BSS color associated with a second AP. In some implementations, this second BSS color and related color information may be received from at least a STA, or the second AP, or a combination thereof. The first AP may determine that the first BSS color is the same as the second BSS color, and detect a BSS color collision when the BSS colors are the same. The first AP may identify or receive information indicating a first BSSID associated with the first AP, and identify or receive information indicating a second BSSID associated with the second AP. The first AP may determine that the first BSSID is different from the second BSSID. By doing so, the first AP may determine a BSS color collision exists based on an overlapping BSS color information or associated different BSSIDs, or both.

Two or more BSSs may be neighboring BSSs, and as such two or more APs (e.g., the first AP and the second AP) may be communicating with a STA simultaneously. For example, a STA in an OBSS of the neighboring BSSs may be receive communication from both the first and second APs. In the implementation where both APs have the same attribute value, the STA may receive and process communications (e.g., data packets, beacons, probe response frames, association frames) from both APs. Processing communications from both APs may result in the STA consuming excessive power and decreasing communication efficiency.

A STA in an OBSS may detect a BSS collision. The STA may compare an attribute value of a first AP and an attribute value of a second AP. The first AP may be associated with a first BSS, and the second AP may be associated with a second BSS. The STA may receive the attribute values from the first AP and the second AP directly, or indirectly via one or more other STAs of the first BSS or the second BSS. Alternatively or additionally, a STA may perform these operations to determine a BSS color collision and initiate at least one operation based on the BSS color collision, such as transmitting information in a message or a frame to an AP.

In some examples, a STA may identify a first BSS color associated with the first AP, and may receive BSS color information including a second BSS color associated with the second AP. In some implementations, this second BSS color and related color information may be received from at least another STA, or the second AP, or a combination of these. The STA may determine that the first BSS color is the same as the second BSS color. The STA also may identify or receive information indicating a first BSSID associated with the first AP, and identify or receive information indicating a second BSSID associated with the second AP, including information from a received frame transmitted from a STA or another AP. The STA may determine that the first BSSID is different from the second BSSID, while also having identified that the BSS colors overlap. The STA may detect a BSS color collision exists and initiate at least one operation based on the BSS color collision.

An AP, a STA, multiple devices alone or in combination, or some combination thereof also may determine that a BSS color collision continues for a duration that satisfies a threshold period. For example, a STA may be roaming throughout a wireless communication network, and thus be exposed to multiple BSSs. Alternatively, in some examples, an AP, a STA, multiple devices alone or in combination, or some combination thereof also may disable a BSS color based on a BSS color collision continuing for a duration that satisfies a threshold period. The BSS color disabled operation may be indicated to a STA as a modified attribute value. For example, if an AP, or a STA, or both determine that a BSS color collision continues for an extended interval (e.g., a number of beacon intervals, a duration), the AP or the STA may disable a BSS color to reduce consuming excessive power and avoid decreasing communication efficiency. In some cases, an AP, or STA, or both may determine to perform a BSS color change based on the BSS color collision continuing for a duration that satisfies a threshold period (e.g., a number of beacon intervals). For example, if the BSS color collision continues for the threshold period, the AP or the STA may perform a BSS color change. Additionally or alternatively, an AP or a STA may disable a BSS color based on determining that a BSS color collision continues for a first threshold period, and perform a BSS color change based on determining that the BSS color collision continues for a second threshold period.

In some implementations, the STA may enter an OBSS and receive attribute values at a first time from different APs of a BSS associated with the OBSS. The STA may compare the attribute values received from the different APs, and identify that the attribute values are the same. The attribute values may indicate a BSS color associated with each of the APs. In the implementation the BSS colors associated with each of the APs are the same, the STA may detect a BSS color collision and transmit a message to the APs indicating the BSS color collision. In some cases, an attribute value may indicate whether a BSS color is disabled or enabled.

The STA may delay transmitting the message to the APs for a duration to conserve transmission power, among other operating characteristics. For example, in the implementation of roaming if the STA is mobile, the STA at a second time may receive attribute values from the same APs or some new APs of a new BSS that may be associated with different attribute values. If the received attribute values at the second time are different, the STA may ignore transmitting the message and communicate with one or more of the APs, accordingly. Alternatively, if the duration satisfies the threshold value (e.g., n seconds, n minutes, where n is an integer) before the STA receives a new attribute value from a new BSS, the STA may transmit the message including BSS color collision information to the APs or another STA of the associated BSSs. The BSS color collision information may be transmitted in a beacon (e.g., a DTIM beacon), a probe response frame, an association response frame, or a combination thereof.

Additionally or alternatively, a STA may report beacon collision. For example, in an OBSS beacons transmitted by a first AP may be colliding with beacons transmitted by a neighboring AP. In some examples, the STA may detect the beacon collision and transmit a report indicating the beacon collision to the first AP or the neighboring AP, or both. In some examples, the STA may report the beacon collision in addition to the detected BSS color collision. For example, a bit or a subfield of a data frame may indicate a BSS color collision, and another bit or subfield of the data frame may indicate the beacon collision. In some examples, a bit or a subfield of a data frame may also indicate that a BSS color is disabled. Additionally or alternatively, a STA may indicate in a bit of subfield or field of a data frame the type or report. For example, the STA may indicate that the event report is a BSS color collision report or that the event report is a beacon collision report. In the implementation that the event report includes both the BSS color collision and beacon collision report, the STA also may indicate this with at least one bit or in a subfield or field of a data frame.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile STAs, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a basic service area (BSA) of the WLAN 100. An extended network STA (not shown) associated with the WLAN 100 may be connected to a wired or wireless distribution system that may allow multiple APs 105 to be connected in an ESS.

AP 105 may include a BSS Collision Component 130, which may enable AP 105 to detect BSS collision. An AP 105 may identify a first attribute value associated with itself. An attribute value may be an n-bit value, where n is an integer. The n-bit value may indicate a BSS identifier (BSSID) (e.g., a MAC address associated with AP 105). The n-bit value also may indicate a service set identifier (SSID) of a BSS, or an ESS identifier (ESSID). In some implementations, the n-bit value may identify a BSS color. The BSS color may identify a BSS. In some implementations, one or more STAs 115 may use the BSS color to identify a BSS associated with AP 105. Additionally or alternatively, one or more STAs 115 may use the BSS color to identify a physical layer convergence procedure (PLCP) protocol data unit (PPDU) originating from the BSS. One or more STAs may use the PPDU to identify and use channel access rules or reduce power consumption, or both.

AP 105 may include a bitmap. The bitmap may include one or more bits identifying BSS information. For example, one or more bits of the bitmap may identify a BSS color, an SSID, and an ESSID, or a combination thereof. AP 105 may receive a second attribute value. The second attribute value may be associated with another AP (not shown). In some examples, AP 105 may receive the second attribute value directly from another AP, or indirectly from one or more STAs 115. AP 105 may determine that the first attribute value associated with itself and the received second attribute value is the same. AP 105 may determine an occurrence of a BSS collision based on determining that the first attribute value is the same as the second attribute value.

In some examples, AP 105 may use BSS Collision Component 130 to detect BSS color collisions based on attribute values, BSS color information, BSSID information, other information or some combination. BSS Collision Component 130 may, additionally or alternatively, enable transmitting BSS color collision information to a STA 115 served by AP 105, adjusting or selecting a first BSS color associated with AP 105 (e.g., enabling or disabling the first BSS color associated with AP 105 and/or enabling or disabling a second BSS color), transmitting a query requesting BSS color information to at least one other device, or receiving a frame from a second AP (not shown) in communication range with AP 105, or both. Although not shown in FIG. 1, in some examples, other devices including at least one STA 115 may additionally or alternatively include a BSS Collision Component 130, as described in accordance with aspects of the present disclosure.

AP 105 may detect a BSS color collision based on determining that a first attribute value associated with the AP 105 is the same as a received second attribute value. The first attribute value may be a BSS color. In some cases, the second attribute value may be received from another AP or STA 115. The second attribute value may similarly be a BSS color. In some cases the BSS color of the AP 105 and the BSS color received from another AP or STA 115 may be same or different. The AP 105 may monitor the BSS color collision for a duration. In some cases, the AP 105 may determine that the BSS color collision continues for a duration that satisfies a threshold period. The AP 105 may, based on the BSS color collision persisting for the duration satisfying the threshold period, adjust a TBTT. Additionally, the AP 105 may change a BSS color or enable or disable a BSS color for a duration. The AP 105 may indicate the BSS color change or the enabling or disabling of the BSS color to another AP or the STA 115. For example, an AP may advertise to a STA the BSS color change or enabling or disabling of the BSS color in a frame (e.g., beacon frame) during the adjusted TBTT. In some cases, the AP may indicate to the STA the adjusted TBTT prior to advertising the BSS color change or disabling/enabling of a BSS color.

STA 115 may receive a frame (e.g., a beacon frame) and adjust a TBTT based on identifying the TBTT adjustment in a bit of a field in an element of the frame. In the case that STA 115 is target wake time (TWT) STA, the STA 115 may attempt to receive the frame from AP 105 during the adjusted TBTT. In some cases, STA 115 may identify wakeup times to listen for frames. For example, an AP may broadcast beacons during a wakeup interval (e.g., a TWT service period (SP)) associated with a STA, the STA may wakeup during the wakeup interval and listen for the beacons broadcasted from the AP. The STA may receive a BSS color change announcement and be aware that a BSS color change will occur during a TBTT or the a BSS color is enabled/disabled, or both. For example, in some cases, the STA 115 may receive a special frame (e.g., a TIM frame) and parse one or more fields of the special frame. The STA 115 may identify an indication to parse a beacon frame based on the indication included in at least one field (e.g., check beacon field) of the special frame. The indication may signal that a BSS color change announcement, e.g., a BSS color change, or an enabled/disabled BSS color is carried by the beacon frame. As a result, STA 115 operating as a TWT STA may identify the BSS color change announcement or that the BSS color is disabled or enable in the beacon frame based on the received indication in the special frame.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. Each BSS may be associated with a color that enables a STA to know (with high probability) whether a transmission is within its BSS or not after decoding a signal field, for example, in a PHY layer header. In some implementations, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some implementations, STA 115 may be a target wake time (TWT) STA. A TWT STA may operate under a power saving mechanism negotiated between the TWT STA an AP, that may allow the TWT STA to sleep for predetermined intervals, and wake up in pre-scheduled (target) intervals to exchange (e.g., receive or transmit) information with the AP. As a TWT STA, STA 115 may attempt to receive beacons, data frames, association frames etc. from AP 105. However, this attempt to receive the beacons, the data frames, the associations frames, etc. from AP 105 becomes optional for a TWT STA. In some cases, STA 115 may identify wakeup times to listen for beacons, data frames, etc. from AP 105. For example, AP 105 may broadcast beacons during a wakeup interval associated with STAs 115, the STAs 115 will wakeup during the wakeup interval and listen for the beacons broadcasted from AP 105. For example, STAs 115 may be aware that a BSS color change will occur during a target beacon transmission time (TBTT). After the wakeup interval lapses, STAs 115 will return to sleep mode (e.g., lower power mode).

In some implementations, beacons broadcasted by AP 105 may include BSS color collision information. BSS color collision information may include a BSS color value associated with AP 105. In some examples, the BSS color collision information may include a single bit or multiple bits storing a value indicating a BSS color or a detected BSS color collision, or both. For example, a beacon may be associated with a number of bits and fields that carries information associated with BSS color, among others. As such, AP 105 may indicate to STAs 115 BSS color information using one or more bits and fields in a beacon. Additionally or alternatively, AP 105 may indicate a BSS color change announcement to STAs 115 in a beacon or a separate frame (e.g., management frame or data frame). AP 105 may also, in some implementations, indicate a BSS color disabled in a bit or field of a beacon or in a separate frame from the beacon. For example, AP 105 may assign a bit in a BSS color change announcement element to indicate that a BSS color is disabled. Alternatively, AP 105 may assign a field in a BSS color change announcement element to indicate that a BSS color is disabled. AP 105 may also in some implementations, indicate partial BSS color disabled in a bit or field of a beacon, or a separate frame (e.g., management frame or data frame).

In some implementations, a STA 115 or AP 105 may operate in a shared or unlicensed frequency spectrum. These devices may perform a listen before talk (LBT) procedure such as a clear channel assessment (CCA) prior to communicating to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a bandwidth and exceeds a predetermined noise floor may indicate another wireless transmitter. A CCA also may include detection of specific sequences that indicate use of the channel. For example, another device may transmit a specific preamble prior to transmitting a data sequence.

Figure 2:
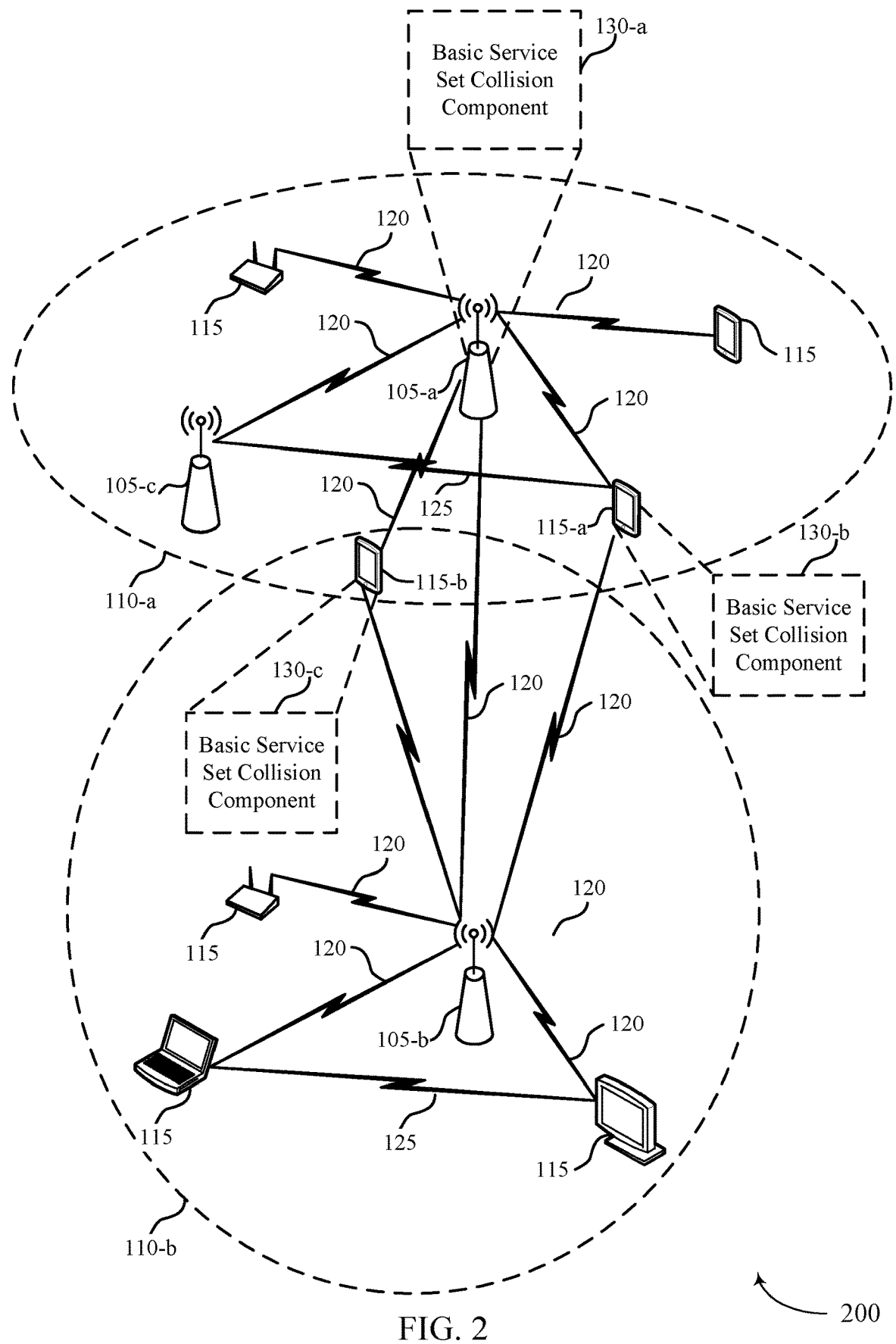
FIG. 2 illustrates an example of a system for wireless communications that supports BSS collision detection and resolution in accordance with aspects of the present disclosure.

FIG. 2 illustrates an example of a system 200 for wireless communications that supports BSS collision detection and resolution. In some examples, system 200 may support BSS attribute value collision detection and resolution. In some examples, this BSS attribute value collision detection and resolution may include, but is not limited to, BSS color collision detection and resolution. In some examples, an AP 105 may be associated with at least one STA 115, and these devices may represent at least a part of a BSS. As one example, with reference to FIG. 2, AP 105-a and the STAs 115 (e.g., STAs 115, STA 115-a, and STA 115-b) within coverage area 110-a may represent a first BSS. As another example, AP 105-b and the STAs 115 (e.g., STAs 115, STA 115-b) within coverage area 110-b may represent a second BSS. In some implementations, AP 105-a may be in communication with AP 105-c, among other devices, via a direct wireless links 120.

In some examples, a STA 115 may be associated with an AP 105 that communicates based on an attribute value associated with the AP 105. An attribute value may be an n-bit value, where n is an integer. The n-bit value may identify a BSS color. Additionally, the BSS color may a non-zero value. The BSS color, in some implementations, may be a 6 bit value. The BSS color may identify a BSS. In some implementations, STA 115-*b* may use the BSS color to identify a BSS associated with AP 105-*a* and a BSS associated with AP 105-*b*. Additionally or alternatively, STA 115-*b* may use the BSS color to identify a physical layer convergence procedure (PLCP) protocol data unit (PPDU) originating from a BSS associated with AP 105-*a* or AP 105-*b*, or both. STA 115-*b* may use the PPDU to identify and use channel access rules or reduce power consumption, or both.

The n-bit value also may indicate a BSSID (e.g., a MAC address). The n-bit value also may indicate a SSID of a BSS, or an ESSID, or both. In some examples, STA 115-*b* may be associated with a first AP 105-*a* that communicates based on a first BSS color associated with the first AP 105-*a*. STA 115-*b* may, additionally or alternatively, receive a second attribute value. Similarly, the second attribute value may be an n-bit value identifying a BSS color, BSSID, SSID, or ESSID, or a combination thereof. In some examples, the first attribute value associated with the first AP, or the second attribute value, or both may identify the BSS color, BSSID, SSID, or ESSID, in a PHY layer header. For example, the BSS may be embedded in a field of the PHY layer header of a data packet or beacon. In some implementations, STA 115-*b* may receive BSS color information that includes a second BSS color from a second AP (e.g., AP 105-*b*).

BSS collision may occur when two APs associated with different BSSs are using a same attribute value. In this implementation, the attribute values of the first BSS and the second BSS may be a same n-bit value. The n-bit value may identify a BSS color associated with the first BSS and a BSS color associated with the second BSS. For example, the first BSS color associated with a first AP (e.g., AP 105-*a*) may overlap with the second BSS color associated with a second AP (e.g., AP 105-*b*) creating a BSS color collision. In this implementation, the STA may decode the incorrect BSS color information received from the wrong AP, and, in some implementations, may incorrectly enter a power save mode based on the incorrect BSS color information. Additionally, in some examples, a STA may receive a frame (e.g., a beacon frame, a management frame, a data frame) that indicate a same BSS color as an associated AP; however, the frame may be associated with a neighboring AP. As a result, the STA may make incorrect decisions (e.g., incorrectly transitioning into a power save mode). For example, AP 105-*a* may be serving STA 115-*b* and STA 115-*b* may configure its communication with AP 105-*a* based on the BSS color information it receives from AP 105-*a*. However, in some cases, STA 115-*b* may receive BSS color information from AP 105-*b*, in this example, the BSS color information received from AP 105-*b* may include a BSS color that is same compared to a BSS color of AP 105-*a*. Since, the BSS color is the same, STA 115-*b* may think that AP 105-*a* is communicating with STA 115-*b* and as such may modify an operating characteristic (e.g., transmission schedule, power mode) based on the BSS color information received from AP 105-*b*. As such, the incorrect BSS color information maybe an unassociated BSS color information received by STA 115-*b* from a non-serving AP (e.g., AP 105-*b*). Additionally or alternatively, the attribute value of the first BSS and the second BSS may include a same or different ID in addition to a BSS color. For example in the implementation of an extended service set (ESS), a first AP 105-*a* and a second AP 105-*b* may have a same ESSID, but may have different BSS colors associated with the individual BSS of the first AP and the second AP.

As shown in FIG. 2, a STA 115-*b* may be located in the intersection of more than one coverage area 110-*a*, 110-*b* and may receive communications from more than one AP 105 (e.g., AP 105-*a*, AP 105-*b*). An AP 105 and an associated set of STAs 115 may be referred to as a BSS. Two or more BSSs may be neighboring BSSs, and as such the two or more APs may be communicating with a STA 115 simultaneously. For example, a STA 115-*b* may be in an OBSS and may receive communication from both AP 105-*a* and AP 105-*b*. In the implementation where both APs 105-*a* and 105-*b* have the same attribute value, the STA 115 may receive and process communications (e.g., data packets, beacons, probe response frames, association frames) from both APs 105-*a* and 105-*b*. Processing communications from both APs may result in the STA consuming excessive power and decreasing communication efficiency.

In some examples, a BSS color in a signaling field (e.g., a high-efficiency signaling field) helps a STA 115 identify whether a packet came from within the STA's BSS or OBSS. In some implementations, BSS color in the signaling field helps a STA identify whether a packet came from within the STA's BSS without further processing or decoding and saves valuable resources. In some implementations, a BSS color collision occurs when two neighboring APs end up of selecting the same BSS color. In some implementations, STAs (e.g., high-efficiency STAs) set the network allocation vector (NAV) based on BSS color and transmit opportunity (TXOP) duration in a signal field. In some examples, if a STA does not find itself in the STA_ID list, it can incorrectly set the NAV by mistake, which may limit channel access opportunities. Additionally, a STA can decode a BSS color and after signal field decoding can assume that the PPDU is not for the STA based on STA identification information, and may initiate a power save mode by mistake. In some examples, a STA may report BSS color information in the PPDUs it receives before the association via a BSS color report element in a probe request or re-association request frame.

Instead of detecting a BSS color collision and initiating corrective operations, another alternative may include having a device (e.g., a STA) decode more of or a whole frame that the device may identify from its own BSS to clarify the sending device. As a result, the STA consumes additional power, which can be a substantial disadvantage. Therefore, the present techniques detect BSS color overlap causing a BSS color collision, and resolve this collision by signaling to other devices (e.g., associated STAs) in its BSS, in other BSSs, or both, that there is BSS color overlap. This allows at least some of the various devices to cease using BSS color for making power save or channel access decisions, and allow for BSS color adjustment, maintenance, or setting a new BSS color.

An AP may detect a BSS color collision based on receiving frames from an OBSS STA including a same BSS color as the one it has selected for its BSS. Alternatively, the AP may detect a BSS color collision based on receiving autonomous BSS color collision reports from its associated STAs. The AP may set a BSS color disabled subfield to a value (e.g., 0 or 1) in the operation element that it transmits if the BSS color collision duration satisfies a threshold period. For example, an AP may enable or disable a BSS color based on a BSS color collision continuing for a duration that satisfies a threshold period. If an AP determines that a BSS color collision continues for a threshold interval (e.g., a number of beacon intervals), the AP may disable a BSS color to reduce consuming excessive power by the AP or communicating STAs, or both. In some implementations, an AP may additionally or alternatively determine to perform a BSS color change (e.g., enable and/or disable different BSS colors) based on the BSS color collision continuing for a duration that satisfies the threshold period (e.g., a number of beacon intervals). For instance, if the BSS color collision continues for a threshold number of beacon intervals, the AP may perform a BSS color change. Additionally or alternatively, an AP may disable a BSS color based on determining that a BSS color collision continues for a first sub-threshold period, and perform a BSS color change based on determining that the BSS color collision continues for a second sub-threshold period.

In some implementations, an AP may determine to change a BSS color based on received BSS color information of OBSS APs or autonomous collision reports received from associated STAs when selecting the value of its BSS color. In some examples, the autonomous report may include BSS color information associated with one or more OBSSs that the STA detected in order to help its associated AP select a new non-overlapping BSS color when the AP decides to change to a different BSS color. A STA may report BSS color collision based on detecting frames from OBSS STAs including a same BSS color as indicated by an associated AP. In some examples, the AP may maintain a BSS color subfield until the STA transmitting the operation element switches to a new BSS color. An AP may also maintain a BSS color subfield when the AP disables a BSS color based on a BSS color collision that continues for a threshold period. In addition, the AP may update a BSS color subfield indicating a change in BSS color when the AP determines that the BSS color collision continues to exist for a threshold period. In some cases, the threshold period associated with the AP disabling a BSS color or performing a BSS color change may be the same or different from each other. In some examples, the reporting may be performed autonomously. In some implementations, two or more APs may be associated with same BSSID. In this implementation, a STA may filter the two or more APs before determining whether a BSS color collision exists.

The present techniques help facilitate detecting a BSS color collision and remedying this collision based on various operations. Although the present techniques, methods, and operations are described as being performed by a device (e.g., a STA, an AP, or both), each may be performed by other devices or combinations of various devices. In some examples, an AP (e.g., AP 105-a) may include a BSS Collision Component 130-a. In some examples, least one STA (e.g., STA 115-a, STA 115-b) may include a BSS Collision Component 130-b, 130-c. Each of these BSS Collision Components 130 may perform operations related to detecting a BSS color collision, resolving at least one BSS color collision, and related operations, as described with reference to FIG. 2 and aspects of the present disclosure. Each BSS Collision Component 130 may enable an AP 105 (e.g., a high-efficiency AP), an STA 115 (e.g., a high-efficiency STA), or a combination thereof to detect BSS color collisions based on attribute values (e.g., BSS color information, BSSID information, other information, or some combination). BSS Collision Component 130 (or BSS Collision Components 130-a, 130-b, or 130-c) may, additionally or alternatively, enable transmitting BSS color collision information to a STA 115 served by the at least one AP 105, adjusting or selecting a first BSS color associated with the at least one AP 105, transmitting a query requesting BSS color information to another device, or receiving a frame from a second AP 105 in communication range with the at least one AP 105.

In some examples, a device may detect a BSS color collision based on at least one operation. In some implementations, as described with reference to FIG. 2, the device may include an AP (e.g., AP 105-a), a STA (e.g., STA 115-a, STA 115-b), some combination of these devices, or another device.

As a first example, a first AP (e.g., AP 105-a) may initiate or perform operations to detect a BSS color collision. In some examples, the first AP may identify or detect a first BSS color associated with itself, a BSSID associated with itself, other BSS color information associated with itself, BSS color information or BSSID information associated with at least one other device, or some combination. This BSS color information or BSSID may be set based on a default setting, protocol, instruction, or other method. The first AP may receive a frame (or other information) including BSS information from another device, such as a STA 115. In some implementations, the BSS information may include a second BSS color, a second BSSID, or combination of these associated with a second AP (e.g., AP 105-b, AP 105-c). In some implementations, the received frame may be received from a STA (e.g., STA 115-b), an AP (e.g., AP 105-b, AP 105-c), or at least one other device.

The first AP may determine or identify that the first BSS color is the same as, overlaps with, or is different from the second BSS color associated with the second AP. This determining or identifying may be based on comparing the received frame or frames with other frames or information from separate communications or settings, partially decoding at least some information, or by merely detecting the first BSS color and the second BSS color and identifying whether the two colors are the same.

In some implementations, the first AP may detect a BSS color collision based on whether two BSS colors are the same or not. As one example, if the first AP (e.g., AP 105-a) receives color information from another device, such as another AP (e.g., AP 105-c) within a communication range of the first AP, the first AP may detect a color collision based on the BSS color information, including the second BSS color, received directly from the other device (e.g., an AP). This detection of the BSS color collision may be based on analyzing various color information, comparing colors or other numerical or qualitative indicators, other operations, or some combination of these. In other examples, this same technique and method may be used with other devices (e.g., STAs). In some implementations, the first AP may enable or disable a BSS color based on detecting the BSS color collision with the other device (e.g., a second AP). In some cases, the first AP may adjust (e.g., enable, disable) a BSS color based on determining that the BSS color collision with the other device continues for a duration that satisfies a threshold period. In some cases, the first AP may determine to perform a BSS color change based on the BSS color collision continuing for a duration that satisfies a threshold period (e.g., a number of beacon intervals).

In some implementations, a communication range of the first AP may be based on a coverage area 110-a associated with the first AP (e.g., AP 105-a). In other implementations, a communication range of the first AP may not be based on a coverage area 110-a and may be broader or narrower than the coverage area 110-a. Alternatively or additionally, in some examples, the first AP may identify at least one BSSID and perform at least one action based on the identified at least one BSSID. In some implementations, the BSSID may be identified based on communications (e.g., frames) received from an AP, a STA, or a combination thereof. As described above, the first AP may identify a first BSSID associated with the first AP and identify a second BSSID associated with the second AP based on information from a received frame or message transmitted from a STA or another AP. In some examples, identifying the second BSSID associated with the second AP may be based on at least one transmission received from a STA (e.g., STA 115-a, STA 115-b) within a first BSS associated with the first AP or outside the first BSS associated with the first AP. In other examples, identifying the second BSSID associated with the second AP may be based on at least one transmission received from an AP (e.g., AP 105-c) within a first BSS associated with the first AP or an AP (e.g., AP 105-b) outside the first BSS. In some implementations, the transmission received by the first AP may convey BSS color information, BSSID information, or other information about the transmitting AP, another AP (e.g., a third AP), or some combination.

The first AP may determine that the first BSSID is different from the second BSSID. In some implementations, this may be based on comparing at least one received transmission including BSSID information, evaluating various parameters associated with BSS color information including BSS color or BSSID associated with at least one device, other operations, or some combination. In some examples, the first AP may determine that a first BSSID associated with the first AP is different from a second BSSID associated with the second AP—in conjunction with or independent of BSS color information or related operations.

In some implementations, one device may have multiple BSSIDs associated with it and any evaluation, identification, or determination (among other operations) of or related to these multiple BSSIDS and other BSSIDs associated with other devices may account for the various BSSIDs. For example, a first AP (e.g., AP 105-a) may have one BSSID associated with itself or may have a number of BSSIDs associated with itself in a multiple BSSID element, including, but not limited to, a virtual BSSID element division. In this example, the first AP may identify the multiple BSSIDs associated with itself (or any other device or devices in other examples) when identifying various BSSIDS or determining any similarity or overlap between the various BSSIDs. The first AP may account for the multiple BSSIDs when detecting any BSS color collision or resolving any detected BSS color collision.

In some examples, determining that the first BSSID is different from the second BSSID may be linked to, dependent on, or correlated with other operations to determine whether at least one BSS color associated with the first AP and the second AP (among other devices) are the same (e.g., overlap) or are different. For example, if the first AP determines that a first BSS color is different from a second BSS color, the first AP may not perform any additional action (e.g., identifications, determinations) to evaluate or identify any BSSID. Alternatively, if the first AP determines that a first BSS color is the same as a second BSS color, the first AP may perform at least one additional action (e.g., identifications, determinations) to evaluate at least one BSSID.

Based on determining that the first BSSID associated with the first AP (or multiple BSSIDs associated with a first AP) is/are different from a second BSSID associated with a second AP (or other device), the first AP may detect a BSS color collision. Based on this detection, the first AP may initiate or perform various operations to resolve this BSS color collision.

For example, the first AP may indicate a BSS color collision to at least some—if not all—devices associated with the first AP. In some implementations, this indication may include indicating the BSS color collision to STAs, APs, other devices, or some combination. As one example, the first AP may indicate the BSS color collision to at least some of its associated STAs via at least one operation element (e.g., high-efficiency (HE) operation elements). An AP may detect a BSS color collision based on receiving frames from an OBSS STA including a same BSS color as the one it has selected for its BSS. Alternatively, the AP may detect a BSS color collision based on receiving autonomous BSS color collision reports from its associated STAs. The AP may set a BSS color disabled subfield to a value (e.g., 0 or 1) in the operation element that it transmits if the BSS color collision duration satisfies a threshold period. For example, an AP may enable or disable a BSS color based on a BSS color collision continuing for a duration that satisfies a threshold period. If an AP determines that a BSS color collision continues for a threshold interval (e.g., a number of beacon intervals), the AP may disable a BSS color to decrease communication inefficiency for the AP, or communicating STAs, or both. In some implementations, an AP may additionally or alternatively determine to perform a BSS color change based on the BSS color collision continuing for a duration that satisfies the threshold period (e.g., a number of beacon intervals).

In some implementations, an AP may determine to change a BSS color based on received BSS color information of OBSS APs or autonomous collision reports received from associated STAs when selecting the value of its BSS color. In some examples, the autonomous reporting may include BSS color information associated with one or more OBSSs that the STA detected in order to help its associated AP select a new non-overlapping BSS color when the AP decides to change to a different BSS color. In some examples, the AP may transmit a BSS color change announcement in a data frame. The BSS color change announcement may an action or no action frame. The data frame also may be protected. In some implementations, the AP may transmit a BSS color change announcement in a beacon, a special beacon (e.g., an extended range (ER) beacon), a separate frame (e.g., management frame or data frame), or a TIM frame, or any combination thereof. The AP may also, in some implementations, indicate a BSS color disabled in a bit or field of a beacon, or in a separate frame from the beacon. For example, an AP may assign a bit in a BSS color change announcement element to indicate that a BSS color is disabled. Alternatively, an AP may assign a field in a BSS color change announcement element to indicate that a BSS color is disabled. The AP may also in some implementations, indicate partial BSS color disabled in a bit or field of a beacon, or a separate frame (e.g., management frame, data frame).

In some implementations, a BSS color change announcement may be transmitted in a beacon. In some cases, a STA may determine to parse a beacon for a BSS color change announcement based on an indication received in a special frame. In some cases, a special frame may include a traffic indication map (TIM) frame, a data frame, a management frame, an ER frame, a HD format frame, a VHD format frame, or a combination thereof. A special frame, in some examples, may also include one or more fields in which a BSS color change announcement may be transmitted within or an indication of a BSS color change announcement. For example, an AP may transmit a BSS color change announcement using one or more fields of a special frame. At least one field of a special frame may include a BSS color change announcement. For example, a check beacon field of a special frame (e.g., TIM frame) may include the BSS color change announcement. The value in the check beacon field may increment based on a change associated with one or more other fields of values of a beacon associated with the special frame, or when a new field or element is assigned to the beacon. In some examples, the special frame may include attribute values associated with the AP. For example, the attribute value may include a BSS color value, a BSS color enabled or disabled field value, etc. The AP may transmit the special frame in a beacon to one or more STAs during a transmission interval. The one or more STAs may listen for the special frame during a listening interval associated with the transmission interval. Once the STAs receive the special frame, the STAs may parse the special frame and identify attribute values within it. The STA may determine to check the beacon based on the special frame. For example, the STA may identify that a BSS color is disabled based on a bit or field of the special frame. In some implementations, the attribute values may indicate that a partial BSS color is disabled.

In some examples, a special frame may include an operation element (e.g., HE operation element) that may indicate that a BSS color is enabled or disabled. In some examples, the at least one operation element may be updated after detecting the BSS color collision. In some implementations, the operation element may be updated relative to a period (e.g., DTIM period, TBTT period). As merely one example, the operation element may be updated at or during a next threshold period (e.g., a next DTIM period, a TBTT period), at another time, or based on some combination. In some examples, the at least one device, such as the first AP, may advertise, signal, or transmit color collision information in a DTIM period, including, but not limited to, starting the next occurrence of a DTIM period. In some examples, this color collision information may include or relate to—among other things—BSS color information, BSS colors, BSSID information, BSSID values, other information, or some combination. In some implementations, the color collision information may include information received in at least one frame from an AP, a STA, or some combination. In some implementations, the BSS color may be an n-bit value. For example, a BSS color may be a 6-bit value. In some implementations, an AP (e.g., AP 105-*a*) may select a value in a range of 1 to 63 as the n-bit value for a BSS color field of an operation element. In some implementations, an n-bit value for a BSS color field of an operation element may indicate whether a BSS color is disabled or enabled. Additionally or alternatively, an additional field or bit of an operation element may indicate whether a BSS color is disabled or enabled.

As one example, the first AP (e.g., AP 105-*a*) may adjust or set a BSS color to a specific predetermined or predefined color to indicate a BSS color collision, or indicate whether a BSS color is disabled, or both, and may transmit this information to at least one other device. Based on this BSS color or BSS color disabled indication, another device (e.g., STA) may perform at least one operation—based on instructions from an AP (e.g., the first AP), based on a protocol, specification, or instruction, or based on at least one standard. As an example, the first AP may set the BSS color to a predetermined BSS color value (e.g., a value 0). When a device, such as a STA, receives the operation element indicating this predetermined color, the device may perform actions or prevent actions defined in the specifications specific to or associated with the predetermined BSS color (such as a 0 value), including avoiding initiating a power save, ceasing to examine BSS color information in future transmission, or other actions.

In some implementations, an OBSS may use a same BSS color and may be visible to STAs, but may or may not be visible to the APs of the BSS. The first AP may set a portion of a packet or other information element to signal a BSS color collision (e.g., overlapping BSS colors associated with devices, such as APs). In some examples, the first AP may set a bit to signal this BSS color overlap. This bit, in some implementations, may be a single, designated bit designed to specifically signal a BSS color collision. As an example, a bit may signal that a BSS color collision exists based on a first predetermined bit value (e.g., bit value 1), and a bit may signal that a BSS color collision does not exist based on a second predetermined bit value (e.g., bit value 0). This bit may signal a BSS color collision whether or not the first AP continues to transmit the first BSS color (the BSS color that created the BSS color collision), where a device (e.g., a STA) may disregard the still-transmitted BSS color based on the signaling bit. A bit may, in some examples, signal that a BSS color is disabled in addition to the BSS color collision existing. Based on a bit value indicated a BSS color collision exists, a STA may ignore a BSS color advertised by any AP—including the first AP or a second AP (e.g., when the STA is associated with the second AP or at least receiving BSS color information from the second AP). Thus, the STA may ignore an overlapping BSS color received from the second AP based on the received bit value indicating a BSS color collision.

As another example, the first AP (which may be an example of high-efficiency AP) may select a new, non-overlapping BSS color for its BSS. This selection may be based on various actions or operations.

In some implementations, based on channel scanning or independent of the channel scanning, the first AP may select a random value from the BSS color set. A first AP may know or have received a predetermined BSS color set or related BSS color parameters. The first AP may generate a random value from the BSS color set using a random number generator, a pseudo-random number generator, or another method. In some implementations, the first AP may generate the random value independent of other BSS colors or other information associated with other devices, including other APs. In other implementations, the first AP may generate the random value while accounting for other BSS colors associated with itself or other devices—inside or outside a communication range of the first AP.

In some implementations, the first AP may maintain its BSS color and continue transmitting BSS color information to at least one other STA, AP, or other device. In some examples, this may include an AP maintaining a predetermined BSS color (e.g., a value of 0)—enabling a device receiving the BSS color information containing this color to initiate or perform actions based on at least one specification, protocol, or instruction, among other things.

In some implementations, the first AP may gather information regarding BSS colors used by at least one other device, (e.g., APs). This may include gathering BSS color information from a neighboring AP or multiple APs.

In some implementations, the first AP may scan the channel to identify or determine the BSS color used by nearby APs. In some implementations, the first AP may scan the channel to identify or determine the BSS color used by nearby APs before detecting the BSS color collision as part of collecting data, receiving communications from at least one AP or STA, or as part of identifying BSS color information to determine the BSS color collision. Alternatively or additionally, this scanning may occur after the detection of the BSS color collision, in some implementations, as a supplementary step, and may be based on communications between the first AP and at least one AP, STA, or some combination—through direct or indirect communication.

In some examples, the AP may receive information from one or devices (e.g., STAs, APs) indicating BSS colors associated with at least one device. Based on receiving the BSS color or other information, the first AP may adjust to or select a new BSS color or disable a BSS color for a predetermined period based on various techniques and methods. In some examples, the first AP may advertise, signal, or transmit the new BSS color in a period, in an aperiodic fashion, or at a different time, including, but not limited to, a next period (e.g., DTIM period, TBTT period). In some examples, when the AP may advertise or transmit the new BSS color or an indication of a BSS color disable status, the AP may reset a bit a portion of a packet or other information element (e.g., a bit) to signal a BSS color collision. For example, the first AP may reset a bit that initially signaled a BSS collision to a different value indicating that no BSS color collision is currently detected, which may be based on the new BSS color associated with the first AP. In some implementations, a specific bit (e.g., a BSS collision bit) may be reset from a first predetermined value (e.g., bit value 1) indicating a detected BSS color collision to a predetermined second value (e.g., bit value 0) that does not indicate a detected BSS color collision.

Various methods for adjusting or selecting a new, non-overlapping BSS color may be used. As a first example, a first device (e.g., the first AP) may identify at least one BSS color based on at least one transmitted message, frame, or report. As one example, the first AP may identify whether any frame or report (e.g., an event report) from another device (e.g., a STA) indicates that a BSS color is a predetermined value (e.g., a value 0). Based on identifying that this predetermined value is present in at least a frame or a report (or other communication) from another device, the first AP may perform various operations to adjust or select a new non-overlapping BSS color, or enable or disable a BSS color for a predetermined period. In some examples, these operations and others discussed in accordance with this disclosure are designed to identify whether other devices (e.g., APs) have detected the BSS color collision (or even a different BSS color collision), are attempting to remedy the detected BSS color collision, or have already remedied the detected BSS color collision. These operations may apply whether or not other devices have identified any BSS color collision.

An AP may detect a BSS color collision based on receiving frames from an OBSS STA including a same BSS color as the one it has selected for its BSS. Alternatively, the AP may detect a BSS color collision based on receiving autonomous BSS color collision reports from its associated STAs. The AP may set a BSS color disabled subfield to a value (e.g., 0 or 1) in the operation element that it transmits if the BSS color collision duration satisfies a threshold period. For example, an AP may disable a BSS color based on determining that a BSS color collision continues for a period that satisfies a threshold interval. If an AP determines that a BSS color collision continues for a threshold interval, the AP may disable a BSS color to reduce consuming excessive power and avoid decreasing communication inefficiency for the AP, or communicating STAs, or both. In some implementations, an AP may determine to perform a BSS color change based on the BSS color collision continuing for a duration that satisfies the threshold period.

In some implementations, an AP may determine to change a BSS color based on received BSS color information of OBSS APs or autonomous collision reports received from associated STAs when selecting the value of its BSS color. In some examples, the autonomous report may include BSS color information associated with one or more OBSSs that the STA detected in order to help its associated AP select a new non-overlapping BSS color when the AP decides to change to a different BSS color. A STA may report BSS color collision based on detecting frames from OBSS STAs including a same BSS color as indicated by an associated AP. In some examples, the reporting may be performed autonomously. In some implementations, two or more APs may be associated with same BSSID. In this implementation, a STA may filter the two or more APs before determining whether a BSS color collision exists.

As one example of adjusting or selecting a new, non-overlapping BSS color, the first AP (or another device, including an AP or a STA) may generate a random number n in a predetermine range (e.g., between 0-5). In response, based on the random number (e.g. if the random number is below a threshold value, if the random number falls within a first classification, if the random number is odd), the first AP may wait for a predetermined time based on the random number and issue a second request for a message, frame, or report relating to BSS color information, BSSID information, BSS color collision information, some combination, or other information. In some implementations, the predetermined time may include n seconds or may be based on another relationship between the random number and a period. Although a random number is provided as one example, other numbers and values are contemplated, including, but not limited to pseudo-random numbers, predetermined numbers, pattern-based numbers, other numbers or indicators, or some combination.

In response to the second request (e.g., message, frame, or report), the first, requesting AP may check or identify whether any information such as a message, a frame, or a report indicates that a BSS color associated with or relating to another device (e.g., an AP, a STA) is a predetermined value. In some examples, if the predetermined value includes a first value (e.g., a 0 value) or a second value (e.g., the same BSS color as the second color associated with the second AP that led to the detection of the BSS color collision), the first AP may begin this process again by generating a random number, and proceeding again as described.

Alternatively, based on the random number (e.g. if the random number is above a threshold value, if the random number falls within a first classification, if the random number is even), the first AP may perform at least one operation. As one example, the first AP may adjust the first BSS color to a new BSS color. In some examples, based on the generated random number (or other method, which is contemplated here), the first AP may simply pick a new BSS color in an effort stop the detected BSS color collision. By picking a new BSS color, the first AP (and other devices) may avoid continually waiting for another device (e.g., another AP) to adjust or change its BSS color. This avoids the situation where, if no device simply changed its BSS color information, the devices (e.g., APs) may each continuously check for changes in BSS colors that would never occur causing a continuous loop or unnecessary delay.

In some examples, this adjustment (or selection) may be based on or may account for the original BSS color that led to the detected BSS color collision, previous BSS colors associated with the first AP, BSS colors associated with the second AP, BSS color information received from at least one other device (e.g., STA, AP) including current BSS color information or past color information, other factors and transmitted frames or messages, or some combination. In some examples, this adjustment (or selection) may be based on starting with predefined BSS color range of possible values, eliminating values based on received or known information (as described above), and generating a random new, non-overlapping BSS color associated with the first AP based on the remaining permissible values. In some examples, the predefined BSS color may be within a predetermined range.

As a second example of adjusting or selecting a new, non-overlapping BSS color, the first AP may adjust or select a new color based on a query to another device. Based on a message, a received frame, or a report from a STA, if the first AP determines that another AP (e.g., a neighboring AP, the second AP) has a same BSS color as the BSS color of the first AP, the first AP may query at least one AP or STA to request data. In some examples, the query may be or include, but is not limited to, a probe request, a backhaul link communication, other alternatives, or some combination of these.

The first AP may identify devices within communication range of the first AP (e.g., within a coverage range of the first AP) and selectively communicate with these devices. Additionally or alternatively, the first AP may identify devices outside communication range of the first AP, but that may be in communication range of a device (e.g., a STA) within communication range of the first AP. Based on identifying at least some of these devices (within or outside a communication range of the first AP), the AP may query these devices directly, indirectly, or based on some combination to detect or resolve a BSS color collision. As one example, the first AP (e.g., AP 105-*a*) may identify another AP (e.g., AP 105-*c*) and a STA (e.g., STA 115-*b*) as within a communication range. Based on this, the first AP may send a direct query to the other AP (e.g. AP 105-*c*), the STA (e.g., STA 115-*b*), or both.

An AP (e.g., AP 105) may indicate a TBTT adjustment to the STA via an section of a frame. The section may include a bit or field in an element of the frame. In some examples, the frame may be a management frame for example, a beacon, a probe response frame, an association response or request frame, re-association response or request frame, a special frame (e.g., ER frame, HD format, or VHD format), or some other action frame. A STA may receive a frame and adjust a TBTT based on identifying the TBTT adjustment in a bit of a field in an element of the frame. As another example, the first AP (e.g., AP 105-*a*) may identify at least one other device (e.g., AP 105-*b*, a STA) outside its communication range via received transmissions from other devices. Based on a communication with a device (e.g., STA 115-*b*) within its communication range, however, the first AP may indirectly query at least one other device (e.g., AP 105-*b*, a STA) outside its communication range based on a query from the first AP to an intermediate device (e.g., STA 115-*b*) and from the intermediate device to the device outside its communication range (e.g., AP 105-*b*). The first AP may receive an indirect response from the device outside its communication range through the intermediate device. This response may provide BSS color information, BSSID information, BSS color collision information, other information, or some combination. In some examples, the BSS color information may include a BSS color change announcement including a reference time when a BSS color change will occur and an indication of a new BSS color selected by the AP. The reference time is a countdown value associated with a TBTT. In some examples, the STA may adjust the TBTT. For example, the STA may negotiate a wake TBTT and listen interval for beacon frames it intends to receive from an associated AP. The STA may adjust the TBTT based on receiving a transmission schedule from the associated AP.

Additionally or alternatively, a BSS color change announcement may include a reference time when a BSS color disable will occur and an indication of the BSS color disable assigned by the AP. The reference time may also be a countdown value associated with a TBTT. In some examples, a STA may adjust the TBTT. For example, the STA may negotiate a wake TBTT and listen interval for beacon frames it intends to receive from an associated AP. For example, a STA may be a target wake time (TWT) STA. As a TWT STA, the STA may attempt to receive beacons, data frames, association frames etc. from an AP during the TBTT. In some cases, a STA may identify wakeup times to listen for beacons, data frames, etc. For example, an AP may broadcast beacons during a wakeup interval associated with a STA, the STA may wakeup during the wakeup interval and listen for the beacons broadcasted from the AP. As such, the STA may be receive the BSS color change announcement and be aware that a BSS color change will occur during a target beacon transmission time (TBTT) or the a BSS color is enabled or disabled, or both. After the wakeup interval lapses, the STA may return to lower power mode.

In some implementations, a BSS color change announcement may be associated with a number of bits and fields indicating BSS color information, among others. An AP may indicate a BSS color change announcement to a STA in a beacon or a separate frame (e.g., management frame, data frame). The AP may also, in some implementations, indicate a BSS color disabled in a bit or field of a beacon or in a separate frame from the beacon. For example, an AP may assign a bit in a BSS color change announcement element to indicate that a BSS color is disabled. Alternatively, the AP may assign a field in a BSS color change announcement element to indicate that a BSS color is disabled. The AP may also indicate a partial BSS color disabled in a bit or field of a beacon, or a separate frame (e.g., management frame, data frame).

In response to a query (e.g., direct, indirect, or both), the first AP may receive a response from the queried device (e.g., an AP) directly, indirectly, or both. This response may be or include a management frame element, a probe response, an association response, another response, or a combination thereof. In some implementations, the response may indicate that a second AP is using the same BSS color as the first AP that transmitted the query. In some implementations, the response may indicate whether the second AP has detected the BSS color collision (based on the non-overlapping BSS colors) or another BSS color collision involving devices. Based on this response, the first AP may select a BSS color from a predetermined set of possible BSS colors. In some implementations, this selection may be based on a predetermined set that accounts for the overlapping BSS color, other BSS colors in use by one of the first AP or the second AP, other BSS colors in use by at least one other different device, other information, or some combination of these.

In some implementations, the response may indicate that a second AP is using a predetermined BSS color different from the BSS color associated with the first AP that transmitted the query. In some examples, this predetermined BSS color may be a predetermined value that changes based on at least one condition (e.g., time, communications, vendor) or may not change based on a condition (e.g., a value of 0 may continue to indicate the same BSS color state). In some implementations, the predetermined BSS color may indicate that the second AP has not adjusted or set a new BSS color (e.g., is still trying to select a new BSS color). For example, the second AP may have disabled its current BSS color. In other words, the second AP has not set a new BSS color, but instead has adjusted by disabling a current BSS color for a predetermined period. Based on this response and identifying the BSS color associated with the second AP, the first AP may generate a random number n in a predetermined range (e.g., between 1-5).

In response, based on the random number (e.g. if the random number is above a threshold value, if the random number falls within a first classification, if the random number is odd), the first AP may perform at least one operation. As one example, the first AP may adjust the first BSS color to a new BSS color or may select a new BSS color (that may be generated at this time or may have been previously generated). Alternatively, the first AP may disable its BSS color for a predetermined period. For example, the first AP may monitor a BSS color collision to identify whether the BSS color collision continues for a period that satisfies a threshold interval. If the first AP determines that the BSS color collision continues to persists based on the monitoring, the first AP may adjust or select a new BSS color. Additionally, in some examples, based on the generated random number (or other methods which are contemplated in accordance with aspects of this disclosure), the first AP may simply pick a new, non-overlapping BSS color. By picking a non-overlapping BSS color, the first AP (and other devices) may avoid waiting for another device (e.g., another AP) to adjust or change its BSS color and avoid significant delays or continual looping.

Alternatively, in response, based on the random number (e.g. if the random number is below a threshold value, if the random number falls within a first classification, if the random number is even), the first AP may wait for a predetermined time based on the random number and issue a second request for a message, frame, or report relating to BSS color information, BSSID information, BSS color collision information, some combination, or other information. In some implementations, the predetermined time may include n seconds (or n milliseconds) or may be based on another relationship between the random number and a period. Although a random number is provided as one example, other numbers and values are contemplated, including, but not limited to pseudo-random numbers, predetermined numbers, pattern-based numbers, other numbers or indicators, or some combination.

A STA or AP also may report beacon collision. For example, in an OBSS beacons transmitted by a first AP may be colliding with beacons transmitted by a neighboring AP. In some examples, the non-AP STA may detect the beacon collision and transmit a report indicating the beacon collision to the first AP or the neighboring AP, or both. In some examples, the STA may report the beacon collision in addition to the detected BSS color collision. For example, a bit or a subfield of a data frame may indicate a BSS color collision, and another bit or subfield of the data frame may indicate the beacon collision. Additionally or alternatively, a STA may indicate in a bit of subfield or field of a data frame the type or report. For example, the STA may indicate that the event report is a BSS color collision report or that the event report is a beacon collision report. In the implementation that the event report includes both the BSS color collision and beacon collision report, the STA also may indicate this with at least one bit or in a subfield or field of a data frame.

In response to a query (e.g., direct, indirect, or both), the first AP may not receive a response from the queried device (e.g., an AP) directly, indirectly, or both. Based on the lack of response or, in some implementations, independent of a response, the first AP may select a new BSS color from a predetermined number of BSS colors. This new BSS color may be based on or may account for the original BSS color that led to the detected BSS color collision, previous BSS colors associated with the first AP, BSS colors associated with at least one other AP (e.g. neighboring APs in BSSs), BSS color information received from at least one other device (e.g., STAs, APs) including current BSS color information associated with various APs, past color information, other factors and transmitted frames or messages, or some combination.

Alternatively, in some examples, the first AP may receive information from another device, such as another AP, independent of any query or request. For example, the first AP may receive a beacon transmitted by another AP, and the beacon may contain BSS color information, BSSID information, BSS color collision information, other information, or a combination thereof. Based on this information, the first AP may detect or resolve a BSS color collision.

In some implementations, the first AP may gather information regarding BSS color used by at least one other device (e.g., AP). This may include gathering information from APs, STAs, other devices, or some combination to facilitate detecting a BSS color collision, adjusting or setting a new BSS color when a BSS color collision is detected, other operations, or some combination. This information gathering may include requesting, signaling, or transmitting various information in various forms.

As merely one example, the first AP may send a request to at least some devices (e.g., STAs) associated with the first AP to gather BSS color information related to other devices (e.g., other APs). For example, the first AP (e.g., AP 105-*a*) may send an event request frame (e.g., 9.6.14.2 REVmc D6.0) containing an event request element to at least some associated STAs to gather BSS color information of neighboring APs (e.g., AP 105-*b*).

In some examples, the event request element (e.g., 9.4.2.67 REVmc D6.0) may (or shall) contain an event token field, and event type field, an event response limit, other information, or some combination. In some implementations, the event token field may include at least one value selected by the first AP, which may be based on the event request frame, BSS color information associated with the first AP, other information, or some combination. In some implementations, the event request element may include an event type field that may include a BSS color collision report that may indicate or contain a new BSS color or a BSS color disable related to the first AP or another device, among other information. In some examples, values 4-220 and 222-225 may be reserved and may relate to or include the new BSS color. In some implementations, the event request element may include an event response limit indicating a number of times that a device (e.g., a STA) may respond or attempt to respond to the event request. In other implementations, the event response limit may indicate a frequency that a STA may respond or other related information. In some implementations, the event request field shall not be present.

In some implementations, the event request may be sent to all the STAs associated with the first AP enabling comprehensive gathering of BSS color information. In other examples, the event request may be sent to some of the STAs associated with the first AP by design. In this implementation, various factors may be accounted for in identifying or determining which of the STAs associated with the first AP may receive a request and become part of a selected group or subset. In some implementations, the selected group or subset may be determined based on a separate transmission or a response to a separate transmission.

In some examples, this may include accounting for RSSI. As one example, the first AP may select a group or a subset that includes devices (e.g., STAs) associated with RSSIs relative to (e.g., below, above, within a range of) a threshold value or that are lower compared to other RSSIs, which may in some implementations allow the first AP to receive information from devices that may be located farther from the first AP and increase the amount and breadth of gathered BSS color collision-related data received. For example, in some implementations, an AP may independently request or receive information from other APs (or other devices) within communication range of the first AP. In some implementations, this could be a periodic request or reception, aperiodic request or reception, or some combination. In conjunction with this or independent of this, the first AP may select at least one STA or other device (based on RSSI) that is farther away or that is at a predetermined position relative to the APs communication range to receive information about APs or other devices that the first AP would not be able to capture itself.

As another example, the first AP may select a group or a subset that includes devices (e.g., STAs) that the first AP is aware of and has communicated with before (e.g., based on a history or historical data). For example, the first AP may determine or identify that a subset of devices have the fewest number of overlapping APs (serving APs or APs associated with the devices), which may increase the amount and breadth of gathered BSS color collision-related data. At least some—if not all—of these devices may be selected by the first AP.

As another example, the first AP may select a mixture of various device types or devices located at varying distances to provide data relating to the serving devices or devices that may be in communication with the selected subset or group. This may include selecting a sample of devices based on each device's distance from the first AP or another device, enabling collecting varying data from various devices. In some implementations, the selected group or subset may be determined based on various factors, considerations, or combinations thereof.

As an additional example, the first AP may select a group or a subset that includes devices (e.g., STAs) that are capable of providing the requested information (e.g., that can support the requested report type related to a BSS color collision), that support a request (e.g., an event request, a BSS color collision request), or some combination. In some implementations, whether a device supports the request may be based on an extended capabilities element and whether such an element is enabled or would support the request. As one example of this, the first AP, which may be associated with a first vendor, may select a group of subset that includes devices associated with a vendor, including, but not limited to, the same first vendor. This may be based on the devices associated with a vendor as supporting a request or a requested response, such as having an extended capabilities element.

In some examples, a device (e.g., a STA) that receives an event request related to or of a type associated with a BSS color collision report shall respond back to the first AP with various information. This various information may include information regarding BSS color information associated with various devices in the same BSS or a separate BSS that includes other devices. For example, the first AP may receive a response from a STA based on an event request received by the STA (e.g., STA 115-*b*) from the first AP (e.g., AP 105-*a*).

In some examples, the event request and event report operations may be based on the 802.11v standard or an extension of this standard. In some examples, these steps and others discussed in accordance with this disclosure are designed to identify whether other devices (e.g., APs) have detected the BSS color collision (or even a different BSS color collision), are attempting to remedy the detected BSS color collision, or have already remedied the detected BSS color collision.

In some examples, at least one device (e.g., a STA) may transmit an event report. In some implementations, the event report may be based on receiving at least one request (e.g., request from an AP to provide BSS color information such as BSS color information, BSSID information, other BSS color collision information, or some combination). In other implementations, the event report may be based on at least one operation performed by a STA. This at least one operation may include, but is not limited to, detecting a BSS color collision—in conjunction with or independent of any detection by a device (e.g., AP). For example, a STA may receive various BSS color information, perform various operations, and detect at least one BSS color collision independent of any detection by an AP.

As one example, a first STA (e.g., STA 115-*b*) may initiate or perform at least one operation to detect a BSS color collision. In some examples, the first STA may be associated with a first AP, but may be positioned in overlapping geographic coverage areas (e.g., coverage areas 110-*a*, 110-*b*) and receive information from a second AP (e.g., AP 105-*b*) or other devices (e.g., AP 105-*c*, other STAs, other devices). In some examples, the first STA may identify or detect a first BSS color associated with a first AP (e.g., AP 105-*a*), a BSSID associated with a first AP, other BSS color information associated with a first AP, itself, or at least one other device, or some combination. This information may be set based on at least one received transmission, default settings, protocols, instructions, or other methods. The first STA may receive a frame or a message (or other information) including BSS color information or BSSID information (among other information) from a second AP that in is communication range with the first STA, other devices in communication with at least one other AP, or a combination thereof. In some implementations, the BSS color information may include a second BSS color, or a second BSSID, or combination of these associated with a second AP (e.g., AP 105-*b*). In some implementations, the received frame may be received from a STA, an AP (e.g., AP 105-*b*), or at least one other device.

The first STA may determine or identify that the first BSS color associated with the first AP is the same as or is different from the second BSS color associated with the second AP. This determining or identifying may be based on comparing the at least one frame with other information, partially decoding at least some information, or by detecting the first BSS color and the second BSS color and identifying whether the two colors are the same. In some implementations, the first STA may detect a BSS color collision based on whether two BSS colors are the same or not. As one example, if the first STA (e.g., STA 115-b) receives BSS color information from another device, such as another AP (e.g., AP 105-c) within a communication range of the first STA, the first AP may detect a color collision based on the BSS color information. In some examples, this detection may be based on BSS color information received directly from at least one other device (e.g., AP, STA, some combination). This detection of the BSS color collision may be based on analyzing various color information, comparing BSS colors or other numerical or qualitative indicators, comparing BSSIDs or other numerical or qualitative indicators, other operations, or some combination of these. In other examples, this same technique and method may be used with other devices (e.g., STAs).

In some examples, the first AP may identify at least one BSSID based on information from a received frame or message transmitted from a STA or another AP, among other methods, and perform an action or actions based on the identified at least one BSSID—separately or in conjunction with the received BSS color information. In some implementations, the at least one BSSID may be identified based on communications received from at least one AP, at least one STA, or a combination thereof. As described above, the first STA may identify a first BSSID associated with the first AP (which the first STA may be associated with) and identify a second BSSID associated with the second AP (which the first STA may not be associated with). In some examples, identifying the second BSSID associated with the second AP may be based on at least one transmission received from a STA within a first BSS associated with the first AP or outside the first BSS (e.g., associated with a second BSS). In other examples, identifying the second BSSID associated with the second AP may be based on at least one transmission received from an AP (e.g., AP 105-c) within a first BSS associated with the first AP or an AP (e.g., AP 105-b) or outside the first BSS (e.g., associated with a second BSS).

The first STA may determine that the first BSSID is different from the second BSSID. In some implementations, this may be based on comparing at least one received transmission including BSSID information, evaluating various parameters associated with BSS color information including BSS color or BSSID associated with at least one device, other operations, or some combination. In some examples, the first STA may determine that a first BSSID or multiple BSSIDs associated with the first AP is different from a second BSSID associated with the second AP.

In some implementations, one device may have multiple BSSIDs associated with it and any evaluation, identification, or determination (among other operations) of or related to these multiple BSSIDS and BSSIDs associated with other devices may account for the various BSSIDs. For example, a first AP (e.g., AP 105-a) may have one BSSID associated with itself or may have a number of BSSIDs associated with itself in a multiple BSSID element, including, but not limited to, a virtual BSSID element division. In this example, the first STA may identify the multiple BSSIDs associated with the first AP (or any other devices) when identifying various BSSIDS or determining any similarity or overlap between the various BSSIDs.

In some examples, determining that the first BSSID is different from the second BSSID may be linked to, dependent on, or correlated with other operations to determine whether at least one BSS color associated with the first AP and the second AP (among other devices) are the same (e.g., overlap) or are different. For example, if the first STA determines that a first BSS color associated with the first AP is different from a second BSS color, the first STA may not perform an additional action or actions (e.g., identifications, determinations) to evaluate at least one BSSID. Alternatively, if the first STA determines that a first BSS color associated with the first AP is the same as a second BSS color associated with the second AP, the first AP may perform an additional action or actions (e.g., identifications, determinations) to evaluate at least one BSSID.

Based on determining that the first BSSID associated with the first AP (or multiple BSSIDs associated with a first AP) is/are different from at least one second BSSID associated with a second AP (or other device), the first STA may detect a BSS color collision. Based on this detection, the first STA may initiate or perform various operations, which may include initiating an event report or other reporting mechanism.

Based on the STA's detection of a detected BSS color collision, in response to an event request from another device (e.g., an AP), or some combination, the STA may transmit an event report to at least one device, such as the first AP. As described above, this event report (or other reporting mechanism) may report information facilitating the first AP or another device in detecting a BSS color collision or resolving a BSS color collision.

The event report may include various information and may take various forms. In some examples, a STA (e.g., STA 115-b) may transmit information to at least one other device upon detecting a BSS color collision. As one example, a STA may transmit, upon detecting a BSS color collision, an event report frame (e.g., 9.6.14.3 REVmc D6.0) that may include an event report element to its associated AP. In some examples, an event report frame may include information enabling various reporting method or types. For example, an event report frame may include a dialog token enabling autonomous or non-autonomous reporting based on a token value. For example, a first token value (e.g., a predetermined value, a 0 value) may enable or trigger autonomous reporting, while a second value may enable or trigger non-autonomous reporting.

In some examples, the even report element (e.g., 9.4.2.68 REVmc D6.0) shall contain an event token, an event type or definition of a new event type, an event status or definition of a new event status, an event report field, other information, or some combination. In some examples, the event token may indicate or contain an event token signaling or enabling autonomous or non-autonomous reporting based on the event token value. For example, a first token value (e.g., a predetermined value, a 0 value) may enable or trigger autonomous reporting, while a second value may enable or trigger non-autonomous reporting.

In some implementations, the event report element may define a new event type. This new event type may be based on or associated with a BSS color collision report regardless of whether the report indicates a detected BSS color collision or not. In some implementations, the event type may include a value that may indicate or contain an event type value related to BSS color collision reporting, among other information. In some examples, values 4-220 and 222-225 may be reserved and may relate to or be the new event type for BSS color collision reporting.

In some implementations, the event report element may define a new event status. This new event status may be based on or associated with a BSS color collision report regardless of whether the report indicates a detected BSS color collision or not. In some implementations, the event status may include a value that may indicate or contain an event status value related to BSS color collision reporting, among other information. In some examples, values 4-255 may be reserved and may relate to or include the new event status for BSS color collision reporting.

In other examples, a new event status may be based on a specific, predetermined value (e.g., a 0 value) indicating a successful operation. In conjunction with the new event status or based on the predetermined value, the event report element may include an exception. This exception, in some implementations, may provide instruction to omit or not include event timing synchronization function (TSF), coordinated universal time (UTC) Offset, event time error based on an event type, including, but not limited to when the event type corresponds to the BSS color collision report value. This may, in some implementations, minimize transmissions of bit resources and conserve various resources.

In some examples, an event report field shall be present. Among things, the event report field may include a list of {BSSID, BSS color} tuple(s) for all the BSS in a communication range of the STA, or otherwise related to the STA, and a list of the respective colors related to other devices that the STA (e.g. a reporting STA) can see (e.g., communicate with) at this time, saw or received in the past at any time, saw or received in the past within a predetermined time, or some combination. By including this information, the STA may provide information to at least one other device (or even itself) to help in selecting a new, different (non-overlapping) color.

In other implementations, the event report or the event report element may contain additional fields. As merely one example, the event report element may contain a field indicating whether a second AP 105 has detected a collision based on a predetermined value within the field. This event report, which may be transmitted by a STA 115 to the first AP, may allow the STA 115 to communicate to the first AP that at least one other AP 105 has detected a BSS color collision with the first AP, another AP, another device, or some combination. Additionally or alternatively, this event report, which may be transmitted by a STA 115 to the first AP, may allow the STA 115 to communicate to the first AP conditions related to other devices, such as other APs. In some implementations, the field also may provide additional information relating to the BSS color collision, including whether the device that has detected the BSS color collision has initiated any operations to rectify or resolve the BSS color collision (e.g., adjusted a BSS color, set a new BSS color, initiated a process or an operation to resolve the collision).

A STA that is autonomously reporting a BSS color collision, may transmit an event report including a single event report element. The event report element may include an event token field value set to 0 or 1 for autonomous reporting. In some implementations, the event report element may include an event type field value for BSS color collision or beacon collision reporting. The event report status field may be set to 0 or 1 to indicate a status. In some implementations, the event report field may include information identifying the BSS color used by a BSS or an OBSSs that the reporting STA is able to detect. A STA that requesting to autonomously report a BSS color collision to its associated AP may schedule for transmission a BSS color collision event report frame or beacon collision event report every n seconds or minutes, where n is an integer. Unless the BSS color collision or beacon collision no longer exists or if the associated AP has set the BSS color disabled bit to 1 in the operation element that it transmits.

Event requests enable a STA to request another STA to transmit real-time event reports. The types of events may include transition, RSNA, wireless network module (WNM) log, BSS color Collision, and peer-to-peer link events. A transition event may be transmitted after a STA successfully completes a BSS transition (e.g., changes BSS colors). In some examples, transition events may be used to diagnose transition performance problems. A robust security network association (RSNA) event report may identify the type of authentication used for the RSNA. RSNA events may be used to diagnose security and authentication performance problems. A WNM log event report may enable a STA to transmit a set of WNM log event messages to a requesting STA. WNM log event reports may be used to access the contents of a STA's WNM log. A BSS color collision event report enables a STA to signal BSS color collision to its associated AP. A peer-to-peer link event report enables a STA to inform the requesting STA that a peer-to-peer link has been established. Peer-to-peer link event reports are used to monitor the use of peer-to-peer links in the network.

As shown in the examples below, and in accordance with various aspects of the present disclosure, at least one octet may contain information reported within the event report. In some implementations, the event report field may be 8-octets in length with each bit representing a BSS color value. A value of 1 at a bit position indicates that the BSS color value corresponding to that position is in use by OBSS as detected by the reporting STA. The event report may be associated with a beacon, probe response, and re-association response frame, or a special frame, or a combination thereof. As a first example, first example octets may include values associated with an element ID, a length, an event token, an event type, an event status (or event status report), an event report, other information, or some combination. In some implementations, the event status may be used to transmit a BSS color change announcement including a reference time when a BSS color change will occur and an indication of a new BSS color (e.g., BSS color_2) selected by an AP. The reference time may be a countdown value associated with a TBTT. For example, the STA may negotiate a wake TBTT and listen interval for beacon frames it intends to receive from an associated AP. An AP (e.g., AP 105) may indicate a TBTT adjustment to the STA via an section of a frame. The section may include a bit or field in an element of the frame, for example, of the octets. In some examples, the frame may be a management frame for example, a beacon, a probe response frame, an association response or request frame, re-association response or request frame, or some other action frame. A STA may receive a frame and adjust a TBTT based on identifying the TBTT adjustment in a bit of a field in an element of the frame.

The STA may adjust the TBTT based on receiving a transmission schedule from the associated AP. Additionally or alternatively, the event report may include the BSS color change announcement including the reference time and the indication of the new BSS color selection by an AP, or a BSS color disabled operation by the AP. In some implementations, the event token may be set to a number of TBTTs remaining until the AP transmits the BSS color change announcement and updates to the new BSS color selected by the AP, or disables the BSS color. In some implementations, the event toke may be set to a value 0 to indicate that the AP will switch to the new selected BSS color at a current TBTT or a next TBTT subsequent to the current frame.

Additionally or alternatively, a non-AP STA may report beacon collision. For example, in an OBSS beacons transmitted by a first AP may be colliding with beacons transmitted by a neighboring AP. In some examples, the non-AP STA may detect the beacon collision and transmit a report indicating the beacon collision to the first AP or the neighboring AP, or both. In some examples, the STA may report the beacon collision in addition to the detected BSS color collision. For example, a bit or a subfield of a data frame may indicate a BSS color collision, and another bit or subfield of the data frame may indicate the beacon collision. Additionally or alternatively, a STA may indicate in a bit of subfield or field of a data frame the type or report. For example, the STA may indicate that the event report is a BSS color collision report or that the event report is a beacon collision report. In the implementation that the event report includes both the BSS color collision and beacon collision report, the STA also may indicate this with at least one bit or in a subfield or field of a data frame.

In some examples, the octets may include at least one element that may be or include a constant length or other characteristic (e.g., 1), while at least one element (e.g., event report) may be or include a variable length or characteristic as indicated. In some examples, the event token field in a response element associated with an event report shall have the same value as the event token field in the previously-received event request element from the first AP, enabling coordination between the different devices and the event request and event reporting mechanisms. In some examples, the event reporting field may be set to the new BSS color value that the AP selected for use starting from the TBTT at which the AP will change its BSS color in response to the countdown value being reached.

| | Element ID | Length | Event Token = 0 | Event Type = BSS color Collision | Event Status Report = Value | Event Report = N x {BSSID, BSS color} |
|---|---|---|---|---|---|---|
| Octets: | 1 | 1 | 1 | 1 | 1 | variable |

As another example and in accordance with aspects of the present disclosure, second example octets may include values associated with various BSSIDs, BSS colors, other information, or some combination. For example, these second octets (or a single octet) may store BSS information, including at least one BSSID and at least one BSS color associated with respective BSS devices, including a first device (e.g., BSSID_1, BSS color_1), a second device (e.g., BSSID_2, BSS color_2), up to N devices (e.g., BSSID N, BSS color N). In some implementations, the BSS information may of the octets may include a subfield for an AP to disable a BSS color. In some examples, an AP 105 may disable a BSS color via at least one bit in a BSS color field (e.g., BSS color_1) of the second octets (or the single octets) based on determining a BSS color collision or that the BSS color collision continues for a duration. For example, AP 105 may disable a BSS color by setting a value of the at least one bit in the BSS color field associated with the stored BSS information to a value 1. Alternatively, in some implementations, if AP 105 determines that no BSS color collision occurred, that is AP 105 does not detect any BSS color overlap associated with two or more BSSs or a OBSS, AP 105 may set a value of the at least one bit in the BSS color field associated with the stored BSS information to a value 0. These second example octets may store or include information that will be present in or related to the event report itself or the event report element.

| | BSSID_1 | BSS color_1 | BSSID_2 | BSS color_2 | ... | BSSID_N | BSS color_N |
|---|---|---|---|---|---|---|---|
| Octets: | 6 | 1 | 6 | 1 | ... | 6 | 1 |

As another example, an AP may generate and transmit a bitmap to one or more STAs. The bitmap may be a n octet number bitmap where n is an integer; for example a 6 octet or 8 octet bitmap with 64 bit values with each bit corresponding to a BSS color associated with an AP. A bitmap may include one or more bits where at least some of the one or more bits indicate a BSS color selected by an AP. In some implementations, an AP may transmit a bitmap in a BSS color change announcement to a STA in a beacon or a separate frame (e.g., management frame or data frame). The AP may also, in some implementations, indicate a BSS color disabled in a bit or field of a bitmap. For example, an AP may assign a bit in a bitmap element to indicate that a BSS color is disabled. Alternatively, the AP may assign a field in a bitmap element to indicate that a BSS color is disabled. The AP may also indicate a partial BSS color disabled in a bit or field of a bitmap. In some examples, a bitmap may indicate information about BSS colors in use by other APs around a particular STA. For example, a bit value 1 may indicate that a BSS color is in use, while a bit value 0 may indicate that the BSS color is not in use.

| | BSS color 0 | BSS color_1 | BSS color_2 | BSS color_3 | ... | BSS color_N |
|---|---|---|---|---|---|---|
| Octets: | 6 | 1 | 6 | 1 | ... | 1 |

Figure 3:
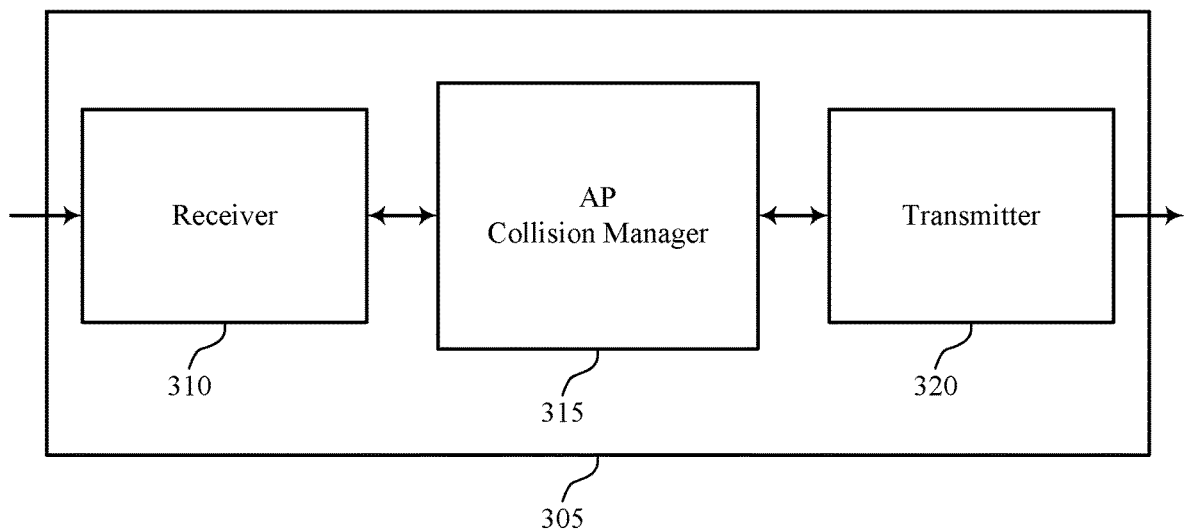
FIGS. 3-5 show block diagrams of a device that supports BSS collision detection and resolution in accordance with aspects of the present disclosure.

FIG. 3 shows a block diagram 300 of a wireless device 305 that supports BSS collision detection and resolution in accordance with various aspects of the present disclosure. In some examples, wireless device 305 may support BSS attribute value collision detection and resolution. In some examples, this BSS attribute value collision detection and resolution may include, but is not limited to, BSS color collision detection and resolution. Wireless device 305 may be an example of aspects of an AP 105 as described with reference to FIG. 1. Wireless device 305 may include receiver 310, AP collision manager 315, and transmitter 320. Wireless device 305 also may include a processor. Each of these components may be in communication with one another (e.g., via buses).

Receiver 310 may receive information such as packets, user data, or control information associated with various information channels (e.g., control channels, data channels, and information related to BSS color collision detection and resolution). Information may be passed on to other components of the device. The receiver 310 may be an example of aspects of the transceiver 635 described with reference to FIG. 6.

Receiver 310 may receive BSS color information including a second BSS color associated with a second AP and receive other BSS color information associated with the second AP based on the transmitted second event request. In some implementations, the received BSS color information is associated with the second AP. In some implementations, receiving the BSS color information includes receiving a frame from a device, where the device includes the second AP in communication range with the first AP. In some implementations, the received frame includes a beacon, or a management frame element, or a probe response, or an association response, or a combination thereof. Receiver 310, in some examples, may receive other BSS color information associated with a second AP based on an event request. In some implementations, receiver 310 may receive BSS color information associated with the one or more neighboring BSSs based on a response to a transmitted query. Receiver 310 may receive a frame from a device, where the device includes a neighboring AP, a device participating in a neighboring BSS or a OBSS.

AP collision manager 315 may be an example of aspects of the AP collision manager 615 described with reference to FIG. 6. AP collision manager 315 may identify a first attribute value associated with the first AP, receive a second attribute value, and determine that the first attribute value associated with the first AP is the same as the received second attribute value. The first attribute value associated with the first AP, or the received second attribute value, or both identified a BSS in a PHY layer header, or a preamble of a frame (e.g., data frame or management frame), or both. In some implementations, the second attribute value is associated with the second AP. The first attribute value or the second attribute value, or both may be an n-bit value identifying a BSS, BSS color, BSSID, SSID, OBSSID, ESSID, or a combination thereof. AP collision manager 315 may detect a BSS collision based on determining that the first attribute value is the same as the second attribute value.

The first attribute value may include a first BSS color and the received second attribute value may include a second BSS color. AP collision manager 315 may identify a first BSS color associated with the first AP, determine that the first BSS color is the same as the second BSS color, and detect a BSS color collision based on the determining. In some examples, AP collision manager 315 may identify a first BSSID associated with the first AP, and identify a second BSSID associated with the second AP from a received frame. The received frame may include a DTIM beacon, a probe response frame, an association response frame, or a combination thereof. AP collision manager 315 may determine that the first BSSID is different from the second BSSID based on the identifying.

AP collision manager 315 may determine that a BSS color collision continues for a duration that satisfies a threshold period. The threshold period may be predetermined by a network operator, or assigned by an end-user. In some implementations, AP collision manager 315 may disable a BSS color via at least one bit in a BSS color field transmitted in the DTIM beacon, the probe response frame, the association response frame, or a combination thereof based on determining that the BSS color collision continues for the duration. The BSS color field may be an unsigned or signed integer value. The unsigned or signed integer value may identify a BSS color of a BSS associated with the first AP, or STA.

In some implementations, the unsigned or signed integer value may indicate whether an intended receiving device (e.g., STA, AP) of a PPDU is not a member of a transmitting device's BSS. AP collision manager 315 may adjust the first BSS color associated with the first AP to a different BSS color based on determining that the detected BSS color collision continues for a duration that satisfies a threshold value. The threshold value may be a different type of threshold compared to the threshold period. For example, the threshold value may an operating characteristic (e.g., receive and transmit power) over the duration.

In some implementations, AP collision manager 315 may generate a random BSS color different from the first BSS color. In some implementations, AP collision manager 315 may adjust the first BSS color based on the random BSS color. In some examples, adjusting the first BSS color includes selecting a new BSS color associated with the first AP based on at least one BSS color associated with an OBSS. The selected new BSS color may include a non-overlapping BSS color distinct from the BSS color associated with the OBSS. In some implementations, AP collision manager 315 may generate a color in a range. In some examples, the color may be in a predetermined range. AP collision manager 315 may select the new BSS color based on the range. In some implementations, AP collision manager 315 may identify an additional BSS color associated with the second AP from received other BSS color information.

AP collision manager 315 may determine that a color collision exists between at least one neighboring BSS and the first AP based on received BSS color information, and select a new BSS color for the first AP. The new BSS color may include a non-overlapping BSS color distinct from a BSS color indicated in the received BSS color information associated with the at least one neighboring BSS based on determining that the color collision exists. In some examples, the AP collision manager 315 may be, include, or perform operations related to a BSS Collision Component 130 (e.g., 130-*a*, 130-*b*, 130-*c*), as discussed with reference to FIGS. 1 and 2.

Transmitter 320 may transmit signals generated by other components of the device. In some examples, the transmitter 320 may be collocated with a receiver 310 in a transceiver module. For example, the transmitter 320 may be an example of aspects of the transceiver 635 described with reference to FIG. 6. The transmitter 320 may include a single antenna, or it may include a set of antennas. Transmitter 320 may transmit BSS color collision information to a STA served by the first AP based on determining that the BSS color collision continues for the duration. In some examples, the BSS color collision information is transmitted in a DTIM beacon, a probe response frame, an association response frame, or a combination thereof. In some implementations, transmitter 320 may transmit color information based on the maintained first BSS color to a STA, transmit BSS color collision information during a next period (e.g., DTIM period, TBTT period), and transmit BSS color information based on the adjusted first BSS color to at least one STA served by the first AP.

In some implementations, transmitter 320 may transmit BSS color information during the next period. Transmitter 320 may transmit BSS color information in a DTIM beacon, a probe response frame, an association response frame, or a special frame, or a combination thereof based on the adjusted first BSS color to at least one STA served by the first AP. The BSS color information may include a BSS color change announcement including a reference time when a BSS color change will occur and an indication of a new BSS color selected by the first AP. The reference time is a countdown value associated with a TBTT. In some examples, the STA may adjust the TBTT. For example, the STA may negotiate a wake TBTT and listen interval for beacon frames it intends to receive from an associated AP. The STA may adjust the TBTT based on receiving a transmission schedule from the associated AP.

Transmitter 320 may transmit an event request requesting BSS color information to a STA. In some implementations, transmitter 320 may transmit a second color in the range based on identified additional BSS color associated with the second AP from the received other BSS color information. Transmitter 320 also may transmit an event request requesting BSS color information to a STA, where the received BSS color information associated with a second AP is based on a response to the transmitted event request. In some implementations, transmitter 320 may transmit a second event request requesting BSS color information to a STA, and transmit a second BSS color in the range based on identifying the additional BSS color associated with the second AP from the received other BSS color information. In some implementations, the BSS color collision information includes a BSS color based on the determined BSS color collision. In some implementations, the BSS color includes a predetermined value. In some implementations, the transmitting BSS color collision information is independent of a bit indicating the detected BSS color collision. In some implementations, the BSS color collision information includes a single bit storing a value indicating the detected BSS color collision. In some examples, transmitter 320 may transmit a query requesting BSS color information associated with one or more neighboring BSSs to one or more STAs associated with the first AP. Transmitter 320 may transmit the query to one or more STAs based on a coverage area associated with the first AP, the one or more STAs, or both.

Figure 4:
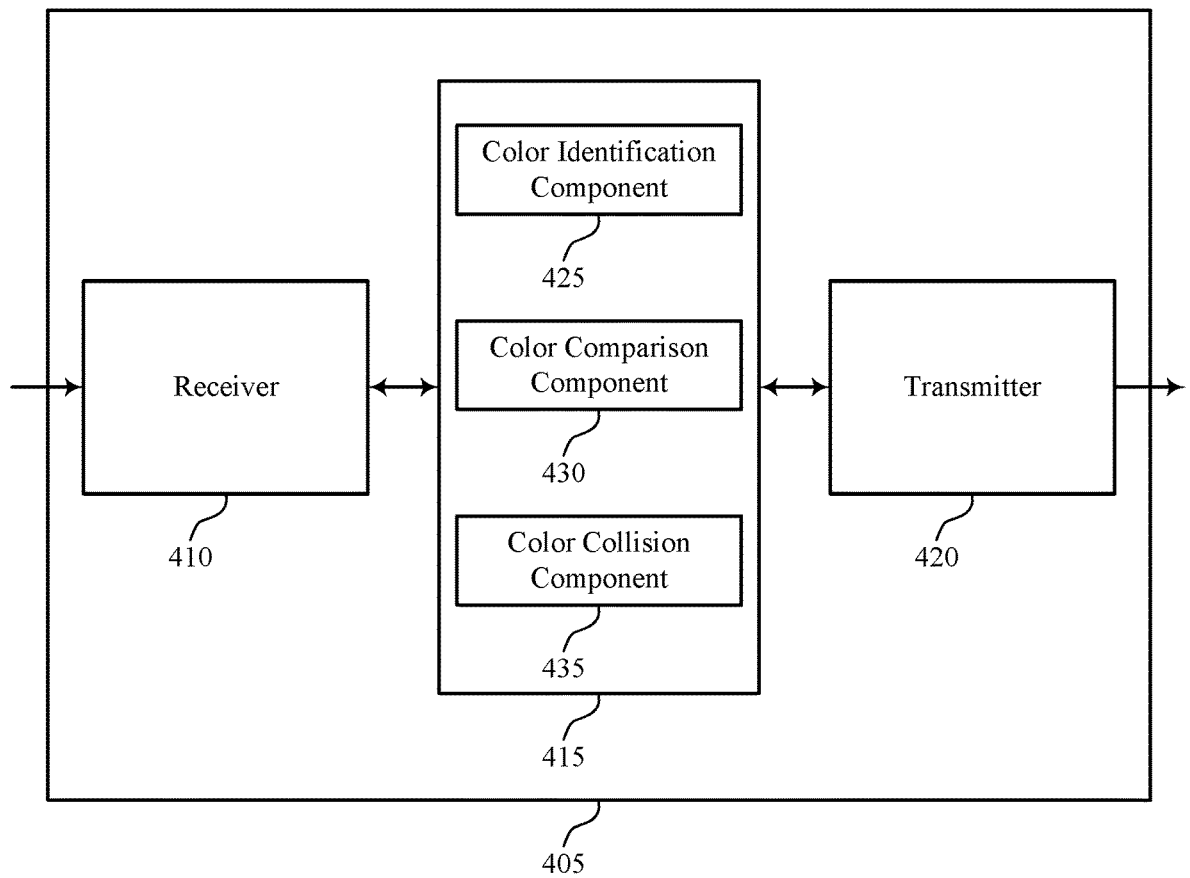

FIG. 4 shows a block diagram 400 of a wireless device 405 that supports BSS collision detection and resolution in accordance with various aspects of the present disclosure. In some examples, wireless device 405 may support BSS attribute value collision detection and resolution. In some examples, this BSS attribute value collision detection and resolution may include, but is not limited to, BSS color collision detection and resolution. The wireless device 405 may be an example of aspects of a wireless device 305 or an AP 105 as described with reference to FIGS. 1 and 3. The wireless device 405 may include receiver 410, AP collision manager 415, and transmitter 420. The wireless device 405 also may include a processor. Each of these components may be in communication with one another (e.g., via buses).

The receiver 410 may receive information such as packets, user data, or control information associated with various information channels (e.g., control channels, data channels, and information related to BSS color collision detection and resolution, etc.). Information may be passed on to other components of the device. The receiver 410 may be an example of aspects of the transceiver 635 described with reference to FIG. 6.

The AP collision manager 415 may be an example of aspects of the AP collision manager 615 described with reference to FIG. 6. AP collision manager 415 also may include color identification component 425, color comparison component 430, and color collision component 435.

The color identification component 425 may identify a first attribute value associated with a first AP. An attribute value may be an n-bit value, where n is an integer. In some implementations, the n-bit value may identify a BSS color. The color identification component 425 may identify a received second attribute value. The second attribute value may be associated with a second AP. The color identification component 425 may identify a first BSS color associated with the first AP and a second BSS color associated with the second AP.

The color comparison component 430 may determine that the first attribute vale associated with the first AP is the same as the received second attribute value. In some implementations, color comparison component 430 may determine that the first BSS color is the same as the second BSS color. The color collision component 435 may detect a BSS color collision based on the determining.

The transmitter 420 may transmit signals generated by other components of the device. In some examples, the transmitter 420 may be collocated with a receiver 410 in a transceiver module. For example, the transmitter 420 may be an example of aspects of the transceiver 635 described with reference to FIG. 6. The transmitter 420 may include a single antenna, or it may include a set of antennas.

Figure 5:
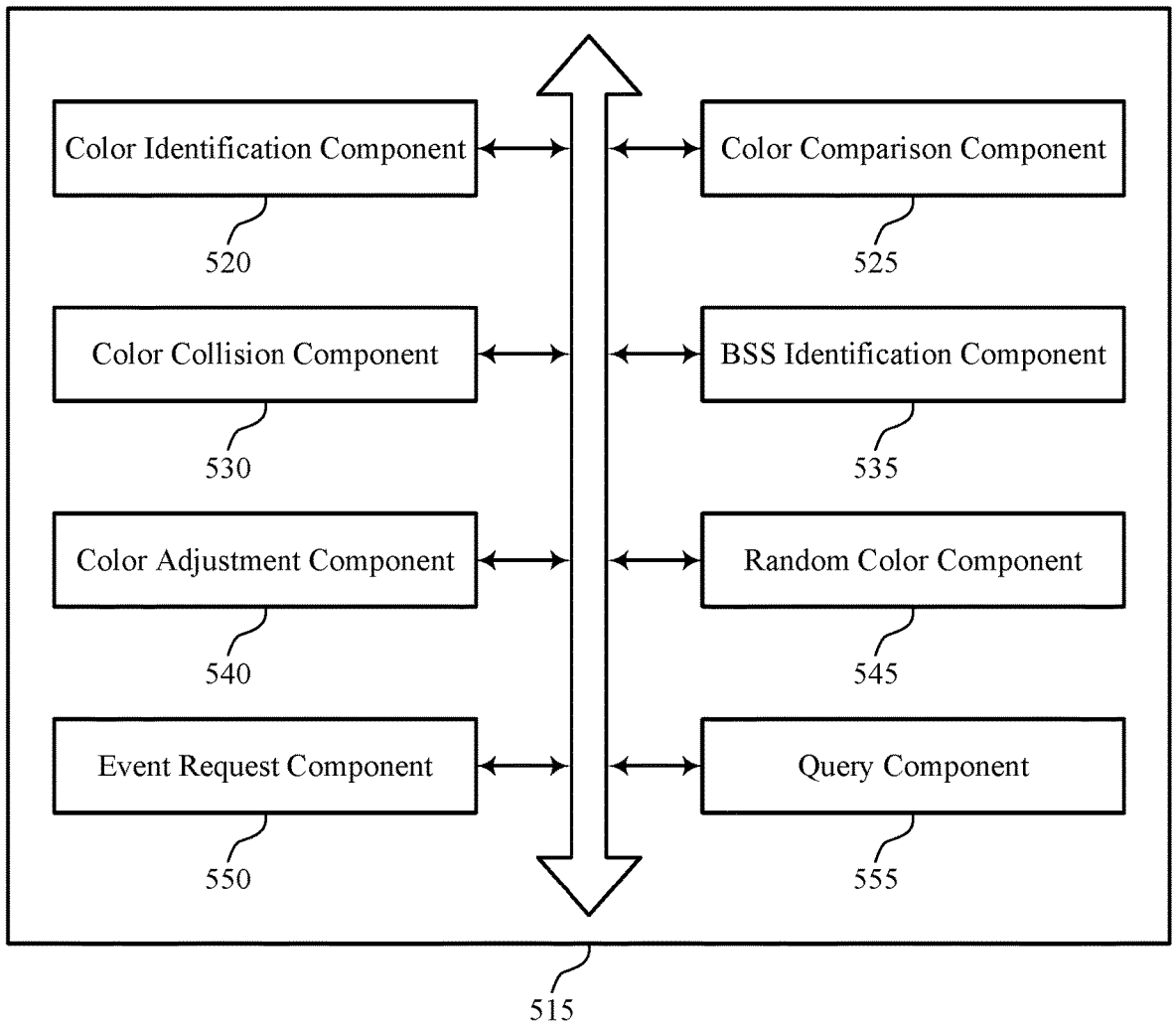

FIG. 5 shows a block diagram 500 of an AP collision manager 515 that supports BSS collision detection and resolution in accordance with various aspects of the present disclosure. In some examples, AP collision manager 515 may support BSS attribute value collision detection and resolution. In some examples, this BSS attribute value collision detection and resolution may include, but is not limited to, BSS color collision detection and resolution. The AP collision manager 515 may be an example of aspects of an AP collision manager 315, an AP collision manager 415, or an AP collision manager 615 described with reference to FIGS. 3, 4, and 6. The AP collision manager 515 may include color identification component 520, color comparison component 525, color collision component 530, BSS identification component 535, color adjustment component 540, random color component 545, event request component 550, and query component 555. Each of these modules may communicate, directly or indirectly, with one another (e.g., via buses).

The color identification component 520 may identify a first attribute value associated with a first AP. An attribute value may be an n-bit value, where n is an integer. In some implementations, the n-bit value may identify a BSS color. The color identification component 520 may identify a received second attribute value. The second attribute value may be associated with a second AP. The first attribute value associated with the first AP, or the received second attribute value, or both identifies a BSS in a PHY layer header. The color identification component 520 may identify a first BSS color associated with the first AP and identify an additional BSS color associated with the second AP from the received other BSS color information.

The color comparison component 525 may determine that the first attribute vale associated with the first AP is the same as the received second attribute value. In some implementations, color comparison component 525 may determine that the first BSS color is the same as the second BSS color. The color comparison component 525 may detect a BSS color collision based at on determining that the first attribute value associated with the first AP is the same as the received second attribute value.

The color comparison component 525 may determine that the BSS color collision continues for a duration that satisfies a threshold period, and transmit BSS color collision information to a STA served by the first AP based on determining that the BSS color collision continues for the duration. The BSS color collision information may be transmitted in a DTIM beacon, a probe response frame, an association response frame, or a combination thereof. The color comparison component 525 may transmit the BSS color collision information during at least a next period (e.g., DTIM period, TBTT period).

The BSS identification component 535 may identify a first BSSID associated with the first AP, identify a second BSSID associated with the second AP from a received frame, and determine that the first BSSID is different from the second BSSID based on the identifying.

The color adjustment component 540 may disable a BSS color, associated with the first AP, via at least one bit in a BSS color field transmitted in the DTIM beacon, the probe response frame, the association response frame, or a combination thereof based on determining that the BSS color collision continues for the duration. The color adjustment component 540 may adjust the first BSS color associated with the first AP to a different BSS color based on determining that the detected BSS color collision continues for a duration that satisfies a threshold value. The color adjustment component 540 may transmit BSS color information in a DTIM beacon, a probe response frame, an association response frame, or a special frame, or a combination thereof based on the adjusted first BSS color to at least one STA served by the first AP. The BSS color information may include a BSS color change announcement including a reference time when a BSS color change will occur and an indication of a new BSS color selected by the first AP. The reference time is a countdown value associated with a TBTT. In some examples, the STA may adjust the TBTT. For example, the STA may negotiate a wake TBTT and listen interval for beacon frames it intends to receive from an associated AP. The STA may adjust the TBTT based on receiving a transmission schedule from the associated AP.

The color adjustment component 540 may adjust a first BSS color associated with the first AP based on the detected BSS color collision. In some implementations, color adjustment component 540 may generate a color in a range, where selecting the new BSS color is based on the generated color. The color adjustment component 540 may adjust the first BSS color associated with the first AP to a value different from the second BSS color associated with the second AP, set the first BSS color associated with the first AP based on an absence of a response to the transmitted query, and maintain the first BSS color associated with the first AP at a same value. In some implementations, the adjusting the first BSS color includes selecting a new BSS color associated with the first AP based on the second BSS color associated with the second AP. In some implementations, the new BSS color includes a non-overlapping BSS color distinct from the second BSS color associated with the second AP.

The random color component 545 may generate a random BSS color different from the first BSS color, where adjusting the first BSS color is based on the random BSS color. In some implementations, adjusting the first BSS color includes selecting a new BSS color associated with the first AP based on at least one BSS color associated with an OBSS. The selected new BSS color may include a non-overlapping BSS color distinct from the BSS color associated with the OBSS.

The event request component 550 may transmit an event request requesting BSS color information to a STA, where receiving BSS color information associated with the second AP is based on a response to the transmitted event request. In some implementations, event request component 550 may receive other BSS color information associated with a second AP based on the transmitted event request. The event request component 550 may identify an additional BSS color associated with the second AP from the received other BSS color information, and transmit a second color in the range based on identified additional BSS color associated with the second AP from the received other BSS color information.

The query component 555 may transmit a query requesting BSS color information to a device, the device including the second AP in communication range with the first AP, where receiving the BSS color information is based on a response to the transmitted query. In some implementations, transmitting the query includes transmitting the query to the second AP based on a coverage area associated with the first AP. In some implementations, transmitting the query includes transmitting the query to the second AP via a STA based on a coverage area associated with the first AP, or the STA, or a combination thereof. In some implementations, the transmitted query includes a probe request, a backhaul link communication, other alternatives, or some combination of these.

The query component 555 may transmit a query requesting BSS color information associated with one or more neighboring BSSs to one or more STAs associated with the first AP, and receive the BSS color information associated with the one or more neighboring BSSs based on a response to the transmitted query. In some implementations, query component 555 may determine that a color collision exists between at least one neighboring BSS and the first AP based on the received BSS color information, and select a new BSS color including a non-overlapping BSS color distinct from a BSS color indicated in the received BSS color information associated with the at least one neighboring BSS based on determining that the color collision exists. In some examples, query component 555 may transmit the query to one or more STAs based on a coverage area associated with the first AP, the one or more STAs, or both. In some examples, query component 555 may receive a frame from a device, the device includes a neighboring AP, a device participating in a neighboring BSS or a OBSS.

Figure 6:
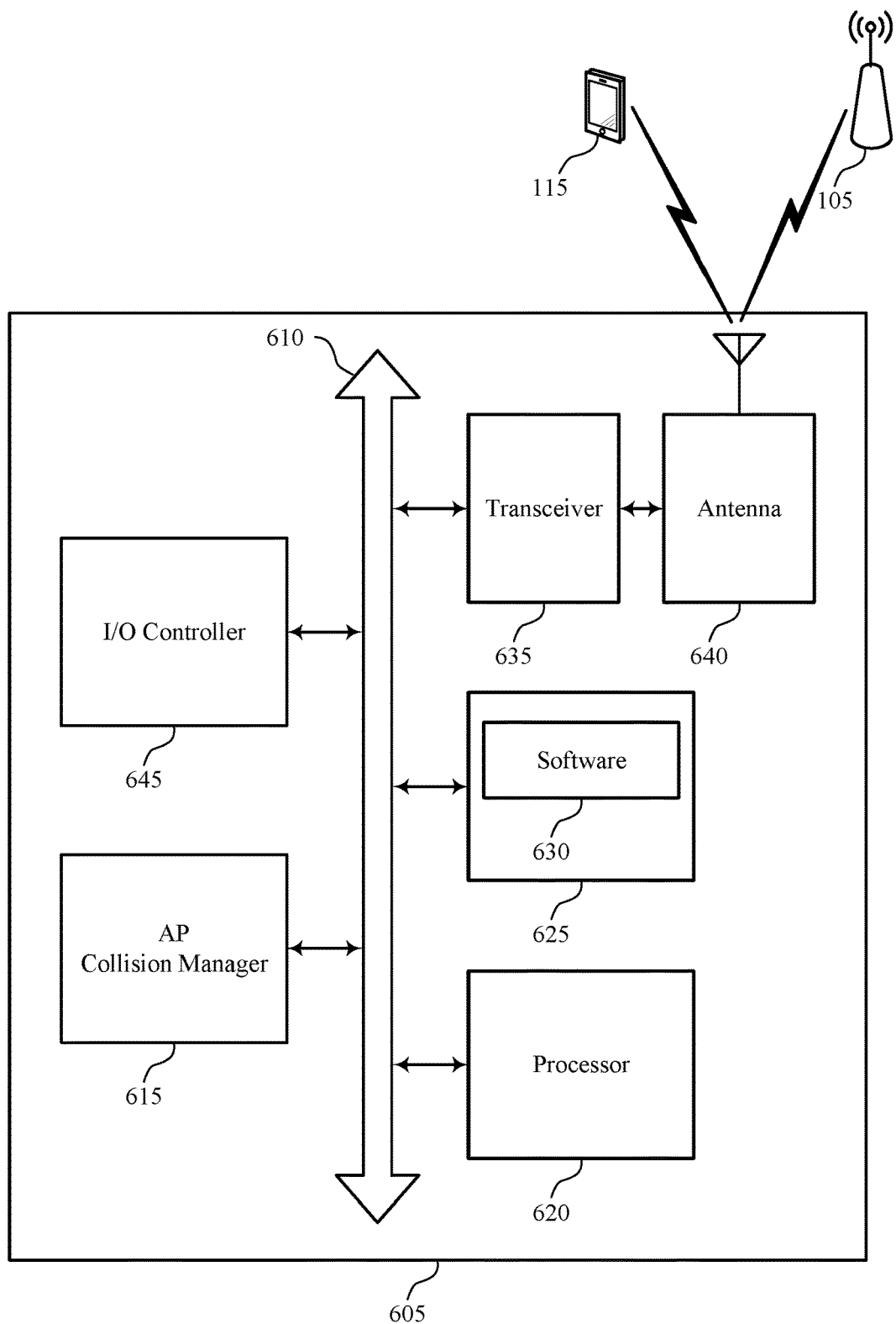
FIG. 6 illustrates a block diagram of a system including an AP that supports BSS collision detection and resolution in accordance with aspects of the present disclosure.

FIG. 6 shows a diagram of a system 600 including a device 605 that supports BSS collision detection and resolution in accordance with various aspects of the present disclosure. In some examples, device 605 may support BSS attribute value collision detection and resolution. In some examples, this BSS attribute value collision detection and resolution may include, but is not limited to, BSS color collision detection and resolution. Device 605 may be an example of or include the components of wireless device 305, wireless device 405, or an AP 105 as described above, e.g., with reference to FIGS. 1, 3 and 4. Device 605 may include components for bi-directional voice and data communications including components for transmitting and receiving communications, including AP collision manager 615, processor 620, memory 625, software 630, transceiver 635, antenna 640, and I/O controller 645.

The processor 620 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some implementations, processor 620 may be configured to operate a memory array using a memory controller. In other implementations, a memory controller may be integrated into processor 620. The processor 620 may be configured to execute computer-readable instructions stored in a memory to perform various functions (e.g., functions or tasks supporting BSS color collision detection and resolution).

The memory 625 may include random access memory (RAM) and read only memory (ROM). The memory 625 may store computer-readable, computer-executable software 630 including instructions that, when executed, cause the processor to perform various functions described herein. In some implementations, the memory 625 may contain, among other things, a Basic Input-Output system (BIOS) which may control basic hardware or software operation such as the interaction with peripheral components or devices. The software 630 may include code to implement aspects of the present disclosure, including code to support BSS color collision detection and resolution. The software 630 may be stored in a non-transitory computer-readable medium such as system memory or other memory. In some implementations, the software 630 may not be directly executable by the processor but may cause a computer (e.g., when compiled and executed) to perform functions described herein.

The transceiver 635 may communicate bi-directionally, via antennas, wired, or wireless links as described above. For example, the transceiver 635 may represent a wireless transceiver and may communicate bi-directionally with another wireless transceiver. The transceiver 635 also may include a modem to modulate the packets and provide the modulated packets to the antennas for transmission, and to demodulate packets received from the antennas. In some implementations, the wireless device may include a single antenna 640. However, in some implementations the device may have more than one antenna 640, which may be capable of concurrently transmitting or receiving multiple wireless transmissions.

The I/O controller 645 may manage input and output signals for device 605. Input/output control component 645 also may manage peripherals not integrated into device 605. In some implementations, input/output control component 645 may represent a physical connection or port to an external peripheral. In some implementations, I/O controller 645 may utilize an operating system such as iOS®, ANDROID®, MS-DOS®, MS-WINDOWS®, OS/2®, UNIX®, LINUX®, or another known operating system.

Figure 7:
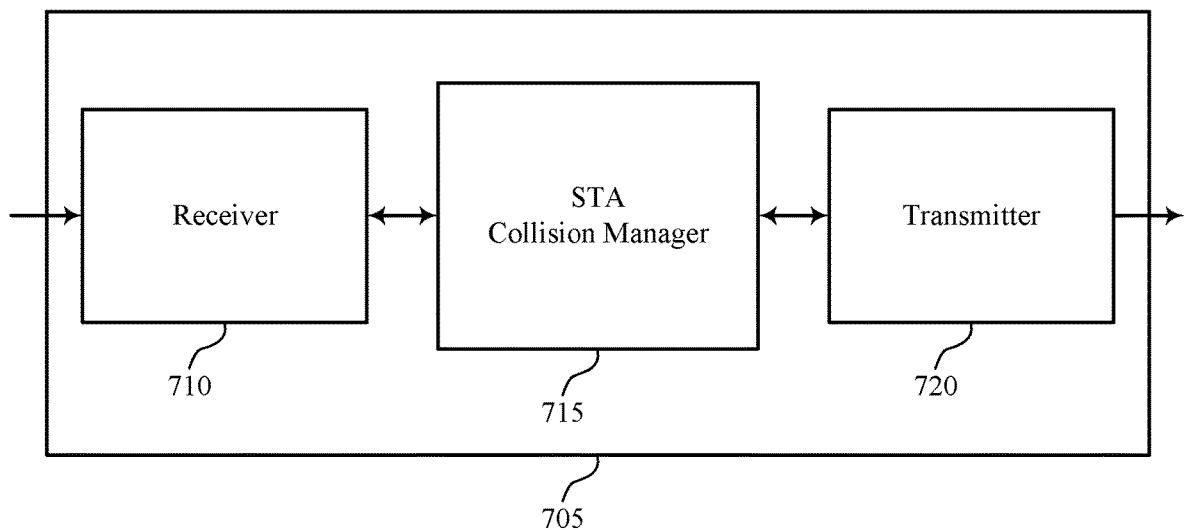
FIGS. 7-9 show block diagrams of a device that supports BSS collision detection and resolution in accordance with aspects of the present disclosure.

FIG. 7 shows a block diagram 700 of a wireless device 705 that supports BSS collision detection and resolution in accordance with various aspects of the present disclosure. In some examples, wireless device 705 may support BSS attribute value collision detection and resolution. In some examples, this BSS attribute value collision detection and resolution may include, but is not limited to, BSS color collision detection and resolution. Wireless device 705 may be an example of aspects of a STA 115 as described with reference to FIG. 1. Wireless device 705 may include receiver 710, STA collision manager 715, and transmitter 720. Wireless device 705 also may include a processor. Each of these components may be in communication with one another (e.g., via buses).

The receiver 710 may receive information such as packets, user data, or control information associated with various information channels (e.g., control channels, data channels, and information related to BSS color collision detection and resolution, etc.). Information may be passed on to other components of the device. The receiver 710 may be an example of aspects of the transceiver 1035 described with reference to FIG. 10. Receiver 710 may receive a frame containing a BSS color information including a second BSS color associated with a second AP.

The STA collision manager 715 may be an example of aspects of the STA collision manager 1015 described with reference to FIG. 10. STA collision manager 715 may identify a first attribute value associated with a first AP. In some examples, the STA collision manager 715 may receive a frame including a second attribute value. The frame may be a DTIM beacon, a probe response frame, an association response frame, a special frame, or a combination thereof. The first attribute value or the second attribute value, or both may be an n-bit value identifying a BSS, BSS color, BSSID, SSID, OBSSID, ESSID, or a combination thereof. The STA collision manager 715 may identify that the first attribute value and the received second attribute value are the same. The STA collision manager 715 may detect a BSS collision based on determining that the first attribute value is the same as the second attribute value.

The STA collision manager 715 may identify a first BSS color associated with the first AP, identify that the first BSS color associated with the first AP and the second BSS color associated with the second AP are the same, and identify a first BSSID associated with the first AP. The STA collision manager 715 may identify a second BSSID associated with the second AP from the BSS color information, determine that the first BSSID is different from the second BSSID based on the identifying, and detect a BSS color collision based on the determination. In some examples, the STA collision manager 715 may be, include, or perform operations related to a BSS Collision Component 130 (e.g., 130-*a*, 130-*b*, 130-*c*), as discussed with reference to FIGS. 1 and 2.

The transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
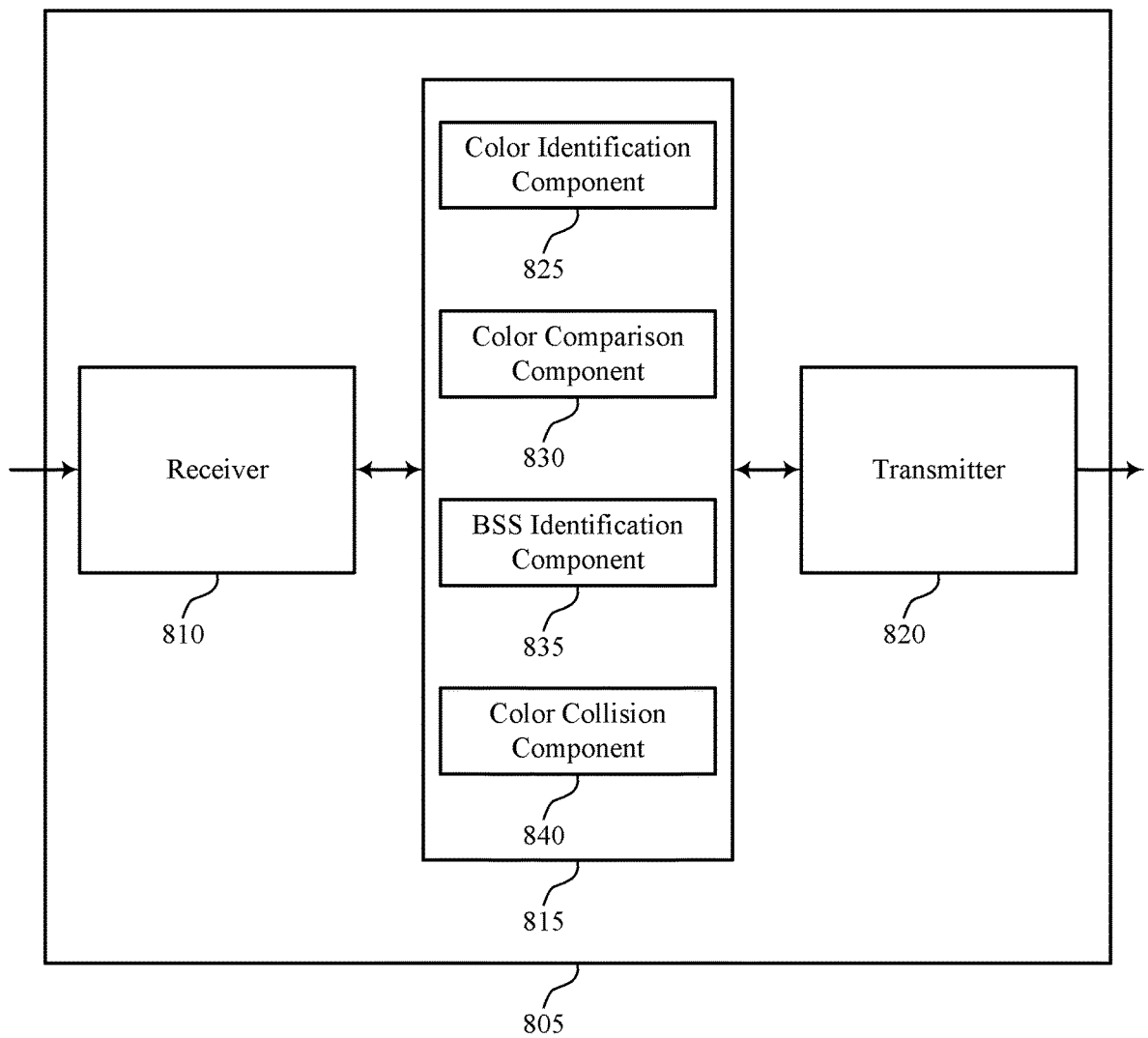

FIG. 8 shows a block diagram 800 of a wireless device 805 that supports BSS collision detection and resolution in accordance with various aspects of the present disclosure. In some examples, wireless device 805 may support BSS attribute value collision detection and resolution. In some examples, this BSS attribute value collision detection and resolution may include, but is not limited to, BSS color collision detection and resolution. Wireless device 805 may be an example of aspects of a wireless device 705 or a STA 115 as described with reference to FIGS. 1 and 7. Wireless device 805 may include receiver 810, STA collision manager 815, and transmitter 820. Wireless device 805 also may include a processor. Each of these components may be in communication with one another (e.g., via buses).

The receiver 810 may receive information such as packets, user data, or control information associated with various information channels (e.g., control channels, data channels, and information related to BSS color collision detection and resolution). Information may be passed on to other components of the device. The receiver 810 may be an example of aspects of the transceiver 1035 described with reference to FIG. 10.

The STA collision manager 815 may be an example of aspects of the STA collision manager 1015 described with reference to FIG. 10. The STA collision manager 815 also may include color identification component 825, color comparison component 830, BSS identification component 835, and color collision component 840.

The color identification component 825 may identify a first attribute value associated with a first AP. In some examples, the color identification component 825 may receive a frame including a second attribute value. The frame may be a beacon (e.g., DTIM beacon, special beacon (ER beacon)), a probe response frame, an association response frame, a special frame (e.g., TIM frame), or a combination thereof. The first attribute value or the second attribute value, or both may be an n-bit value identifying a BSS, BSS color, BSSID, SSID, OBSSID, ESSID, or a combination thereof. The color identification component 825 may identify a first BSS color associated with a first AP. The color comparison component 830 may identify that the first attribute value and the received second attribute value are the same. In some implementations, color comparison component 830 may identify that the first BSS color associated with the first AP and the second BSS color associated with the second AP are the same. The BSS identification component 835 may identify a first BSSID associated with the first AP, identify a second BSSID associated with the second AP from the BSS color information, and determine that the first BSSID is different from the second BSSID based on the identifying. The color collision component 840 may detect a BSS color collision based on the determination.

The transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
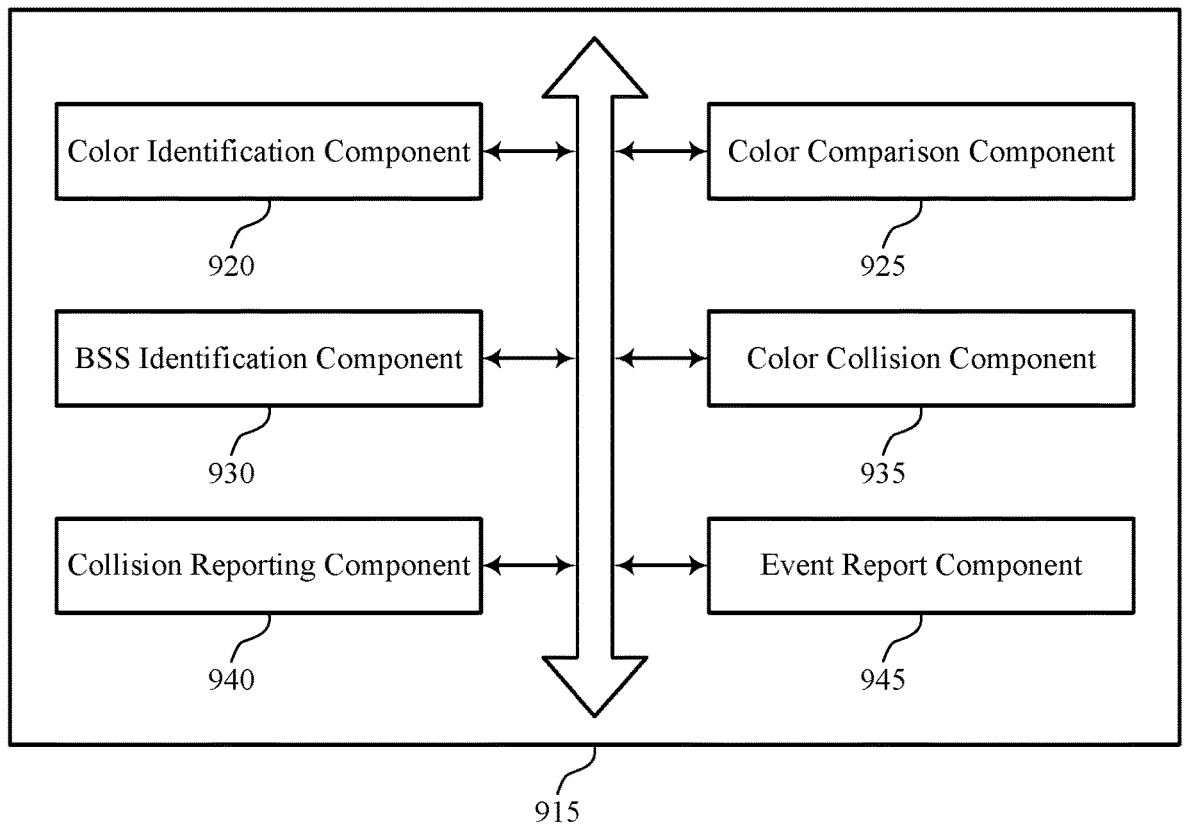

FIG. 9 shows a block diagram 900 of a STA collision manager 915 that supports BSS collision detection and resolution in accordance with various aspects of the present disclosure. In some examples, STA collision manager 915 may support BSS attribute value collision detection and resolution. In some examples, this BSS attribute value collision detection and resolution may include, but is not limited to, BSS color collision detection and resolution. The STA collision manager 915 may be an example of aspects of a STA collision manager 1015 described with reference to FIGS. 7, 8, and 10. The STA collision manager 915 may include color identification component 920, color comparison component 925, BSS identification component 930, color collision component 935, collision reporting component 940, and event report component 945. Each of these modules may communicate, directly or indirectly, with one another (e.g., via buses).

The color identification component 920 may identify a first attribute value associated with a first AP. In some examples, the color identification component 920 may receive a frame including a second attribute value. The frame may be a DTIM beacon, a probe response frame, an association response frame, a special frame, or a combination thereof. The first attribute value or the second attribute value, or both may be an n-bit value identifying a BSS color. The color identification component 920 may identify a first BSS associated with a first AP. The color comparison component 925 may identify that the first BSS color associated with the first AP and the second BSS color associated with the second AP are the same.

The BSS identification component 930 may identify a first BSSID associated with the first AP, identify, at the STA, a second BSSID associated with the second AP from the BSS color information, and determine, at the STA, that the first BSSID is different from the second BSSID based on the identifying.

The color collision component 935 may detect, at the STA, a BSS color collision based on the determination. The collision reporting component 940 may transmit a message indicating the detected BSS color collision. The event report component 945 may transmit an event report frame including an event report element to the first AP based on the determined BSS color collision. The event report may be generated autonomously by the STA. In some implementations, the event report element includes an event report field containing a bitmap including one or more bits where at least some of the one or more bits indicate a color selected by an OBSS, or identifying BSSID information, or BSS color information, or a BSS color collision detected by the second AP, or a BSS color disabled, or a combination thereof. In some implementations, the event report element includes at least an event report field identifying BSSID information, or BSS color information, or a detected BSS color collision, or a combination thereof associated with at least one AP currently in communication range with the STA, or previously in communication range of the STA, or a combination thereof. In some implementations, the event report element includes at least one event report field identifying BSSID information, or BSS color information, or a detected BSS color collision, or a combination thereof associated with a first device in a first BSS and identifying BSSID information, or BSS color information, or a detected BSS color collision, or a combination thereof associated with a second device in a second BSS. In some implementations, the event report element includes an event token enabling autonomous reporting by the STA to the first AP.

Figure 10:
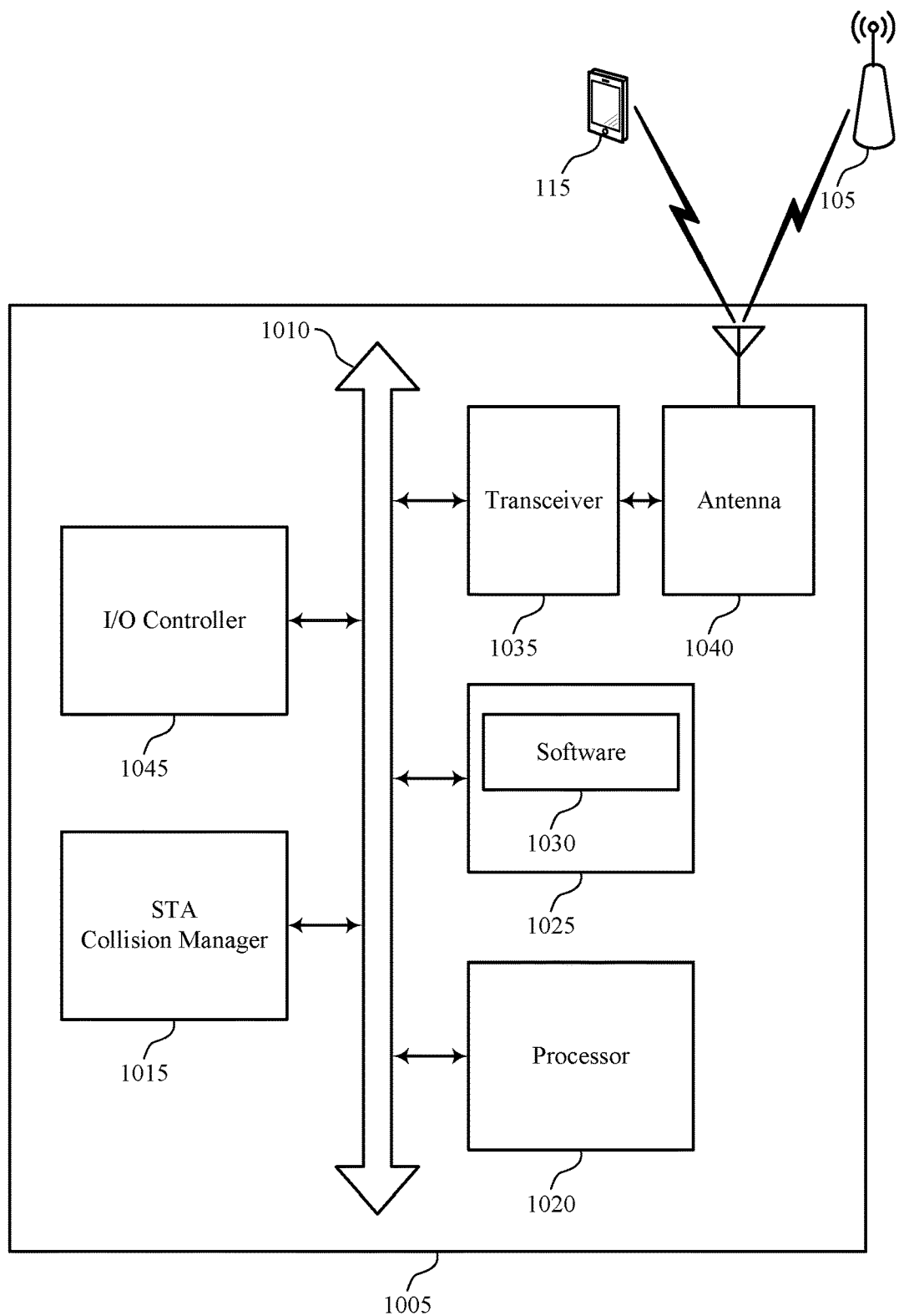
FIG. 10 illustrates a block diagram of a system including a STA that supports BSS collision detection and resolution in accordance with aspects of the present disclosure.

FIG. 10 shows a diagram of a system 1000 including a device 1005 that supports BSS collision detection and resolution in accordance with various aspects of the present disclosure. In some examples, device 1005 may support BSS attribute value collision detection and resolution. In some examples, this BSS attribute value collision detection and resolution may include, but is not limited to, BSS color collision detection and resolution. Device 1005 may be an example of or include the components of a STA 115 as described above, e.g., with reference to FIG. 1. Device 1005 may include components for bi-directional voice and data communications including components for transmitting and receiving communications, including STA collision manager 1015, processor 1020, memory 1025, software 1030, transceiver 1035, antenna 1040, and I/O controller 1045.

The processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some implementations, processor 1020 may be configured to operate a memory array using a memory controller. In other implementations, a memory controller may be integrated into processor 1020. The processor 1020 may be configured to execute computer-readable instructions stored in a memory to perform various functions (e.g., functions or tasks supporting BSS color collision detection and resolution).

The memory 1025 may include random access memory (RAM) and read only memory (ROM). The memory 1025 may store computer-readable, computer-executable software 1030 including instructions that, when executed, cause the processor to perform various functions described herein. In some implementations, the memory 1025 may contain, among other things, a Basic Input-Output system (BIOS) which may control basic hardware or software operation such as the interaction with peripheral components or devices. The software 1030 may include code to implement aspects of the present disclosure, including code to support BSS color collision detection and resolution. The software 1030 may be stored in a non-transitory computer-readable medium such as system memory or other memory. In some implementations, the software 1030 may not be directly executable by the processor but may cause a computer (e.g., when compiled and executed) to perform functions described herein.

The transceiver 1035 may communicate bi-directionally, via antennas, wired, or wireless links as described above. For example, the transceiver 1035 may represent a wireless transceiver and may communicate bi-directionally with another wireless transceiver. The transceiver 1035 also may include a modem to modulate the packets and provide the modulated packets to the antennas for transmission, and to demodulate packets received from the antennas. In some implementations, the wireless device may include a single antenna 1040. However, in some implementations the device may have more than one antenna 1040, which may be capable of concurrently transmitting or receiving multiple wireless transmissions.

The I/O controller 1045 may manage input and output signals for device 1005. Input/output control component 1045 also may manage peripherals not integrated into device 1005. In some implementations, input/output control component 1045 may represent a physical connection or port to an external peripheral. In some implementations, I/O controller 1045 may utilize an operating system such as iOS®, ANDROID®, MS-DOS®, MS-WINDOWS®, OS/2®, UNIX®, LINUX®, or another known operating system.

Figure 11:
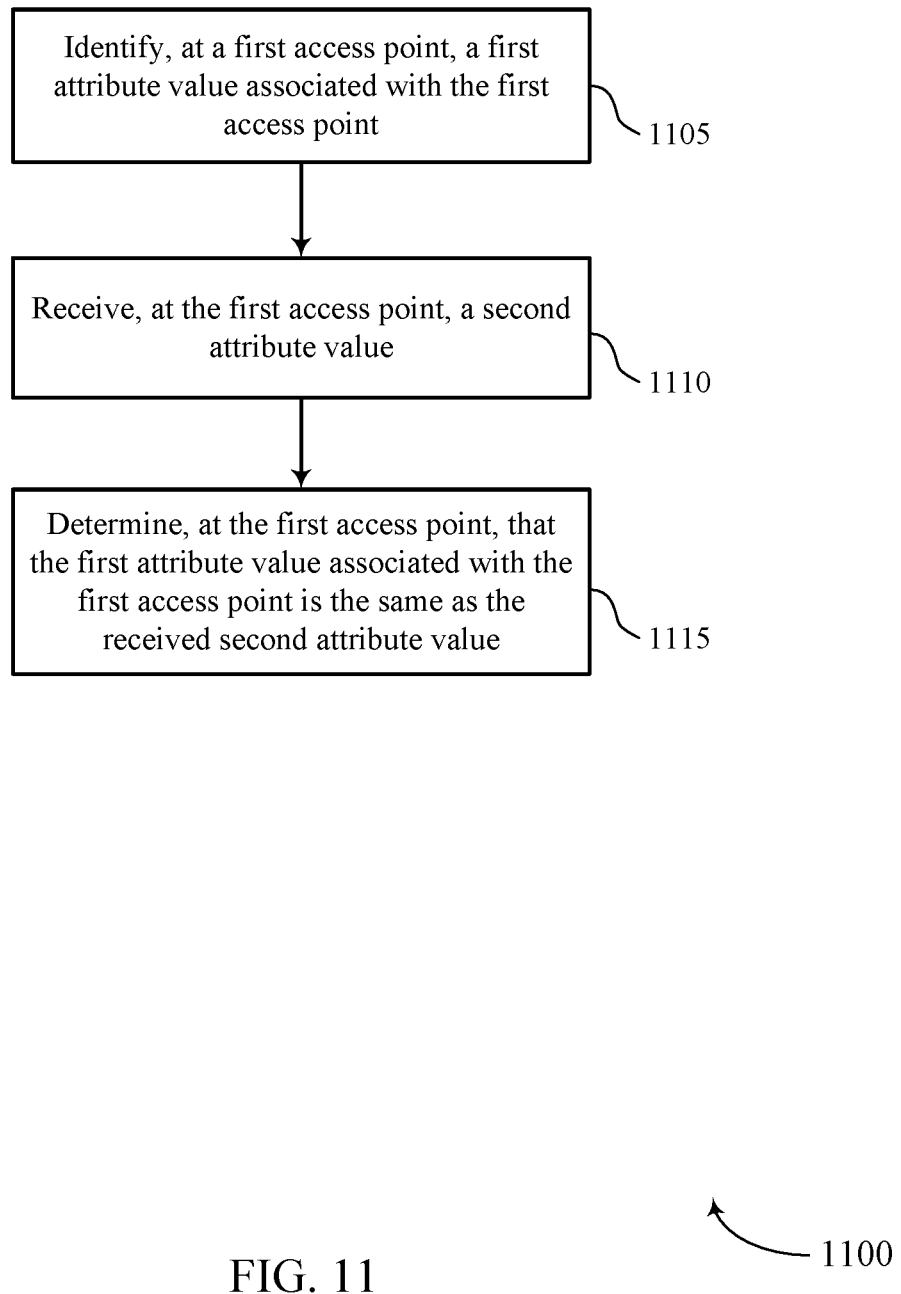
FIGS. 11-20 illustrate methods for BSS collision detection and resolution in accordance with aspects of the present disclosure.

FIG. 11 shows a flowchart illustrating a method 1100 for BSS collision detection and resolution in accordance with various aspects of the present disclosure. In some examples, method 1100 may support BSS attribute value collision detection and resolution. In some examples, this BSS attribute value collision detection and resolution may include, but is not limited to, BSS color collision detection and resolution. The operations of method 1100 may be implemented by an AP 105 or its components as described herein. For example, the operations of method 1100 may be performed by an AP collision manager 315, 415, 515, or 615 as described with reference to FIGS. 3-6. In some examples, an AP 105 may execute a set of codes to control the functional elements of the device to perform the functions described below. Additionally or alternatively, the AP 105 may perform aspects the functions described below using special-purpose hardware.

At block 1105, the AP 105 may identify a first attribute value associated with the AP 105. An attribute value may be an n-bit value, where n is an integer. In some implementations, the n-bit value may identify a BSS color. In other implementations, the n-bit value may indicate a BSSID (e.g., MAC address associated with AP 105). The n-bit value also may indicate a SSID of a BSS. In some examples, the first attribute value may identify a BSS in a PHY layer header. For example, the BSS color may be embedded in a field of the PHY layer header of a data frame or management frame. In some implementations, the attribute value may be a BSS color field unique to each BSS. The operations of block 1105 may be performed according to the methods described with reference to FIGS. 1 and 2. In some implementations, aspects of the operations of block 1105 may be performed by a color identification component 425 or 520 as described with reference to FIGS. 3-6.

At block 1110, the AP 105 may receive a second attribute value. The second attribute value may be associated with a second AP. The operations of block 1105 may be performed according to the methods described with reference to FIGS. 1 and 2. In some implementations, aspects of the operations of block 1105 may be performed by a color identification component 425 or 520 as described with reference to FIGS. 3-6.

At block 1115, the AP 105 may determine that the first attribute value associated with AP 105 is the same as the received second attribute value. In this implementation, the first attribute value of a first BSS and the second attribute value of a second BSS may be a same n-bit value. The n-bit value may identify a BSS color associated with the first BSS, and a BSS color associated with the second BSS. Additionally or alternatively, the attribute value of the first BSS and the second BSS may include a same or different ID in addition to a BSS color. For example in the implementation of an extended service set (ESS), a first AP and a second AP may have a same ESSID, but may have different BSS colors associated with the individual BSS of the first AP and the second AP. The operations of block 1115 may be performed according to the methods described with reference to FIGS. 1 and 2. In some implementations, aspects of the operations of block 1115 may be performed by a color comparison component 430 or 525 as described with reference to FIGS. 3-6.

Figure 12:
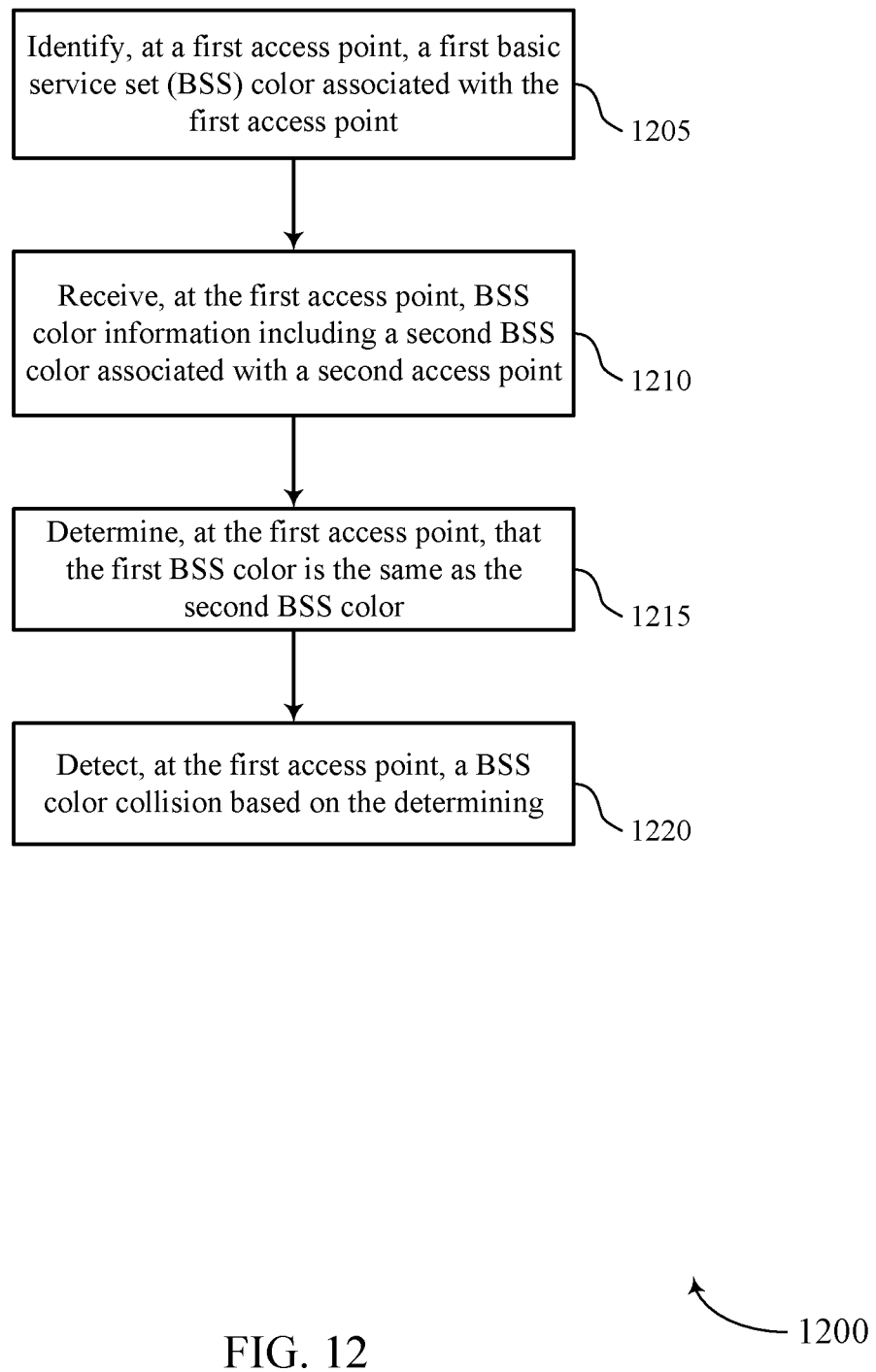

FIG. 12 shows a flowchart illustrating a method 1200 for BSS collision detection and resolution in accordance with various aspects of the present disclosure. In some examples, method 1200 may support BSS attribute value collision detection and resolution. In some examples, this BSS attribute value collision detection and resolution may include, but is not limited to, BSS color collision detection and resolution. The operations of method 1200 may be implemented by an AP 105 or its components as described herein. For example, the operations of method 1200 may be performed by an AP collision manager 315, 415, 515, or 615 as described with reference to FIGS. 3-6. In some examples, an AP 105 may execute a set of codes to control the functional elements of the device to perform the functions described below. Additionally or alternatively, the AP 105 may perform aspects the functions described below using special-purpose hardware.

At block 1205, the AP 105 may identify a first BSS color associated with the first AP. The operations of block 1205 may be performed according to the methods described with reference to FIGS. 1 and 2. In some implementations, aspects of the operations of block 1205 may be performed by a color identification component 425 or 520 as described with reference to FIGS. 3-6.

At block 1210, the AP 105 may receive BSS color information including a second BSS color associated with a second AP. The operations of block 1210 may be performed according to the methods described with reference to FIGS. 1 and 2. In some implementations, aspects of the operations of block 1210 may be performed by a receiver 310 or 410 as described with reference to FIGS. 3-6.

At block 1215, the AP 105 may determine that the first BSS color is the same as the second BSS color. The operations of block 1215 may be performed according to the methods described with reference to FIGS. 1 and 2. In some implementations, aspects of the operations of block 1215 may be performed by a color comparison component 430 or 525 as described with reference to FIGS. 3-6.

At block 1220, the AP 105 may detect a BSS color collision based on the determining. The operations of block 1220 may be performed according to the methods described with reference to FIGS. 1 and 2. In some implementations, aspects of the operations of block 1220 may be performed by a color collision component 435 or 530 as described with reference to FIGS. 3-6.

Figure 13:
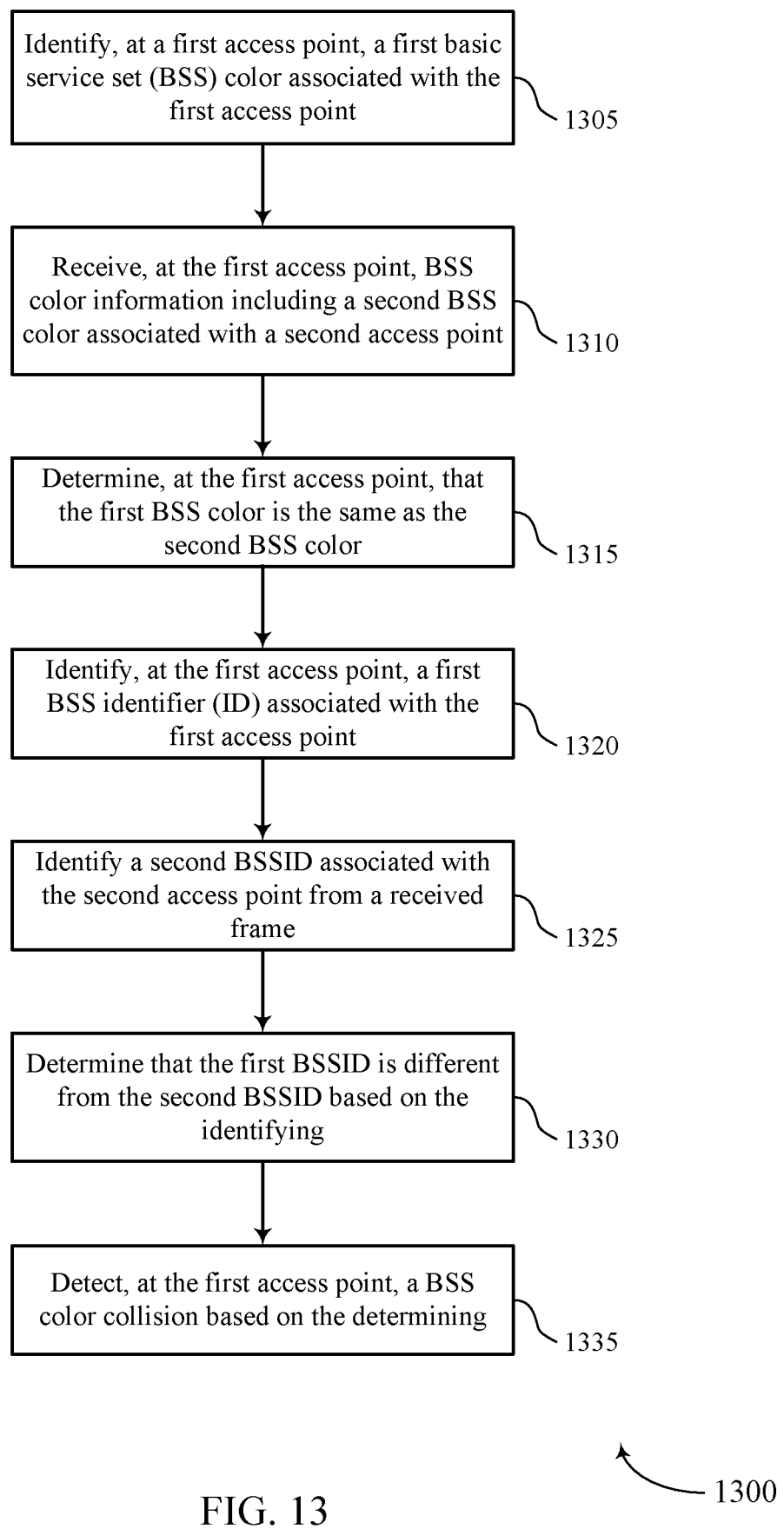

FIG. 13 shows a flowchart illustrating a method 1300 for BSS collision detection and resolution in accordance with various aspects of the present disclosure. In some examples, method 1300 may support BSS attribute value collision detection and resolution. In some examples, this BSS attribute value collision detection and resolution may include, but is not limited to, BSS color collision detection and resolution. The operations of method 1300 may be implemented by an AP 105 or its components as described herein. For example, the operations of method 1300 may be performed by an AP collision manager 315, 415, 515, or 615 as described with reference to FIGS. 3-6. In some examples, an AP 105 may execute a set of codes to control the functional elements of the device to perform the functions described below. Additionally or alternatively, the AP 105 may perform aspects the functions described below using special-purpose hardware.

At block 1305, the AP 105 may identify a first BSS color associated with the first AP. The operations of block 1305 may be performed according to the methods described with reference to FIGS. 1 and 2. In some implementations, aspects of the operations of block 1305 may be performed by a color identification component 425 or 520 as described with reference to FIGS. 3-6.

At block 1310, the AP 105 may receive BSS color information including a second BSS color associated with a second AP. The operations of block 1310 may be performed according to the methods described with reference to FIGS. 1 and 2. In some implementations, aspects of the operations of block 1310 may be performed by a receiver 310 or 410 as described with reference to FIGS. 3-6.

At block 1315, the AP 105 may determine that the first BSS color is the same as the second BSS color. The operations of block 1315 may be performed according to the methods described with reference to FIGS. 1 and 2. In some implementations, aspects of the operations of block 1315 may be performed by a color comparison component 430 or 525 as described with reference to FIGS. 3-6.

At block 1320, the AP 105 may identify a first BSSID associated with the first AP. The operations of block 1320 may be performed according to the methods described with reference to FIGS. 1 and 2. In some implementations, aspects of the operations of block 1320 may be performed by a BSS identification component 535 as described with reference to FIGS. 3-6.

At block 1325, the AP 105 may identify a second BSSID associated with the second AP from a received frame. The operations of block 1325 may be performed according to the methods described with reference to FIGS. 1 and 2. In some implementations, aspects of the operations of block 1325 may be performed by a BSS identification component 535 as described with reference to FIGS. 3-6.

At block 1330, the AP 105 may determine that the first BSSID is different from the second BSSID based on the identifying. The operations of block 1330 may be performed according to the methods described with reference to FIGS. 1 and 2. In some implementations, aspects of the operations of block 1330 may be performed by a BSS identification component 535 as described with reference to FIGS. 3-6.

At block 1335, the AP 105 may detect a BSS color collision based on the determining. The operations of block 1335 may be performed according to the methods described with reference to FIGS. 1 and 2. In some implementations, aspects of the operations of block 1335 may be performed by a color collision component 435 or 530 as described with reference to FIGS. 3-6. Additionally or alternatively, the AP 105 may transmit BSS color collision information to a STA served by the first AP. These operations may be performed according to the methods described with reference to FIGS. 1 and 2. In some implementations, aspects of these operations may be performed by a transmitter 320 or 420 as described with reference to FIGS. 3-6. Additionally or alternatively, the AP 105 may adjust a first BSS color associated with the first AP based on the detected BSS color collision. These operations may be performed according to the methods described with reference to FIGS. 1 and 2. In some implementations, aspects of these operations may be performed by a color adjustment component 540 as described with reference to FIGS. 3-6.

Figure 14:
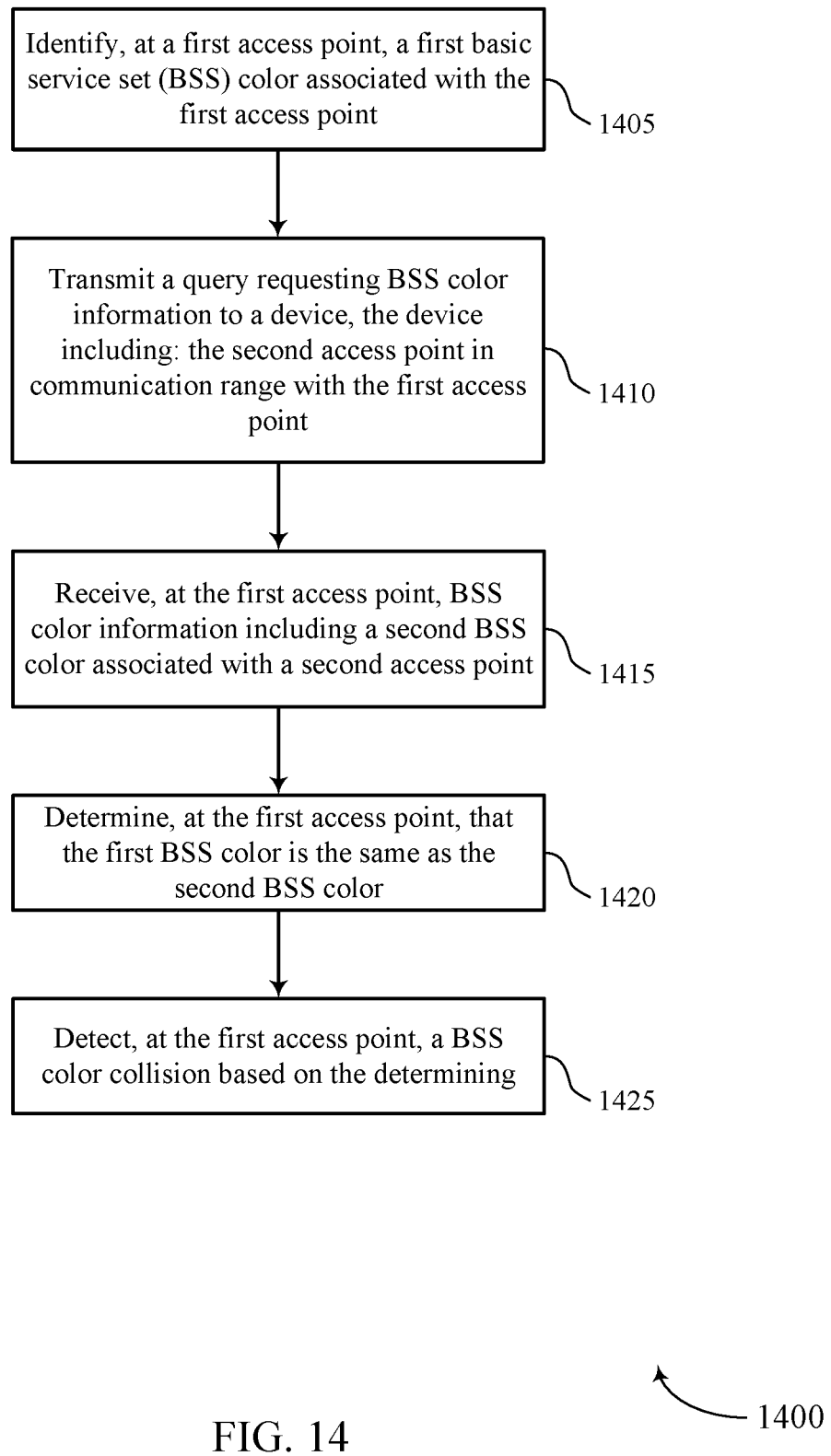

FIG. 14 shows a flowchart illustrating a method 1400 for BSS collision detection and resolution in accordance with various aspects of the present disclosure. In some examples, method 1400 may support BSS attribute value collision detection and resolution. In some examples, this BSS attribute value collision detection and resolution may include, but is not limited to, BSS color collision detection and resolution. The operations of method 1400 may be implemented by an AP 105 or its components as described herein. For example, the operations of method 1400 may be performed by an AP collision manager 315, 415, 515, or 615 as described with reference to FIGS. 3-6. In some examples, an AP 105 may execute a set of codes to control the functional elements of the device to perform the functions described below. Additionally or alternatively, the AP 105 may perform aspects the functions described below using special-purpose hardware.

At block 1405, the AP 105 may identify a first BSS color associated with the first AP. The operations of block 1405 may be performed according to the methods described with reference to FIGS. 1 and 2. In some implementations, aspects of the operations of block 1405 may be performed by a color identification component 425 or 520 as described with reference to FIGS. 3-6.

At block 1410, the AP 105 may transmit a query requesting BSS color information to a device, the device including the second AP in communication range with the first AP, where receiving the BSS color information is based on a response to the transmitted query. The operations of block 1410 may be performed according to the methods described with reference to FIGS. 1 and 2. In some implementations, aspects of the operations of block 1410 may be performed by a query component 555 as described with reference to FIGS. 3-6.

At block 1415, the AP 105 may receive BSS color information including a second BSS color associated with a second AP. The operations of block 1415 may be performed according to the methods described with reference to FIGS. 1 and 2. In some implementations, aspects of the operations of block 1415 may be performed by a receiver 310 or 410 as described with reference to FIGS. 3-6.

At block 1420, the AP 105 may determine that the first BSS color is the same as the second BSS color. The operations of block 1420 may be performed according to the methods described with reference to FIGS. 1 and 2. In some implementations, aspects of the operations of block 1420 may be performed by a color comparison component 430 or 525 as described with reference to FIGS. 3-6.

At block 1425, the AP 105 may detect a BSS color collision based on the determining. The operations of block 1425 may be performed according to the methods described with reference to FIGS. 1 and 2. In some implementations, aspects of the operations of block 1425 may be performed by a color collision component 435 or 530 as described with reference to FIGS. 3-6.

Figure 15:
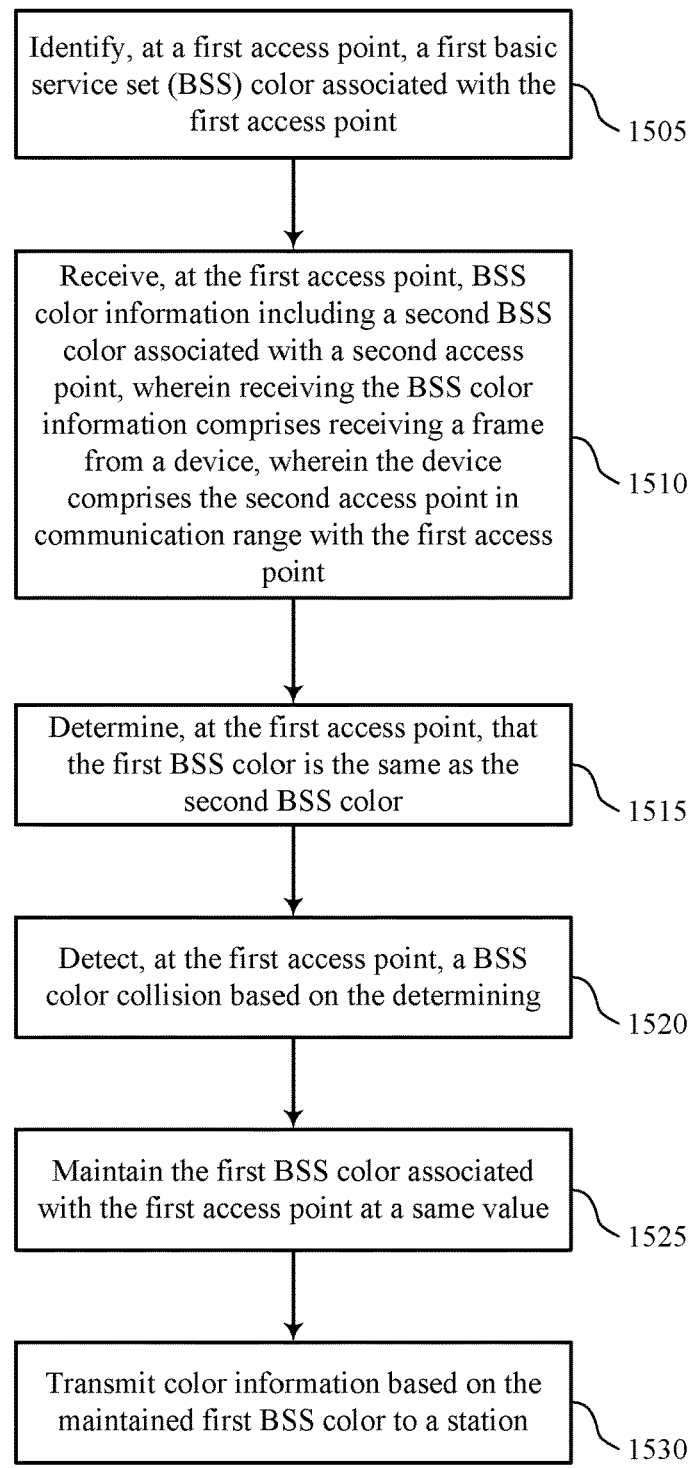

FIG. 15 shows a flowchart illustrating a method 1500 for BSS collision detection and resolution in accordance with various aspects of the present disclosure. In some examples, method 1500 may support BSS attribute value collision detection and resolution. In some examples, this BSS attribute value collision detection and resolution may include, but is not limited to, BSS color collision detection and resolution. The operations of method 1500 may be implemented by an AP 105 or its components as described herein. For example, the operations of method 1500 may be performed by an AP collision manager 315, 415, 515, or 615 as described with reference to FIGS. 3-6. In some examples, an AP 105 may execute a set of codes to control the functional elements of the device to perform the functions described below. Additionally or alternatively, the AP 105 may perform aspects the functions described below using special-purpose hardware.

At block 1505, the AP 105 may identify a first BSS color associated with the first AP. The operations of block 1505 may be performed according to the methods described with reference to FIGS. 1 and 2. In some implementations, aspects of the operations of block 1505 may be performed by a color identification component 425 or 520 as described with reference to FIGS. 3-6.

At block 1510, the AP 105 may receive BSS color information including a second BSS color associated with a second AP. In some examples, receiving the BSS color information includes receiving a frame from a device. In some examples, the device includes the second AP in communication range with the first AP. The operations of block 1510 may be performed according to the methods described with reference to FIGS. 1 and 2. In some implementations, aspects of the operations of block 1510 may be performed by a receiver 310 or 410 as described with reference to FIGS. 3-6.

At block 1515, the AP 105 may determine that the first BSS color is the same as the second BSS color. The operations of block 1515 may be performed according to the methods described with reference to FIGS. 1 and 2. In some implementations, aspects of the operations of block 1515 may be performed by a color comparison component 430 or 525 as described with reference to FIGS. 3-6.

At block 1520, the AP 105 may detect a BSS color collision based on the determining. The operations of block 1520 may be performed according to the methods described with reference to FIGS. 1 and 2. In some implementations, aspects of the operations of block 1520 may be performed by a color collision component 435 or 530 as described with reference to FIGS. 3-6.

At block 1525, the AP 105 may maintain the first BSS color associated with the first AP at a same value. The operations of block 1525 may be performed according to the methods described with reference to FIGS. 1 and 2. In some implementations, aspects of the operations of block 1525 may be performed by a color adjustment component 540 as described with reference to FIGS. 3-6.

At block 1530, the AP 105 may transmit color information based on the maintained first BSS color to a STA. The operations of block 1530 may be performed according to the methods described with reference to FIGS. 1 and 2. In some implementations, aspects of the operations of block 1530 may be performed by a transmitter 320 or 420 as described with reference to FIGS. 3-6.

Figure 16:
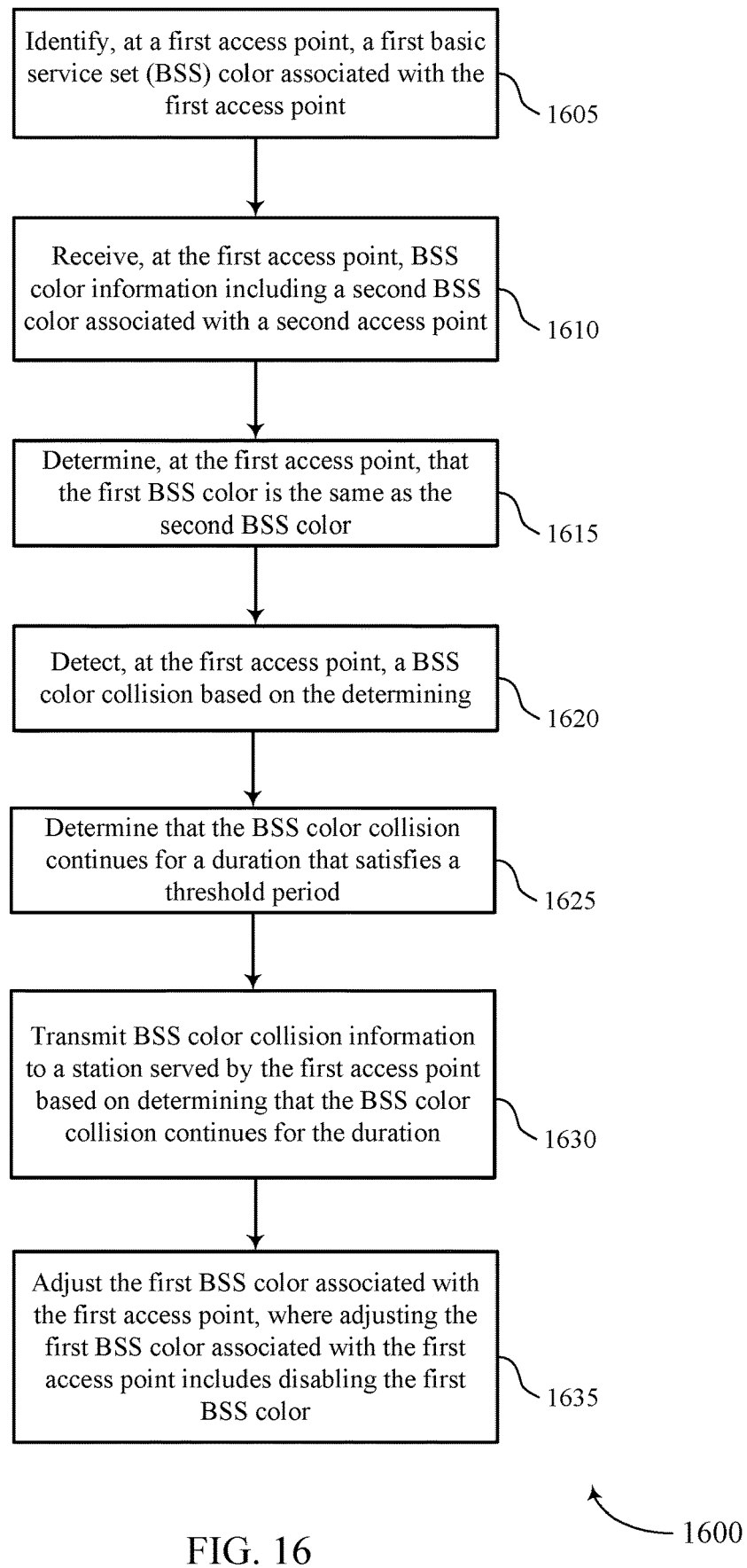

FIG. 16 shows a flowchart illustrating a method 1600 for BSS collision detection and resolution in accordance with various aspects of the present disclosure. In some examples, method 1600 may support BSS attribute value collision detection and resolution. In some examples, this BSS attribute value collision detection and resolution may include, but is not limited to, BSS color collision detection and resolution. The operations of method 1600 may be implemented by a STA 115 or its components as described herein. For example, the operations of method 1600 may be performed by a STA collision manager 715, 815, 915, or 1015 as described with reference to FIGS. 7-10. In some examples, a STA 115 may execute a set of codes to control the functional elements of the device to perform the functions described below. Additionally or alternatively, the STA 115 may perform aspects the functions described below using special-purpose hardware.

At block 1605, the AP 105 may identify a first BSS color associated with the first AP. The operations of block 1205 may be performed according to the methods described with reference to FIGS. 1 and 2. In some implementations, aspects of the operations of block 1605 may be performed by a color identification component 425 or 520 as described with reference to FIGS. 3-6.

At block 1610, the AP 105 may receive BSS color information including a second BSS color associated with a second AP. The operations of block 1610 may be performed according to the methods described with reference to FIGS. 1 and 2. In some implementations, aspects of the operations of block 1610 may be performed by a receiver 310 or 410 as described with reference to FIGS. 3-6.

At block 1615, the AP 105 may determine that the first BSS color is the same as the second BSS color. The operations of block 1615 may be performed according to the methods described with reference to FIGS. 1 and 2. In some implementations, aspects of the operations of block 1615 may be performed by a color comparison component 430 or 525 as described with reference to FIGS. 3-6.

At block 1620, the AP 105 may detect a BSS color collision based on the determining. The operations of block 1620 may be performed according to the methods described with reference to FIGS. 1 and 2. In some implementations, aspects of the operations of block 1620 may be performed by a color collision component 435 or 530 as described with reference to FIGS. 3-6.

At block 1625, the AP 105 may determine that the BSS color collision continues for a duration that satisfies a threshold period. The operations of block 1625 may be performed according to the methods described with reference to FIGS. 1 and 2. In some implementations, aspects of the operations of block 1625 may be performed by a color collision component 435 or 530 as described with reference to FIGS. 3-6.

At block 1630, the AP 105 may transmit BSS color collision information to a STA served by the AP 105 based on determining that the BSS color collision continues for the duration. The operations of block 1630 may be performed according to the methods described with reference to FIGS. 1 and 2. In some implementations, aspects of the operations of block 1630 may be performed by a transmitter 320 or 420 as described with reference to FIGS. 3-6.

At block 1635, the AP 105 may adjust the first BSS color associated with the first access point, where adjusting the first BSS color associated with the first access point includes enabling or disabling the first BSS color. The operations of block 1630 may be performed according to the methods described with reference to FIGS. 1 and 2. In some implementations, aspects of the operations of block 1630 may be performed by a color collision component 435 or 530 as described with reference to FIGS. 3-6.

Figure 17:
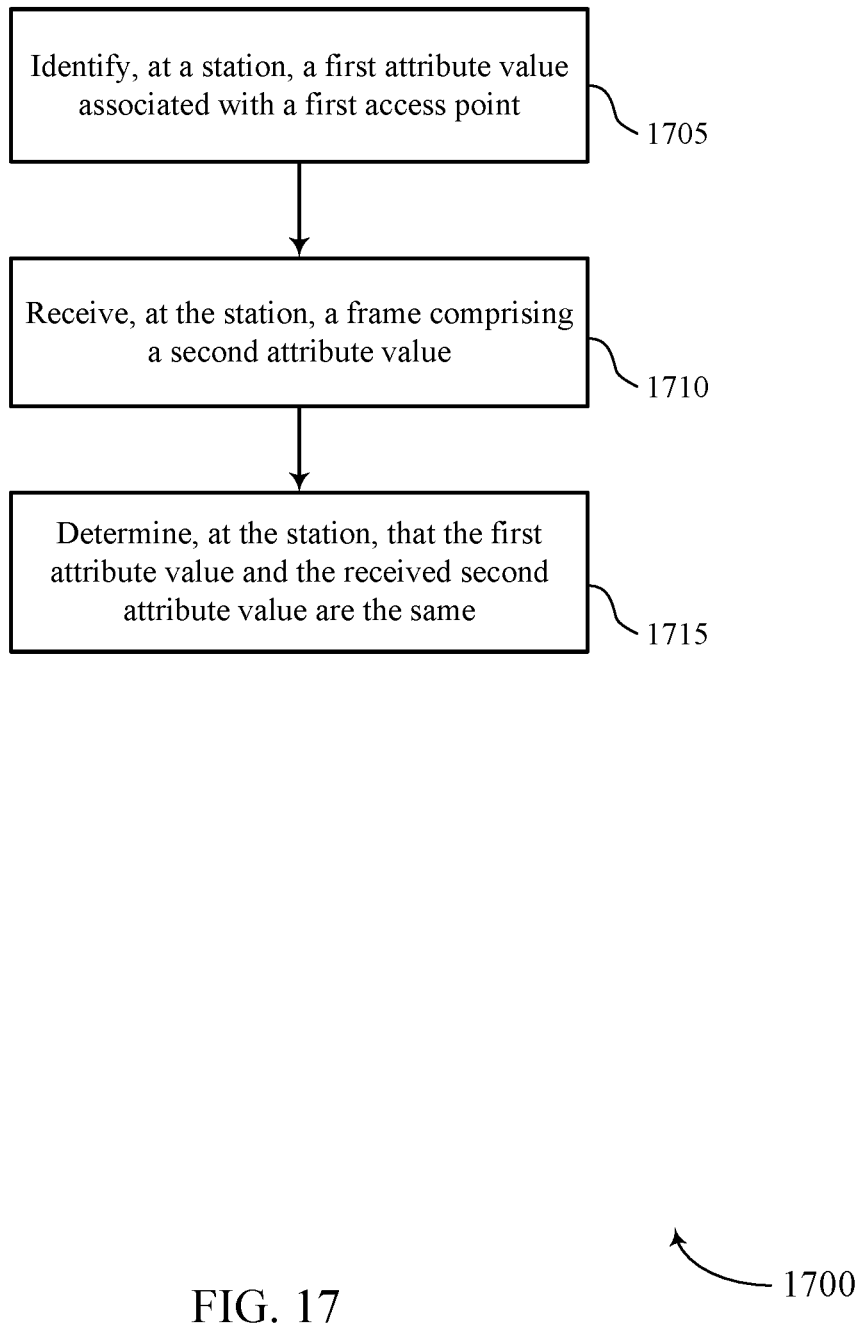

FIG. 17 shows a flowchart illustrating a method 1700 for BSS collision detection and resolution in accordance with various aspects of the present disclosure. In some examples, method 1700 may support BSS attribute value collision detection and resolution. In some examples, this BSS attribute value collision detection and resolution may include, but is not limited to, BSS color collision detection and resolution. The operations of method 1700 may be implemented by a STA 115 or its components as described herein. For example, the operations of method 1700 may be performed by a STA collision manager 715, 815, 915, or 1015 as described with reference to FIGS. 7-10. In some examples, a STA 115 may execute a set of codes to control the functional elements of the device to perform the functions described below. Additionally or alternatively, the STA 115 may perform aspects the functions described below using special-purpose hardware.

At block 1705, the STA 115 may identify a first attribute value associated with a first AP. The operations of block 1705 may be performed according to the methods described with reference to FIGS. 1 and 2. In some implementations, aspects of the operations of block 1705 may be performed by a color identification component 825 or 920 described with reference to FIGS. 7-10.

At block 1710, the STA 115 may receive a frame including a second attribute value. The second attribute value may be associated with a second AP. The operations of block 1710 may be performed according to the methods described with reference to FIGS. 1 and 2. In some implementations, aspects of the operations of block 1710 may be performed by a receiver 710 or 810 as described with reference to FIGS. 7-10.

At block 1715, the STA 115 may identify that the first attribute value and the received second attribute value are the same. The operations of block 1715 may be performed according to the methods described with reference to FIGS. 1 and 2. In some implementations, aspects of the operations of block 1715 may be performed by a color comparison component 830 or 925 as described with reference to FIGS. 7-10.

Figure 18:
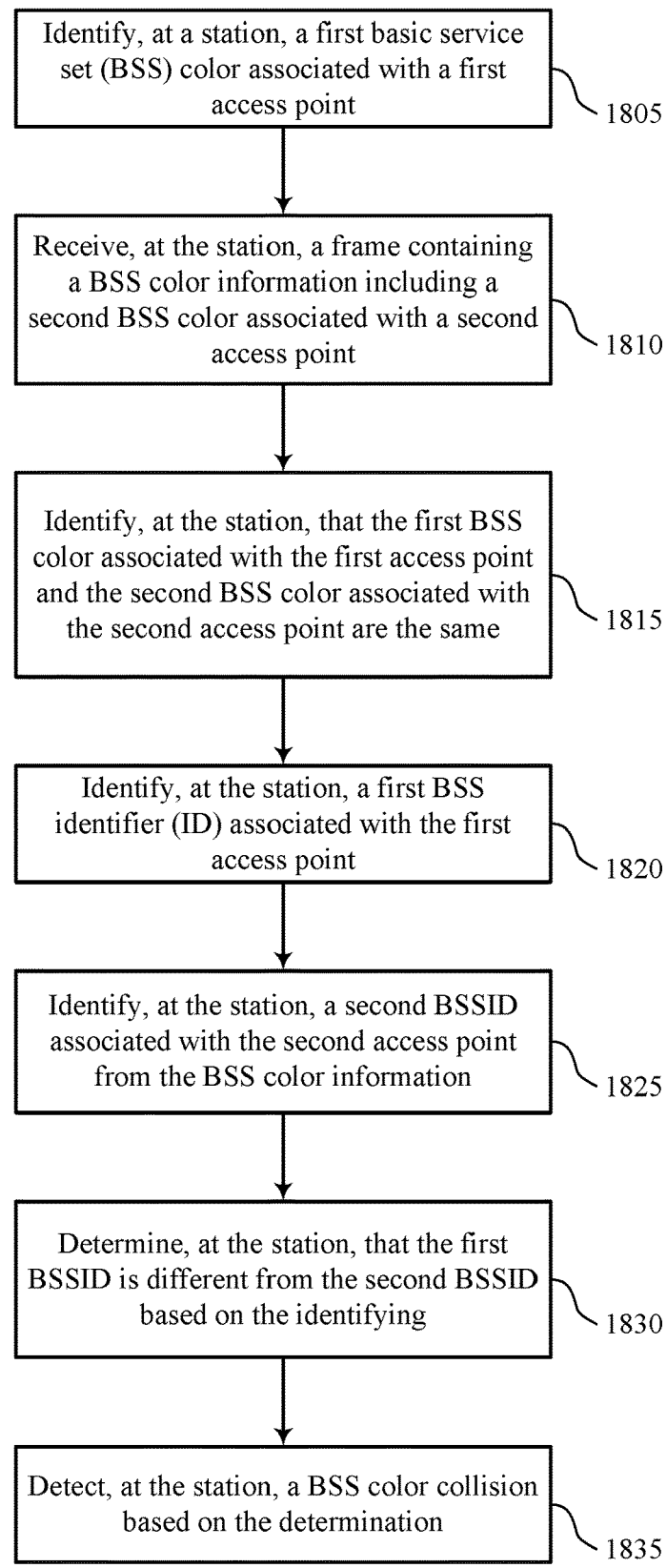

FIG. 18 shows a flowchart illustrating a method 1800 for BSS collision detection and resolution in accordance with various aspects of the present disclosure. In some examples, method 1800 may support BSS attribute value collision detection and resolution. In some examples, this BSS attribute value collision detection and resolution may include, but is not limited to, BSS color collision detection and resolution. The operations of method 1800 may be implemented by a STA 115 or its components as described herein. For example, the operations of method 1800 may be performed by a STA collision manager 715, 815, 915, or 1015 as described with reference to FIGS. 7-10. In some examples, a STA 115 may execute a set of codes to control the functional elements of the device to perform the functions described below. Additionally or alternatively, the STA 115 may perform aspects the functions described below using special-purpose hardware.

At block 1805, the STA 115 may identify a first BSS color associated with a first AP. The operations of block 1805 may be performed according to the methods described with reference to FIGS. 1 and 2. In some implementations, aspects of the operations of block 1805 may be performed by a color identification component 825 or 920 described with reference to FIGS. 7-10.

At block 1810, the STA 115 may receive a frame containing a BSS color information including a second BSS color associated with a second AP. The operations of block 1810 may be performed according to the methods described with reference to FIGS. 1 and 2. In some implementations, aspects of the operations of block 1810 may be performed by a receiver 710 or 810 as described with reference to FIGS. 7-10.

At block 1815, the STA 115 may identify that the first BSS color associated with the first AP and the second BSS color associated with the second AP are the same. The operations of block 1815 may be performed according to the methods described with reference to FIGS. 1 and 2. In some implementations, aspects of the operations of block 1815 may be performed by a color comparison component 830 or 925 as described with reference to FIGS. 7-10.

At block 1820, the STA 115 may identify a first BSSID associated with the first AP. The operations of block 1820 may be performed according to the methods described with reference to FIGS. 1 and 2. In some implementations, aspects of the operations of block 1820 may be performed by a BSS identification component 835 or 930 as described with reference to FIGS. 7-10.

At block 1825, the STA 115 may identify a second BSSID associated with the second AP from the BSS color information. The operations of block 1825 may be performed according to the methods described with reference to FIGS. 1 and 2. In some implementations, aspects of the operations of block 1825 may be performed by a BSS identification component 835 or 930 as described with reference to FIGS. 7-10.

At block 1830, the STA 115 may determine that the first BSSID is different from the second BSSID based on the identifying. The operations of block 1830 may be performed according to the methods described with reference to FIGS. 1 and 2. In some implementations, aspects of the operations of block 1830 may be performed by a BSS identification component 835 or 930 as described with reference to FIGS. 7-10.

At block 1835, the STA 115 may detect a BSS color collision based on the determination. The operations of block 1835 may be performed according to the methods described with reference to FIGS. 1 and 2. In some implementations, aspects of the operations of block 1835 may be performed by a color collision component 840 or 935 as described with reference to FIGS. 7-10.

Figure 19:
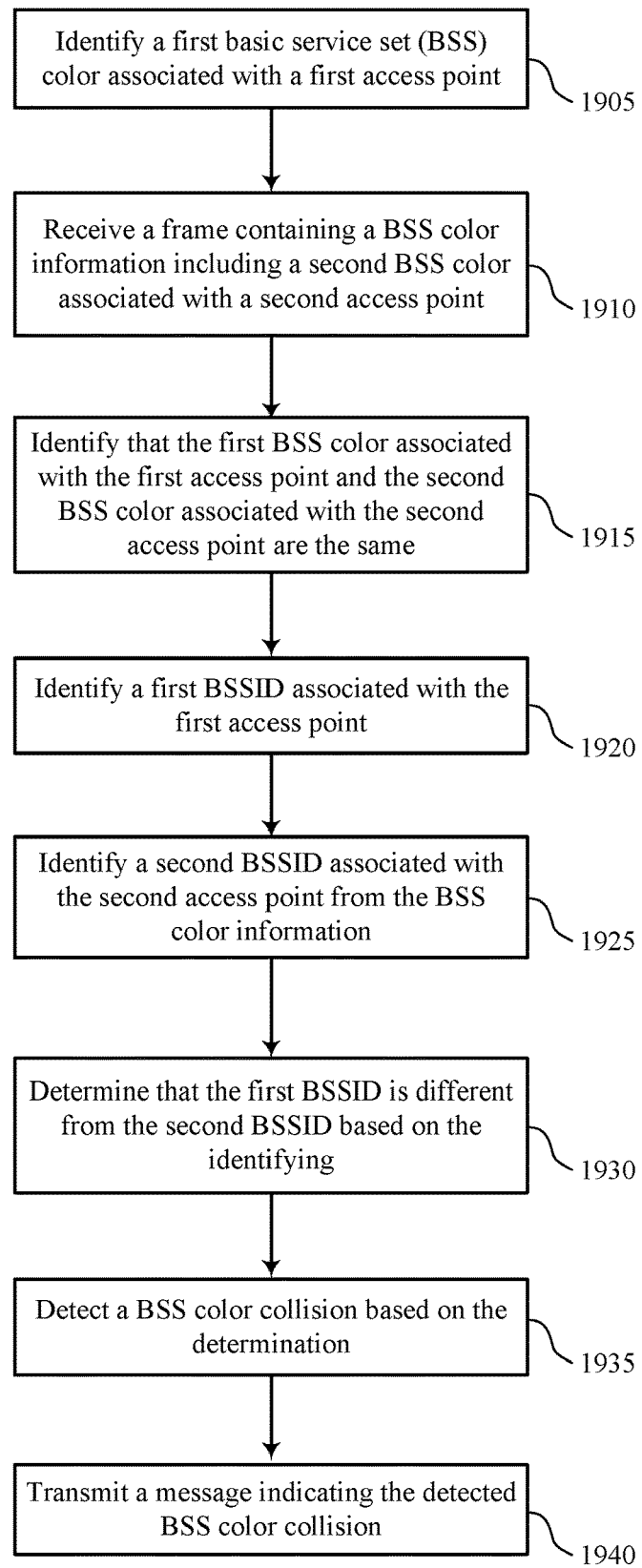

FIG. 19 shows a flowchart illustrating a method 1900 for BSS color collision detection and resolution in accordance with various aspects of the present disclosure. In some examples, method 1900 may support BSS attribute value collision detection and resolution. In some examples, this BSS attribute value collision detection and resolution may include, but is not limited to, BSS color collision detection and resolution. The operations of method 1900 may be implemented by a STA 115 or its components as described herein. For example, the operations of method 1900 may be performed by a STA collision manager 715, 815, 915, or 1015 as described with reference to FIGS. 7-10. In some examples, a STA 115 may execute a set of codes to control the functional elements of the device to perform the functions described below. Additionally or alternatively, the STA 115 may perform aspects the functions described below using special-purpose hardware.

At block 1905, the STA 115 may identify a first BSS color associated with a first AP. The operations of block 1905 may be performed according to the methods described with reference to FIGS. 1 and 2. In some implementations, aspects of the operations of block 1905 may be performed by a color identification component 825 or 920 as described with reference to FIGS. 7-10.

At block 1910, the STA 115 may receive a frame containing a BSS color information including a second BSS color associated with a second AP. The operations of block 1910 may be performed according to the methods described with reference to FIGS. 1 and 2. In some implementations, aspects of the operations of block 1910 may be performed by a receiver 710 or 810 as described with reference to FIGS. 7-10.

At block 1915, the STA 115 may identify that the first BSS color associated with the first AP and the second BSS color associated with the second AP are the same. The operations of block 1915 may be performed according to the methods described with reference to FIGS. 1 and 2. In some implementations, aspects of the operations of block 1915 may be performed by a color comparison component 830 or 925 as described with reference to FIGS. 7-10.

At block 1920, the STA 115 may identify a first BSSID associated with the first AP. The operations of block 1920 may be performed according to the methods described with reference to FIGS. 1 and 2. In some implementations, aspects of the operations of block 1920 may be performed by a BSS identification component 835 or 930 as described with reference to FIGS. 7-10.

At block 1925, the STA 115 may identify a second BSSID associated with the second AP from the BSS color information. The operations of block 1925 may be performed according to the methods described with reference to FIGS. 1 and 2. In some implementations, aspects of the operations of block 1925 may be performed by a BSS identification component 835 or 930 as described with reference to FIGS. 7-10.

At block 1930, the STA 115 may determine that the first BSSID is different from the second BSSID based on the identifying. The operations of block 1930 may be performed according to the methods described with reference to FIGS. 1 and 2. In some implementations, aspects of the operations of block 1930 may be performed by a BSS identification component 835 or 930 as described with reference to FIGS. 7-10.

At block 1935, the STA 115 may detect a BSS color collision based on the determination. The operations of block 1935 may be performed according to the methods described with reference to FIGS. 1 and 2. In some implementations, aspects of the operations of block 1935 may be performed by a color collision component 840 or 935 as described with reference to FIGS. 7-10.

At block 1940, the STA 115 may transmit a message indicating the detected BSS color collision. The operations of block 1940 may be performed according to the methods described with reference to FIGS. 1 and 2. In some implementations, aspects of the operations of block 1940 may be performed by a collision reporting component 940 as described with reference to FIGS. 7-10.

Figure 20:
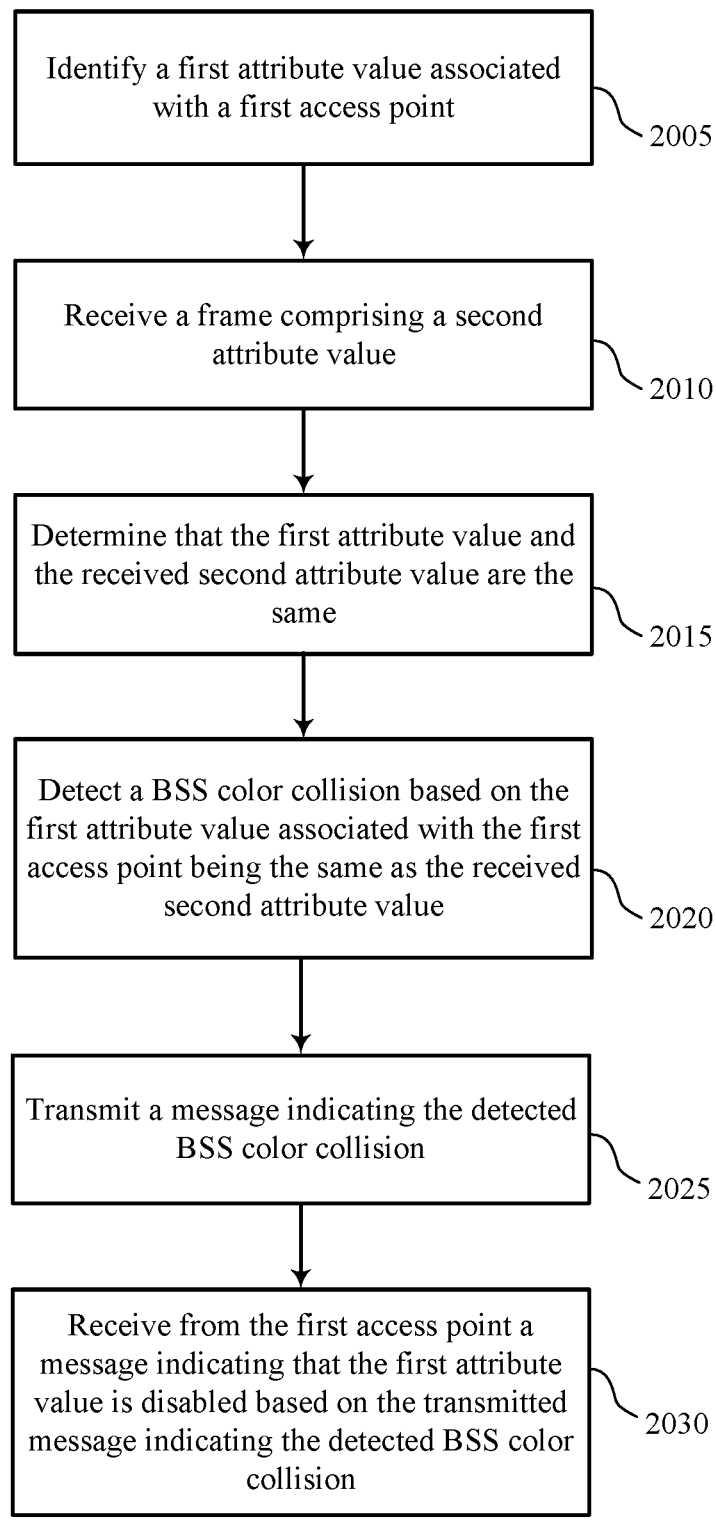

FIG. 20 shows a flowchart illustrating a method 2000 for BSS color collision detection and resolution in accordance with various aspects of the present disclosure. In some examples, method 2000 may support BSS attribute value collision detection and resolution. In some examples, this BSS attribute value collision detection and resolution may include, but is not limited to, BSS color collision detection and resolution. The operations of method 2000 may be implemented by a STA 115 or its components as described herein. For example, the operations of method 2000 may be performed by a STA collision manager 715, 815, 915, or 1015 as described with reference to FIGS. 7-10. In some examples, a STA 115 may execute a set of codes to control the functional elements of the device to perform the functions described below. Additionally or alternatively, the STA 115 may perform aspects the functions described below using special-purpose hardware.

At block 2005, the STA 115 may identify a first attribute value associated with a first AP. The operations of block 2005 may be performed according to the methods described with reference to FIGS. 1 and 2. In some implementations, aspects of the operations of block 2005 may be performed by a color identification component 825 or 920 described with reference to FIGS. 7-10.

At block 2010, the STA 115 may receive a frame including a second attribute value. The second attribute value may be associated with a second AP. The operations of block 2010 may be performed according to the methods described with reference to FIGS. 1 and 2. In some implementations, aspects of the operations of block 2010 may be performed by a receiver 710 or 810 as described with reference to FIGS. 7-10.

At block 2015, the STA 115 may identify that the first attribute value and the received second attribute value are the same. The operations of block 2015 may be performed according to the methods described with reference to FIGS. 1 and 2. In some implementations, aspects of the operations of block 2015 may be performed by a color comparison component 830 or 925 as described with reference to FIGS. 7-10.

At block 2020, the STA 115 may detect a BSS color collision based on the first attribute value associated with the first access point being the same as the received second attribute value. In some cases, the first attribute value and the second attribute value may indicate a BSS color. For example, the first attribute value may be a BSS color associated with the first access point. In addition, the second attribute value may be a BSS color associated with another STA or AP. The operations of block 2020 may be performed according to the methods described with reference to FIGS. 1 and 2. In some implementations, aspects of the operations of block 2020 may be performed by a color comparison component 830 or 925 as described with reference to FIGS. 7-10.

At block 2025, the STA 115 may transmit a message indicating the detected BSS color collision. The operations of block 2025 may be performed according to the methods described with reference to FIGS. 1 and 2. In some implementations, aspects of the operations of block 2025 may be performed by a color comparison component 830 or 925 as described with reference to FIGS. 7-10.

At block 2030, the STA 115 may receive from the first access point a message indicating that the first attribute value is disabled based on the transmitted message indicating the detected BSS color collision. For example, STA 115 may receive from the first access point a message indicating that the first BSS color is disabled based on the transmitted message indicating the detected BSS color collision. The operations of block 2030 may be performed according to the methods described with reference to FIGS. 1 and 2. In some implementations, aspects of the operations of block 2030 may be performed by a color comparison component 830 or 925 as described with reference to FIGS. 7-10.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different stations may not be aligned in time. The techniques described herein may be used for either synchronous or asynchronous operations.

The downlink transmissions described herein also may be called forward link transmissions while the uplink transmissions also may be called reverse link transmissions. Each communication link described herein—including, for example, WLAN 100 (e.g., a wireless communications system) and system 200 of FIGS. 1 and 2—may include carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor also may be implemented as a combination of computing devices (e.g., a combination of a digital signal processor (DSP) and a microprocessor, multiple microprocessors, microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions also may be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure, the term "example" or "exemplary" indicates an example or instance and does not imply or require any preference for the noted example. Thus, the disclosure is not to be limited to the examples and designs described herein but is to be accorded the broadest scope consistent with the principles and features disclosed herein.

What is claimed is:

1. A method for wireless communications, comprising:
identifying, at a first access point, a first attribute value associated with the first access point, the first attribute value comprising a first basic service set (BSS) color;
receiving, at the first access point, a message indicating a second attribute value comprising a second BSS color and indicating that the first attribute value is the same as the second attribute value, the message including an event report element indicating that the first BSS color and the second BSS color correspond to overlapping BSSs (OBSSs), wherein the event report element comprises an event token enabling autonomous reporting to the first access point;
determining, at the first access point, that the first attribute value associated with the first access point is the same as the received second attribute value; and
adjusting, at the first access point, the first BSS color based at least in part on the message indicating that the first attribute value is the same as the second attribute value, wherein adjusting the first BSS color comprises setting a BSS color status of the first BSS color to disabled.

2. The method of claim 1, wherein the first attribute value associated with the first access point, or the received second attribute value, or both identifies a basic service set (BSS) in a physical (PHY) header.

3. The method of claim 1, wherein the second attribute value is associated with a second access point.

4. The method of claim 3, further comprising:
identifying, at the first access point, a first BSS identifier (ID) associated with the first access point;
identifying a second BSSID associated with the second access point from a received frame; and
determining that the first BSSID is different from the second BSSID based at least in part on the identifying.

5. The method of claim 1, further comprising:
detecting, at the first access point, a BSS color collision based at least in part on determining that the first attribute value is the same as the received second attribute value, wherein the BSS color collision continues for a duration satisfying a threshold period.

6. The method of claim 5, further comprising:
transmitting BSS color collision information to a station served by the first access point based at least in part on determining that the BSS color collision continues for the duration,
wherein the BSS color collision information is transmitted in a beacon, a probe response frame, an association response frame, or a combination thereof.

7. The method of claim 6, further comprising:
transmitting the BSS color collision information during at least a next transmission period.

8. The method of claim 6, wherein adjusting the first BSS color further comprises:
adjusting, at the first access point, the first BSS color via at least one bit in a BSS color field transmitted in the beacon, the probe response frame, the association response frame, or a combination thereof based at least in part on determining that the BSS color collision continues for the duration.

9. The method of claim 8, further comprising:
adjusting the first BSS color to a different BSS color.

10. The method of claim 8, further comprising:
transmitting, to at least one station served by the first access point, BSS color information in a beacon, a probe response frame, an association response frame, or a special frame, or a combination thereof based at least in part on adjusting the first BSS color.

11. The method of claim 10, wherein the BSS color information comprises a BSS color change announcement including a reference time when a BSS color change will occur and an indication of a new BSS color selected by the first access point,
wherein the reference time is a countdown value associated with a target beacon transmission time (TBTT).

12. The method of claim 8, further comprising:
generating a random BSS color different from the first BSS color, wherein adjusting the first BSS color is based at least in part on the random BSS color.

13. The method of claim 8, wherein adjusting the first BSS color comprises selecting a new BSS color associated with the first access point based at least in part on at least one BSS color associated with an overlapping BSS (OBSS),
wherein the selected new BSS color comprises a non-overlapping BSS color distinct from the BSS color associated with the OBSS.

14. The method of claim 13, further comprising:
generating a color in a range, wherein selecting the new BSS color is based at least in part on the generated color.

15. The method of claim 14, further comprising:
transmitting an event request, requesting BSS color information, to a station;
receiving other BSS color information associated with a second access point based at least in part on the transmitted event request;
identifying an additional BSS color associated with the second access point from the received other BSS color information; and
transmitting a second color in the range based at least in part on the identified additional BSS color associated with the second access point from the received other BSS color information.

16. The method of claim 6, further comprising:
transmitting, to a station, an event request requesting BSS color information, wherein receiving BSS color information associated with a second access point is based at least in part on a response to the transmitted event request.

17. The method of claim 1, further comprising:
transmitting a query requesting BSS color information associated with one or more neighboring BSSs to one or more stations associated with the first access point;
receiving the BSS color information associated with the one or more neighboring BSSs based at least in part on a response to the transmitted query;
determining that a color collision exists between at least one neighboring BSS and the first access point based at least in part on the received BSS color information; and
selecting, at the first access point, a new BSS color comprising a non-overlapping BSS color distinct from a BSS color indicated in the received BSS color information associated with the at least one neighboring BSS based at least in part on determining that the color collision exists.

18. The method of claim 17, wherein transmitting the query comprises transmitting the query to one or more stations based at least in part on a coverage area associated with the first access point, the one or more stations, or both.

19. The method of claim 1, wherein receiving the second attribute value comprises receiving a frame from a device, wherein the device comprises a neighboring access point, a device participating in a neighboring BSS or a OB SS.

20. The method of claim 1, further comprising:
adjusting the first BSS color to a different BSS color, wherein adjusting the first BSS color comprises setting the BSS color status of the first BSS color to disabled by modifying a subfield associated with the first BSS color.

21. A method for wireless communications, comprising:
identifying, at a station, a first attribute value associated with a first access point, the first attribute value comprising a first basic service set (BSS) color;
receiving, at the station, a frame containing a second attribute value associated with a second access point, the second attribute value comprising a second BSS color;
determining, at the station, that the first attribute value and the received second attribute value are the same; and
transmitting, to the first access point based at least in part on determining that the first attribute value and the received second attribute value are the same, a message indicating that the first attribute value is the same as the received second attribute value, the message including an event report element indicating that the first BSS color and the second BSS color correspond to overlapping BSSs (OBSSs), the event report element comprising an event token enabling or disabling autonomous reporting to the first access point, wherein disabling the autonomous reporting is associated with an indication that a BSS color status of the first BSS color has been set to disabled.

22. The method of claim 21, further comprising:
identifying, at the station, a first basic service set identifier (BSSID) associated with the first access point;
identifying, at the station, a second BSSID associated with the second access point from the second attribute value; and
determining, at the station, that the first BSSID is different from the second BSSID based at least in part on the identifying.

23. The method of claim 21, further comprising:
detecting, at the station, a BSS color collision based at least in part on the identifying that the first attribute value is the same as the received second attribute value, wherein the BSS color collision continues for a duration satisfying a threshold period.

24. The method of claim 23, wherein transmitting the message further comprises:
transmitting a second message indicating the detected BSS color collision; and
receiving, from the first access point, a third message indicating that the BSS color status of the first BSS color is set to disabled based at least in part on the transmitted second message indicating the detected BSS color collision, wherein enabling or disabling the autonomous reporting is associated with one or more of the detected BSS color collision or the received third message indicating that the BSS color status of the first BSS color is set to disabled.

25. The method of claim 23, wherein transmitting the message comprises transmitting an event report frame including the event report element to the first access point based at least in part on the detected BSS color collision, wherein the event report element is generated autonomously or in response to receiving a request from an access point.

26. The method of claim 25, wherein the event report element comprises at least an event report field comprising a bitmap including one or more bits where at least some of the one or more bits indicate a color selected by an OBSS.

27. The method of claim 25, wherein the event report element comprises at least an event report field identifying BSSID information, or BSS color information, or the detected BSS color collision, or a combination thereof associated with at least one access point currently in communication range with the station, or previously in communication range of the station, or a combination thereof.

28. The method of claim 25, wherein the event report element comprises at least one event report field identifying BSSID information, or BSS color information, or the detected BSS color collision, or a combination thereof associated with a first device in a first BSS and identifying BSSID information, or BSS color information, or the detected BSS color collision, or a combination thereof associated with a second device in a second BSS.

29. An apparatus for wireless communications, comprising:
a processor;
memory in electronic communication with the processor; and
instructions stored in the memory and operable, when executed by the processor, to cause the apparatus to:
identify a first attribute value associated with a first access point, the first attribute value comprising a first basic service set (BSS) color;
receive a message indicating a second attribute value comprising a second BSS color and indicating that the first attribute value is the same as the second attribute value, the message including an event report element indicating that the first BSS color and the second BSS color correspond to overlapping BSSs (OBSSs), wherein the event report element comprises an event token enabling autonomous reporting to the first access point;
determine that the first attribute value associated with the first access point is the same as the received second attribute value;
adjust the first BSS color based at least in part on the message indicating that the first attribute value is the same as the second attribute value, wherein adjusting the first BSS color comprises setting a BSS color status of the first BSS color to disabled.

30. An apparatus for wireless communications, comprising:
a processor;
memory in electronic communication with the processor; and
instructions stored in the memory and operable, when executed by the processor, to cause the apparatus to:
identify a first attribute value associated with a first access point, the first attribute value comprising a first basic service set (BSS) color;
receive a frame containing a second attribute value associated with a second access point, the second attribute value comprising a second BSS color;
determine that the first attribute value and the received second attribute value are the same; and
transmit, to the first access point based at least in part on determining that the first attribute value and the received second attribute value are the same, a message indicating that the first attribute value is the same as the received second attribute value, the message including an event report element indicating that the first BSS color and the second BSS color correspond to overlapping BSSs (OBSSs), the event report element comprising an event token enabling or disabling autonomous reporting to the first access point, wherein disabling the autonomous reporting is associated with an indication that a BSS color status of the first BSS color has been set to disabled.

* * * * *